(12) United States Patent
Sakurai et al.

(10) Patent No.: US 9,149,720 B2
(45) Date of Patent: Oct. 6, 2015

(54) COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(75) Inventors: Masahiro Sakurai, Chiyoda-Ku (JP); Shinya Abe, Chiyoda-Ku (JP); Teppei Ikeda, Chiyoda-Ku (JP)

(73) Assignee: NINTENDO CO., LTD., Kyoto (JP)

( * ) Notice: Subject to any disclaimer, the term of this patent is extended or adjusted under 35 U.S.C. 154(b) by 593 days.

(21) Appl. No.: 13/158,839

(22) Filed: Jun. 13, 2011

(65) Prior Publication Data

US 2012/0007882 A1    Jan. 12, 2012

(30) Foreign Application Priority Data

Jun. 11, 2010    (JP) .................................. 2010-134539

(51) Int. Cl.
    *G06T 15/00*    (2011.01)
    *G06T 17/00*    (2006.01)
    *A63F 13/40*    (2014.01)
    *G06F 3/0481*   (2013.01)
    *G06F 3/0488*   (2013.01)
    *G06T 15/20*    (2011.01)

(52) U.S. Cl.
    CPC ............ *A63F 13/10* (2013.01); *G06F 3/04815* (2013.01); *G06F 3/04883* (2013.01); *G06T 15/20* (2013.01); *A63F 2300/1075* (2013.01); *A63F 2300/204* (2013.01); *A63F 2300/6676* (2013.01)

(58) Field of Classification Search
    CPC combination set(s) only.
    See application file for complete search history.

(56) References Cited

U.S. PATENT DOCUMENTS

| 2008/0070684 A1 | 3/2008 | Haigh-Hutchinson |
| 2009/0247250 A1* | 10/2009 | Kato et al. ........................ 463/2 |

(Continued)

FOREIGN PATENT DOCUMENTS

| JP | 10-161628 | 6/1998 |
| JP | 2001-046743 | 2/2001 |

(Continued)

OTHER PUBLICATIONS

"Metroid Prime Hunters System", Nintendo Co., Ltd. (retrieved on May 9, 2010 —Internet) http://metroid_version4/system/index1.html#System, w/ Partial Translation, 3 pages.

*Primary Examiner* — Kee M Tung
*Assistant Examiner* — Leon T Cain, II
(74) *Attorney, Agent, or Firm* — Nixon & Vanderhye P.C.

(57) ABSTRACT

In order to attain the object described above, a game apparatus is able to use display means and coordinate input means such as a touch panel, and positions a virtual camera Ca in a virtual space. Whether the coordinate input means is in an inputted state in which a player is performing a coordinate input (touch operation) on the coordinate input means, or in a non-inputted state in which a player is not performing coordinate input on the coordinate input means, is determined. When it is determined that the coordinate input means is in the non-inputted state, the game apparatus changes the imaging direction of the virtual camera Ca, based on change of an input coordinate position that is designated on the coordinate input means immediately before the coordinate input means enters the non-inputted state.

31 Claims, 27 Drawing Sheets

(56) References Cited

U.S. PATENT DOCUMENTS

2010/0066736 A1* 3/2010 Nishimura et al. ........... 345/419
2010/0302239 A1* 12/2010 Tokita et al. .................. 345/419

FOREIGN PATENT DOCUMENTS

| | | |
|---|---|---|
| JP | 2004-117830 | 4/2004 |
| JP | 2008-068060 | 3/2008 |

* cited by examiner

COMPUTER-READABLE STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2010-134539, filed on Jun. 11, 2010, is incorporated herein by reference.

BACKGROUND OF THE INVENTION

1. Field of the Invention

The present invention relates to: a computer-readable storage medium having an information processing program stored therein; an information processing apparatus; an information processing system; and an information processing method, and more particularly to: a computer-readable storage medium having stored therein an information processing program, an information processing apparatus, an information processing system, and an information processing method which change an orientation of a virtual camera based on an operation performed on a touch panel by a player.

2. Description of the Background Art

An information processing apparatus which is capable of changing, based on a touch operation performed on a touch panel by a player, an orientation of a virtual camera positioned in a three-dimensional virtual space, has been known to date. For example, in a game apparatus described in "METROID PRIME HUNTERS SYSTEM" by Nintendo Co., Ltd, (retrieved on May 9, 2010), the Internet <URL: http://metroid.jp/metroid_version4/system/index1.html#System>, when a player performs sliding operation on a touch panel, the virtual camera is rotated to change an orientation of the virtual camera according to a sliding amount of the sliding operation.

However, in the game apparatus as described above, the orientation of the virtual camera is changed by the sliding amount of the sliding operation. Therefore, a player needs to frequently perform the sliding operation in order to change the orientation of the virtual camera, which is inconvenient.

SUMMARY OF THE INVENTION

Therefore, an object of the preset invention is to make available a computer-readable storage medium having stored therein an information processing program, an information processing apparatus, an information processing system, and an information processing method which are capable of changing, with enhanced operability, the orientation of a virtual camera through operation on coordinate input means.

In order to attain the object described above, a computer-readable storage medium having stored therein an information processing program according to a first aspect of the present invention causes a computer of an information processing apparatus which can use display means, and operation means including coordinate input means, to function as: a virtual camera positioning means; a virtual image generation means; a display process means; operation determination means; and first camera orientation change means.

The virtual camera positioning means positions a virtual camera in a virtual space. The virtual image generation means takes an image of the virtual space by using the virtual camera, to generate a virtual image. The display process means displays, by using the display means, the virtual image generated by the virtual image generation means. The operation determination means determines whether the coordinate input means is in an inputted state in which a player is performing coordinate input on the coordinate input means, or in a non-inputted state in which a player is not performing coordinate input on the coordinate input means, based on an output signal from the coordinate input means. The first camera orientation change means changes, when the operation determination means determines that the coordinate input means is in the non-inputted state, an imaging direction of the virtual camera, based on change of an input coordinate position that is designated on the coordinate input means immediately before the coordinate input means enters the non-inputted state.

In this configuration, even when a player does not continue operation on the coordinate input means, the imaging direction of the virtual camera is changed. Therefore, the player need not frequently perform an operation for changing the imaging direction of the virtual camera, thereby improving, for a player, operability for changing the imaging direction of the virtual camera. Further, the imaging direction of the virtual camera is changed based on change of an input coordinate position that is designated on the coordinate input means immediately before the coordinate input means enters the non-inputted state. Therefore, a manner for changing the imaging direction of the virtual camera can be determined according to an operation performed immediately before the coordinate input means enters the non-inputted state, so that the imaging direction of the virtual camera can be changed so as to orient the virtual camera as desired by a player according to an operation performed by the player.

Examples of the coordinate input means include a touch panel and a pointing device. The touch panel allows a player to perform coordinate input by touching on the touch panel. On the other hand, examples of the pointing device include a mouse, and, in this case, a player is allowed to perform coordinate input by clicking the mouse. When the mouse is used, a state in which the clicking operation is received is the inputted state, and a state in which the clicking operation is not received is the non-inputted state. When the sliding operation is performed during the clicking operation, the input coordinate position is changed. The first aspect includes the feature that the imaging direction of the virtual camera is changed based on change of the input coordinate position.

Further, other examples of the pointing device include a remote controller capable of pointing (designating) a position on a screen. Specifically, when a player presses a predetermined operation component on the remote controller in a state where the player orients the remote controller toward the screen, the coordinate input is performed. The input coordinate position is determined as a position pointed on the screen by the remote controller. When the remote controller is used, a state in which the predetermined operation component is pressed is the inputted state, and a state in which the predetermined operation component is not pressed is the non-inputted state. When a player changes the pointed position on the screen while pressing the predetermined operation component, the input coordinate position is changed. The first aspect includes the feature that the imaging direction of the virtual camera is changed based on the change of the input coordinate position.

In the computer-readable storage medium having stored therein the information processing program according to a second aspect of the present invention, the first camera orientation change means changes the imaging direction of the virtual camera by rotating the virtual camera in a direction based on a direction in which the input coordinate position is changed that is designated on the coordinate input means immediately before the coordinate input means enters the non-inputted state. In this configuration, a direction in which the imaging direction of the virtual camera is changed can be determined according to an operation performed immediately before the non-inputted state.

In the computer-readable storage medium having stored therein the information processing program according to a third aspect of the present invention, the first camera orientation change means changes the imaging direction of the virtual camera by rotating the virtual camera at an angular velocity based on a degree of change of the input coordinate position that is designated on the coordinate input means immediately before the coordinate input means enters the non-inputted state, and decelerating the angular velocity to zero over time. In this configuration, change of the imaging direction of the virtual camera is increased according to a degree of change of the input coordinate position. Therefore, the higher a speed of the sliding operation performed on the coordinate input means by a player, the greater the change of the imaging direction of the virtual camera. Therefore, a player adjusts a speed of the sliding operation, to enable adjustment of the degree of change of the imaging direction of the virtual camera. Further, the imaging direction of the virtual camera is changed such that the virtual camera gradually decelerates to sop. Therefore, also when a player does not perform an operation for stopping the change of the imaging direction of the virtual camera, the change of the imaging direction of the virtual camera can be stopped.

In the computer-readable storage medium having stored therein the information processing program according to a fourth aspect of the present invention, the first camera orientation change means stops changing the imaging direction in a case where the operation determination means determines that the non-inputted state shifts to the inputted state, while the first camera orientation change means is changing the imaging direction. In this configuration, the change of the imaging direction of the virtual camera can be stopped by a player performing coordinate input on the coordinate input means.

In the computer-readable storage medium having stored therein the information processing program according to a fifth aspect of the present invention, the computer is caused to further function as object positioning means for positioning a predetermined object in the virtual space. The first camera orientation change means decelerates the angular velocity at an increased deceleration rate in a case where the predetermined object is in the imaging direction, while the first camera orientation change means is changing the imaging direction. In this configuration, in a case where a configuration is used in which the change of the imaging direction of the virtual camera is stopped when, for example, a player performs a predetermined stopping operation, the player can easily perform the predetermined stopping operation at a time when an object is in the imaging direction of the virtual camera. Therefore, the imaging direction of the virtual camera can be easily set to the direction in which the object is displayed.

In the computer-readable storage medium having stored therein the information processing program according to a sixth aspect of the present invention, the computer is caused to further function as player object positioning means. The player object positioning means positions a player object in the virtual space. Further, the predetermined object is a specific non-player object which performs a predetermined action on the player object. In this configuration, when a specific non-player object which performs a predetermined action (for example, attacking action) on the player object, namely, a specific non-player object to be displayed, is in the imaging direction of the virtual camera, the imaging direction of the virtual camera is gradually changed. Therefore, in a case where a configuration is used in which the change of the imaging direction of the virtual camera is stopped when, for example, a player performs a predetermined stopping operation, the imaging direction of the virtual camera can be easily set to the direction in which the specific non-player object is displayed.

In the computer-readable storage medium having stored therein the information processing program according to a seventh aspect of the present invention, the computer is caused to further function as: shooting means; aim display means; and object positioning means. The shooting means virtually shoots from a predetermined shooting position in the virtual space. The aim display means displays, in the virtual image, an aim representing a shooting direction of the shooting means. The object positioning means positions an object in the virtual space. The first camera orientation change means decelerates the angular velocity at an increased deceleration rate when a predetermined object is positioned in the virtual image so as to be distant from a position of the aim by a predetermined or shorter distance.

In this configuration, when a predetermined object is positioned so as to be distant from the aim by a predetermined or shorter distance in the virtual image, the imaging direction of the virtual camera is gradually changed. Therefore, in a ease where a configuration is used in which the change of the imaging direction of the virtual camera is stopped when, for example, a player performs a predetermined stopping operation, the player can easily perform the predetermined stopping operation at a time when the aim and the predetermined object are superimposed on each other in the virtual image. Therefore, the imaging direction of the virtual camera is easily set such that the aim and the predetermined object are superimposed on each other in the virtual image.

In the computer-readable storage medium having stored therein the information processing program according to an eighth aspect of the present invention based on the sixth aspect, the computer is caused to further function as player object positioning means. The player object positioning means positions a player object in the virtual space. Further, the predetermined object is a specific non-player object which performs a predetermined action (for example, attacking operation) on the player object. In this configuration, the imaging direction of the virtual camera can be easily set such that the aim and the specific non-player object to be shot by the player character are superimposed on each other in the virtual image.

In the computer-readable storage medium having stored therein the information processing program according to a ninth aspect of the present invention based on the fourth aspect, the computer is caused to further function as player object positioning means. The player object positioning means positions a player object in the virtual space. The first camera orientation change means does not decelerate the angular velocity at an increased deceleration rate when the predetermined object is in the imaging direction in a case where a predetermined or greater number of objects are located in the virtual space so as to be distant from the player object by a predetermined or shorter distance, or so as to be distant from the virtual camera by a predetermined or shorter distance.

With the computer-readable storage medium having stored therein the information processing program according to the fifth aspect of the present invention, when an object is in the imaging direction of the virtual camera, the imaging direction of the virtual camera is gradually changed. When a lot of objects are located near the position of the virtual camera or near the position of the player object, the probability of objects being in the imaging direction of the virtual camera may be increased. Therefore, the change of the imaging direction of the virtual camera may be frequently decelerated at an increased deceleration rate, so that control for changing the imaging direction of the virtual camera is not effective. Therefore, with the information processing program according to the ninth aspect, in a case where a lot of objects are located near the player object or the virtual camera, even if the objects are in the imaging direction, the deceleration rate for decelerating the angular velocity is not increased, thereby preventing the problems as described above.

In the computer-readable storage medium having stored therein the information processing program according to a tenth aspect of the present invention, the first camera orientation change means decelerates the angular velocity at an increased deceleration rate in a case where the imaging direction is the same as a direction in which a player object is to advance, while the first camera orientation change means is changing the imaging direction. In this configuration, in a case where a configuration is used in which change of the imaging direction of the virtual camera is stopped when, for example, a player performs a predetermined stopping operation, the imaging direction of the virtual camera can be easily set to a direction in which the player object advances.

In the computer-readable storage medium having stored therein the information processing program according to an eleventh aspect of the present invention, the computer is caused to further function as: object positioning means; and second camera orientation change means. The object positioning means positions a predetermined object in the virtual space. The second camera orientation change means changes the imaging direction of the virtual camera, based on a change direction in which and a change amount by which the input coordinate position designated on the coordinate input means is changed, while the operation determination means determines that the coordinate input means is in the inputted state. The first camera orientation change means decelerates the angular velocity at an increased deceleration rate in a case where the predetermined object is in the imaging direction, while the first camera orientation change means is changing the imaging direction. The second camera orientation change means changes the imaging direction based on the change direction and the change amount, regardless of whether the predetermined object is in the imaging direction, while the second camera orientation change means is changing the imaging direction. In this configuration, a manner in which the imaging direction of the virtual camera is changed is different between in the inputted state and in the non-inputted state. Therefore, a player can select a desired imaging direction change method by changing an operation manner.

In the computer-readable storage medium having stored therein the information processing program according to a twelfth aspect of the present invention, the computer is caused to further function as instruction reception means. The instruction reception means receives, from a player, a setting change instruction for changing setting of a deceleration rate of the angular velocity. The first camera orientation change means changes the deceleration rate at which the angular velocity is decelerated, according to the setting change instruction received by the instruction reception means. In this configuration, the deceleration rate can be changed according to the setting change instruction from a player.

In the computer-readable storage medium having stored therein the information processing program according to a thirteenth aspect of the present invention, the first camera orientation change means changes, when the operation determination means determines that the coordinate input means is in the inputted state, the imaging direction of the virtual camera, based on change of the input coordinate position that is designated on the coordinate input means immediately before the operation determination means determines that the coordinate input means is in the inputted state. In this configuration, the imaging direction of the virtual camera is changed based on change of the input coordinate position that is designated on the coordinate input means immediately before the inputted state is determined. Specifically, the imaging direction of the virtual camera may be changed even in the inputted state in some cases, and a player is allowed to select, from among a plurality of operation manners, one operation manner according to the operability proper to the player, so as to change the imaging direction of the virtual camera.

In the computer-readable storage medium having stored therein the information processing program according to a fourteenth aspect of the present invention, the first camera orientation change means changes the imaging direction of the virtual camera within a predetermined range in the vertical direction in the virtual space. Further, the first camera orientation change means changes the imaging direction of the virtual camera in the horizontal direction in the virtual space without defining a change allowable range. If the imaging direction of the virtual camera can be changed without limit in both the vertical direction and the horizontal direction, a player may get camera sickness. Further, especially in a case where a ground is emulated in the virtual space, if change of the horizontal imaging direction is allowed without limit, a portion (such as sky, ceiling) vertically above the virtual space and/or a portion (ground) vertically below the virtual space are displayed, which may cause unnatural display.

In this configuration, a player is less likely to get camera sickness, and unnatural display of the virtual space can be effectively prevented.

In the computer-readable storage medium having stored therein the information processing program according to a fifteenth aspect of the present invention, the first camera orientation change means changes the imaging direction of the virtual camera within a predetermined range in the vertical direction in the virtual space, and restores the imaging direction of the virtual camera so as to orient the virtual camera toward a predetermined initial direction when the imaging direction of the virtual camera is changed beyond the predetermined range. In this configuration, when the imaging direction is changed beyond a predetermined range, the imaging direction can be changed so as to restore the orientation of the virtual camera to an initial orientation if a player does not perform an operation for changing the imaging direction to a direction desired by a player.

In the computer-readable storage medium having stored therein the information processing program according to a sixteenth aspect of the present invention, the computer is caused to function as: shooting means; aim display means; and aim moving means. The shooting means virtually shoots from a predetermined shooting position in the virtual space. The aim display means displays, in the virtual image, an aim representing a shooting direction of the shooting means. The aim moving means changes, when the operation determination means determines that the coordinate input means is in the non-inputted state, a position of an aim object within a predetermined range in the virtual space, based on change of the input coordinate position that is designated on the coordinate input means immediately before the coordinate input means enters the non-inputted state. The first camera orientation change means changes the imaging direction of the virtual camera after the aim is moved beyond the predetermined range, in a case where the operation determination means determines that the coordinate input means is in the non-inputted state.

In this configuration, the imaging direction of the virtual camera as well as the position of the aim object can be changed, based on change of an input coordinate position that is designated on the coordinate input means immediately before the non-inputted state. Therefore, both the position of the aim object and the imaging direction can be changed by one operation. Further, only after the aim object is moved beyond the movement allowable range, the imaging direction is changed. Specifically, the imaging direction is changed only when an operation immediately before the non-inputted state is an operation for moving the aim object beyond the movement allowable range. As described above, only the position of the aim object can be changed, or both the position of the aim object and the imaging direction can be changed, according to an operation performed on the coordinate input means by a player. Further, the aim object and the imaging direction are not simultaneously changed, so that a player can easily adjust the position of the aim object, and easily adjust the imaging direction.

Examples of a process of displaying the aim in the virtual image by the aim display means include a process of positioning an object of the aim in a view volume of the virtual camera in the virtual space. Other examples of the process of displaying the aim in the virtual image include a process of superimposing (combining) an image of the aim on (with) a projection image on which the virtual space is projected. The manner in which an image is combined with the projection image is a known manner, and detailed description thereof is riot given.

In the computer-readable storage medium having stored therein the information processing program according to a seventeenth aspect of the present invention, the computer is caused to further function as parameter calculation means. The parameter calculation means calculates a first control parameter based on change of the input coordinate position that is designated on the coordinate input means immediately before the coordinate input means enters the non-inputted state. The aim moving means moves the aim within the predetermined range in the virtual space based on the first control parameter, to change a position of the aim. The first camera orientation change means calculates a second control parameter obtained by eliminating, from the first control parameter, a component used for moving the aim object, and changes the imaging direction of the virtual camera based on the second control parameter having been calculated.

In this configuration, the first control parameter is calculated based on change of an input coordinate position that is designated on the coordinate input means immediately before the non-inputted state. The aim is moved to the boundary of the movement allowable range based on the first control parameter. Only when the first control parameter obtained by eliminating a component used for moving the aim to the boundary of the movement allowable range does not indicate zero, the imaging direction is changed.

In the computer-readable storage medium having stored therein the information processing program according to an eighteenth aspect of the present invention, the computer is caused to further function as second camera orientation change means. The second camera orientation change means changes the imaging direction of the virtual camera while the operation determination means determines that the coordinate input means is in the inputted state. The aim moving means changes a position of the aim within the predetermined range based on a change direction in which and a change amount by which the input coordinate position designated on the coordinate input means is changed, when the operation determination means determines that the coordinate input means is in the inputted state. The second camera orientation change means changes the imaging direction of the virtual camera, based on the change direction in which and the change amount by which the input coordinate position is changed that is designated on the coordinate input means immediately before the inputted-state is determined, after an aim object is moved beyond the predetermined range, in a case where the operation determination means determines that the coordinate input means is in the inputted state.

In this configuration, also when the operation determination means determines that the coordinate input means is in the inputted state, the position of the aim in the virtual image and the imaging direction of the virtual camera can be changed based on the change direction in which and the change amount by which the input coordinate position is changed. Therefore, a player is allowed to select, from among a plurality of operation manners, one operation manner according to the operability proper to the player, so as to change the position of the aim and/or the imaging direction of the virtual camera.

In the computer-readable storage medium having stored therein the information processing program according to a nineteenth aspect of the present invention, the shooting means virtually shoots in the virtual space when the operation means receives a shooting instruction from a player. The aim moving means moves the aim to a predetermined initial position when the operation means does not receive coordinate input and/or the shooting instruction for a predetermined time period after the aim is moved. In this configuration, when the operation means does not receive coordinate input and/or the shooting instruction for a predetermined time period, the aim is automatically moved to a predetermined initial position if a player does not perform a special operation.

In the computer-readable storage medium having stored therein the information processing program according to a twentieth aspect of the present invention, the computer is caused to further function as aim elimination means. The aim elimination means performs an elimination process so as to prevent the aim from being displayed by the display means, when the operation means does not receive coordinate input and/or the shooting instruction for the predetermined time period after the aim is moved. In this configuration, when the operation means does not receive coordinate input and/or the shooting instruction for a predetermined time period, namely, when it is assumed that the aim is unnecessary, the aim is automatically eliminated.

In the computer-readable storage medium having stored therein the information processing program according to a twenty-first aspect of the present invention, the aim elimination means performs a process for displaying the aim by the display means again when the operation means receives coordinate input and/or the shooting instruction after the elimination process is performed.

In this configuration, even if the aim is not displayed, when the operation means receives coordinate input and/or the shooting instruction, namely, when it is assumed that the display of the aim is necessary, the aim is automatically displayed again by the display means. At this time, the aim is displayed at an initial position. When the display of the aim is once eliminated, and thereafter the aim is displayed again, the state (the displayed area and the position of the character) of the virtual space displayed is likely to be changed. Therefore, if the position of the aim is restored to the initial position, a player can easily change the position of the aim according to the state of the virtual space. Therefore, with the information processing program according to the twenty-first aspect, a player can easily move the aim to a desired position according to the virtual space displayed after the redisplay of the aim.

In the computer-readable storage medium having stored therein the information processing program according to a twenty-second aspect of the present invention, the computer is caused to function as parameter calculation means. The parameter calculation means calculates, when the operation determination means determines that the coordinate input means is in the inputted state, a first control parameter based on a difference between the most recent input coordinate position and the input coordinate position immediately preceding the most recent input coordinate position. On the other hand, the parameter calculation means calculates, when the operation determination means determines that the coordinate input means is in the non-inputted state, an average of each difference between two contiguous input coordinate positions among a plurality of previous input coordinate positions which are obtained immediately before the coordinate input means enters in the non-inputted state, to calculate the first control parameter based on the average of each difference. Further, the first camera orientation change means changes the imaging direction of the virtual camera based on the first control parameter.

In this configuration, the method for calculating the first control parameter used for moving the aim and changing the imaging direction is different between in the inputted state and in the non-inputted state. Therefore, a player can change a manner in which the aim is moved and the imaging direction is changed, by changing the operation manner.

In the computer-readable storage medium having stored therein the information processing program according to a twenty-third aspect of the present invention, the computer is caused to further function as: continuous input determination means; and zooming-in-on process means. The continuous input determination means determines whether a continuous input is received that is an intermittent coordinate input which is performed on the coordinate input means a predetermined number of times within a predetermined time period, when the operation determination means determines that the coordinate input means is in the inputted state. The zooming-in-on process means performs a zooming-in-on process when the continuous input determination means determines that the continuous input is received. In this configuration, an imaging subject to be displayed in the virtual space can be zoomed in on by a player performing an easy operation, that is, a continuous input.

In the computer-readable storage medium having stored therein the information processing program according to a twenty-fourth aspect of the present invention, the computer is caused to further function as restoration-to-default instruction reception means. The restoration-to-default instruction reception means receives a restoration-to-default instruction for restoring the imaging direction and a position of the virtual camera to a default state. The first camera orientation change means changes the imaging direction of the virtual camera so as to orient the virtual camera toward a predetermined initial direction, and changes the position of the virtual camera to a predetermined initial position, when the restoration-to-default instruction reception means receives the restoration-to-default instruction. In this configuration, the imaging direction of the virtual camera can be changed so as to orient the virtual camera toward an initial orientation, and the position of the virtual camera can be changed to an initial position by a player simply performing the restoration-to-default operation.

A computer-readable storage medium having stored therein a program according to another embodiment of the present invention causes a computer to further function as player object positioning means. The first camera orientation change means changes an imaging direction so as to rotate a point of view of a virtual camera about a position of a player object positioned in the virtual space or a position of a virtual camera. In this configuration, the virtual camera may be rotated about the position of the player object so as to change the point of view of the virtual camera, in some cases. In this case, the virtual camera is rotated about the player object so as to change the position of the virtual camera, and the point of view of the virtual camera is oriented toward the player object. Thus, the imaging direction of the virtual camera can be changed while a player object is being constantly displayed by using the virtual camera. Further, in this configuration, the point of view of the virtual camera may be changed so as to rotate about the position of the virtual camera, in some cases. In this case, the point of view of the virtual camera is changed in a state where the position of the virtual camera is not changed. Thus, the imaging direction of the virtual camera can be changed while maintaining the position of the virtual camera.

A computer-readable storage medium having stored therein a program according to still another embodiment of the present invention causes a computer to further function as non-player object positioning means. The non-player object positioning means positions a non-player object in a virtual space. The first camera orientation change means decelerates an angular velocity at an increased deceleration rate when a predetermined non-player object is positioned within a predetermined angular range which includes, at the center thereof, a straight line extending from a position of the virtual camera in the imaging direction in the virtual space.

In this configuration, when a non-player object is positioned within the imaging range (within the view volume) of the virtual camera or near the imaging range, the imaging direction of the virtual camera is gradually changed. Therefore, in a case where a configuration is used in which the change of the imaging direction of the virtual camera is stopped when, for example, a player performs a predetermined stopping operation, a player can easily perform the predetermined stopping operation at a time when the non-player object is positioned in the view volume of the virtual camera. Therefore, the imaging direction of the virtual camera can be changed to the direction in which the non-player object is displayed.

A computer-readable storage medium having stored therein a program according to still another embodiment of the present invention causes a computer to further function as player object positioning mean. The player object positioning means positions a player object in the virtual space. The first camera orientation change means decelerates the angular velocity at an increased deceleration rate when the virtual camera is positioned on a predetermined path defined in the virtual space, and the imaging direction of virtual camera is oriented toward the path from the position of the virtual camera.

In this configuration, when the virtual camera is on the path, and the imaging direction of the virtual camera is oriented to the path from the position of the virtual camera, the imaging direction of the virtual camera is gradually changed. Therefore, in a case where a configuration is used in which the change of the imaging direction of the virtual camera is stopped when, for example, a player performs a predetermined stopping operation, the player can easily perform the predetermined stopping operation at a time when the imaging direction of the virtual camera is oriented toward the path. Therefore, the virtual space in the direction of the path can be easily displayed.

An information processing apparatus according to a twenty-fifth aspect of the present invention can use display means and coordinate input means, and includes: virtual camera positioning means; virtual image generation means; display process means; operation determination means; and first camera orientation change means. Further, an information processing system according to a twenty-sixth aspect of the present invention can use display means and coordinate input means, and includes: virtual camera positioning means; virtual image generation means; display process means; operation determination means; and first camera orientation change means.

The virtual camera positioning means positions a virtual camera in a virtual space. The virtual image generation means takes an image of the virtual space by using the virtual camera, to generate a virtual image. The display process means displays, by using the display means, the virtual image generated by the virtual image generation means. The operation determination means determines whether the coordinate input means is in an inputted state in which a player is performing coordinate input on the coordinate input means, or in a non-inputted state in which a player is not performing coordinate input on the coordinate input means, based on an output signal from the coordinate input means. The first camera orientation change means changes, when the operation determination means determines that the coordinate input means is in the non-inputted state, an imaging direction of the virtual camera, based on change of an input coordinate position that is designated on the coordinate input means immediately before the coordinate input means enters the non-inputted state.

In this configuration, the same function and effect as those of the computer-readable storage medium having stored therein the information processing program according to the first aspect can be obtained.

An information processing method according to a twenty-seventh aspect of the present invention includes: camera positioning step; virtual image generation step; display step; operation determination step; and imaging direction change step. In the camera positioning step, virtual camera positioning means positions a virtual camera in a virtual space. In the virtual image generation step, virtual image generation means takes an image of the virtual space by using the virtual camera, to generate a virtual image. In the display step, display process means displays, by using display means, the virtual image generated by the virtual image generation means. In the operation determination step, operation determination means determines whether coordinate input means is in an inputted state in which a player is performing coordinate input on the coordinate input means, or in a non-inputted state in which a player is not performing coordinate input on the coordinate input means, based on an output signal from the coordinate input means. In the imaging direction change step, first camera orientation change means changes, when the operation determination means determines that the coordinate input means is in the non-inputted state, an imaging direction of the virtual camera, based on change of an input coordinate position that is designated on the coordinate input means immediately before the coordinate input means enters the non-inputted state.

In this configuration, the same function and effect as those of the computer-readable storage medium having stored therein the information processing program according to the first aspect can be obtained.

According to the present invention, the orientation of the virtual camera is changed when no coordinate input is performed (for example, when no touch is performed). Therefore, the operation (for example, touch operation) for coordinate input need not be frequently performed in order to change the orientation of the virtual camera, thereby providing an interface having an improved operability.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
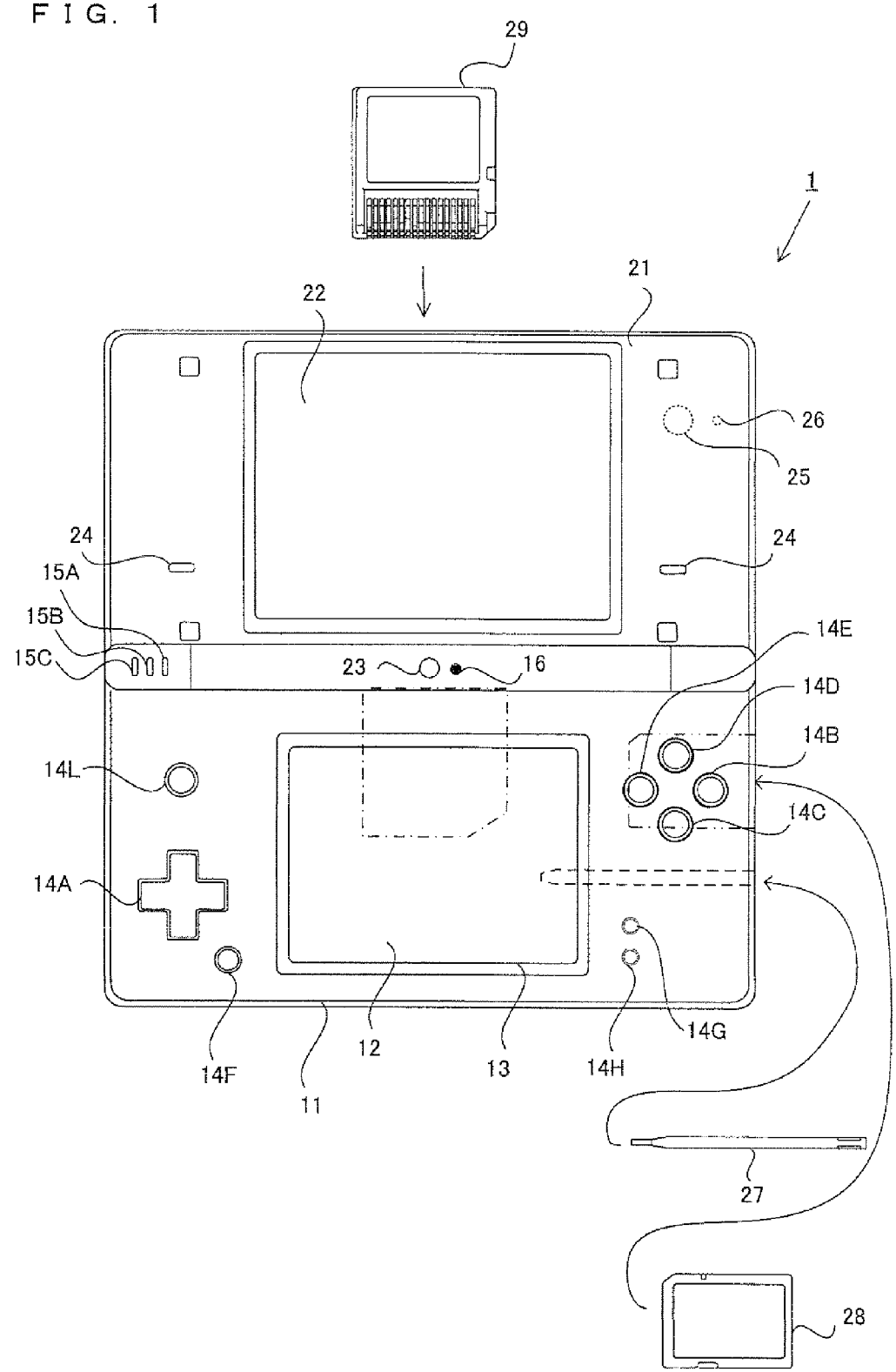
FIG. 1 is an external view of a game apparatus according to one embodiment of the present invention.

Hereinafter, a game apparatus according to one embodiment to which the present invention is applied will be described with reference to the drawings. The game apparatus of the present embodiment typifies an information processing apparatus of the present invention. The game apparatus of the present embodiment includes a touch panel (an example of coordinate input means). A game used in the present embodiment is a shooting game represented in a three-dimensional virtual space. In the game of the present embodiment, basically, a game image taken by a virtual camera positioned behind a player character (player object) is displayed, thereby progressing the game (a so-called TPS (Third Person Shooting Game)). The virtual camera is provided such that an orientation (imaging direction) of the virtual camera positioned in the three-dimensional virtual space can be changed according to an operation performed on the touch panel by a player.

In the present embodiment, the first feature is that, while a player is performing sliding operation on a touch panel, an orientation of the virtual camera is changed according to a sliding amount of the sliding operation, and further the orientation of the virtual camera may be changed in some cases when the player is not performing touch operation on the touch panel. The sliding operation herein is an operation of changing, after a player touches on the touch panel, a touched position while the player is continuously touching on the touch panel. Namely, the first feature is that, when the player touches off the touch panel after the sliding operation, the orientation of the virtual camera is changed due to inertial force after the touch-off according to the sliding operation (sliding direction, sliding speed; at least sliding direction) performed immediately before the touch-off. In the present embodiment, "touch-off the touch panel" means that "move away from the touch panel", and "touch-off" is also referred to as "slide-off". However, as described below, when a player touches off the touch panel after the sliding operation is stopped at a fixed touch position at the end of the sliding operation, the orientation of the virtual camera is not changed due to inertial force. In the present embodiment, "touch-on" represents a time point when the non-touched state has shifted to the touched state, whereas "touch-off" also represents a time point when the touched state has shifted to the non-touched state.

Further, in the present embodiment, the second feature is that a screen is zoomed in on when, for example, an angle of view of the virtual camera is changed by a player performing double-tapping operation at a position desired by the player within a predetermined area (for example, an entire surface of the screen) of the touch panel. The "double-tapping operation" (continuous input) is a touch operation (coordinate input) which is intermittently performed by a player a predetermined number of times (for example, twice) within a predetermined time period. For example, the "double-tapping operation" means that, within a predetermined time period after the first touch operation, the second touch operation is performed. Further, when, in addition to the condition described above, the condition is satisfied that a position on which the second touch operation is performed is distant, by a predetermined or shorter distance, from a position on which the first touch operation is performed, the double-tapping operation may be detected. Further, in the present embodiment, "zoom in on" is simply referred to as "zoom".

Moreover, in the present embodiment, description is given based on the shooting game as described above, and an aim representing a shooting direction in which a player is to shoot is indicated on a game screen. In the present embodiment, the third feature is that a position of the aim is changed from the default position according to the sliding operation performed by a player on the touch panel.

Hereinafter, a configuration of a game apparatus 1 according to the present embodiment will be described with reference to FIG. 1 and FIG. 2. FIG. 1 is an external view of a game apparatus according to one embodiment of the present invention. The game apparatus functions as an information processing apparatus of the present invention by executing a program of the present invention.

As shown in FIG. 1, the game apparatus 1 is a hand-held foldable game apparatus. FIG. 1 shows the game apparatus 1 in opened state. The game apparatus 1 has such a size as to be held by both hands or one hand of a player even in the opened state.

The game apparatus 1 includes a lower housing 11 and an upper housing 21. The lower housing 11 and the upper housing 21 are connected to each other so as to be openable and closable (foldable). In the example shown in FIG. 1, the lower housing 11 and the upper housing 21 are each formed in a horizontally long plate-like rectangular shape, and are connected to each other at long side portions thereof so as to be pivotable with respect to each other. A player normally uses the game apparatus 1 in the opened state. Further, when the game apparatus 1 is not used, a player can keep the game apparatus 1 in closed state. Further, as shown in the example of FIG. 1, in addition to the closed state and the opened state, the game apparatus 1 is structured such that the lower housing 11 and the upper housing 21 can be held so as to form any angle between an angle of the closed state and an angle of the opened state due to, for example, frictional force generated at a connection portion. In other words, the upper housing 21 can be stationary at any angle with respect to the lower housing 11.

The lower housing 11 is provided with a lower LCD (liquid crystal display) 12. The lower LCD 12 has a horizontally long shape, and is located such that a long side direction thereof corresponds to a long side direction of the lower housing 11. Although an LCD is used as a display device incorporated in the game apparatus 1 in the present embodiment, any other display device such as a display device using EL (Electro Luminescence), or the like may be used. In addition, a display device having any resolution may be used for the game apparatus 1. As described below in detail, the lower LCD 12 is mainly used for displaying, in real time, an image taken by an inner camera 23 or an outer camera 25.

On the lower housing 11, operation buttons 14A to 14K, an analog operation component 14L, and a touch panel 13 are provided as input devices. As shown in FIG. 1, among the operation buttons 14A to 14K, the direction input button 14A, the operation button 14B, the operation button 14C, the operation button 14D, the operation button 14E, the power button 14F, the start button 14G and the selection button 14H are provided on an inner main surface of the lower housing 11 which is located inside when the upper housing 21 and the lower housing 11 are folded. The direction input button 14A is used for, for example, a selection operation and the like. The operation buttons 14B to 14E are used for, for example, a determination operation, a cancellation operation, and the like. The power button 14F is used for turning on or off the power of the game apparatus 1. In the example shown in FIG. 1, the direction input button 14A and the power button 14F are provided on the inner main surface of the lower housing 11 and to one of the left or the right of (in FIG. 1, to the left of) of the lower LCD 12 provided in the vicinity of the center of the inner main surface of the lower housing 11. Further, the operation buttons 14B to 14E, the start button 14G, and the selection button 14H are provided on the inner main surface of the lower housing 11 and to the other of the left or the right of (in FIG. 1, to the right of) of the lower LCD 12. The direction input button 14A, the operation buttons 14B to 14E, the start button 14G, and the selection button 14H are used for various operations performed on the game apparatus 1.

Although the operation buttons 14I to 14K are not indicated in FIG. 1, for example, the L button 14I is provided at a left end portion of an upper side surface of the lower housing 11, and the R button 14J is provided at a right end portion of the upper side surface of the lower housing 11. The L button 14I and the R button 14J are used for, for example, a photographing instruction operation (shutter operation) performed on the game apparatus 1. The game apparatus 1 executes a shooting game as described above, and the L button 14I is used so as to allow a player to perform a shooting operation. In addition, the sound volume button 14K is provided on a left side surface of the lower housing 11. The sound volume button 14K is used for adjusting sound volume of speakers of the game apparatus 1.

Further, the game apparatus 1 includes the analog operation component 14L. The analog operation component 14L is, for example, a joystick which can be tilted in a direction represented by, for example, 360 degrees, and outputs an operation signal according to a tilt direction and a tilted amount. In the present embodiment, the analog operation component 14L is a slidable joystick (hereinafter, referred to as a joystick). The analog operation component 14L receives, from a player, an operation for changing a position of a player character in a virtual space, so that the game apparatus 1 moves the player character according to a sliding direction in which and a sliding amount at which the slide stick is slid.

Furthermore, the game apparatus 1 includes the touch panel 13 as another input device in addition to the operation buttons 14A to 14K, and the analog operation component 14L. The touch panel 13 is mounted on the lower LCD 12 so as to cover the screen of the lower LCD 12. In the present embodiment, the touch panel 13 is, but is not limited to, a resistive film type touch panel. As the touch panel 13, any press-type touch panel may be used. The touch panel 13 used in the present embodiment has the same resolution (detection accuracy) as, for example, that of the lower LCD 12. However, the resolution of the touch panel 13 and that of the lower LCD 12 may not necessarily be the same with each other.

In the present embodiment, the touch panel 13 receives, from a player, an instruction for changing a position of an aim, and an instruction for changing an orientation and a position of the virtual camera. A method for changing a position of the aim, and a method for changing an orientation and a position of the virtual camera based on the operation on the touch panel 13 will be specifically described below in detail.

In a right side surface of the lower housing 11, an insertion opening (indicated by a dashed line FIG. 1) is formed. Inside insertion opening, a touch pen 27 which is used for performing an operation on the touch panel 13 can be accommodated. Although an input onto the touch panel 13 is usually performed using the touch pen 27, a finger of a player as well as the touch pen 27 can be used for operating the touch panel 13.

In the right side surface of the lower housing 11, an insertion opening (indicated by an alternate long and two short dashes line in FIG. 1) is formed for accommodating a memory card 28. Inside the insertion opening, a connector (not shown) is provided for electrically connecting between the game apparatus 1 and the memory card 28. The memory card 28 is, for example, an SD (Secure Digital) memory card, and detachably mounted on the connector. The memory card 28 is used for, for example, recording (storing) an image taken by the game apparatus 1, and loading an image generated by another apparatus into the game apparatus 1.

Further, in the upper side surface of the lower housing 11, an insertion opening (indicated by an alternate long and shot dash line in FIG. 1) is formed for accommodating a cartridge 29. Inside the insertion opening, a connector (not shown) is provided for electrically connecting between the game apparatus 1 and the cartridge 29. The cartridge 29 is a storage medium storing a game program and the like, and detachably mounted in the insertion opening formed in the lower housing 11.

Three LEDs 15A to 15C are mounted on a left side part of the connection portion where the lower housing 11 and the upper housing 21 are connected to each other. The game apparatus 1 is capable of performing wireless communications with another apparatus. The first LED 15A is lit up while the power of the game apparatus 1 is ON. The second LED 15B is lit up while the game apparatus 1 is being charged. The third LED 15C is lit up while wireless communications are established. Thus, by the three LEDs 15A to 15C, notification about a state of ON/OFF of the power of the game apparatus 1, a state of charge of the game apparatus 1, and a state of communications establishment of the game apparatus 1 can be made to a player.

Meanwhile, on the upper housing 21, an upper LCD 22 is provided. The upper LCD 22 has a horizontally long shape, and is located such that a long side direction thereof corresponds to a long side direction of the upper housing 21. Similarly to the lower LCD 12, a display device of another type may be used instead of the upper LCD 22, and the display device having any resolution may be used. A touch panel may be provided so as to cover the upper LCD 22. On the upper LCD 22, for example, an operation explanation screen for indicating to a player roles of the operation buttons 14A to 14K, the analog operation component 14L, and the touch panel 13 is displayed.

In the upper housing 21, two cameras (the inner camera 23 and the outer camera 25) are provided. As shown in FIG. 1, the inner camera 23 is mounted in an inner main surface in the vicinity of the connection portion of the upper housing 21. On the other hand, the outer camera 25 is mounted in a surface reverse of the main inner surface in which the inner camera 23 is mounted, namely, in an outer main surface of the upper housing 21 (which is the surface located on the outside of the game apparatus 1 in the closed state, and the back surface of the upper housing 21 shown in FIG. 1). In FIG. 1, the outer camera 25 is indicated by a dashed line. Thus, the inner camera 23 is capable of taking an image in a direction in which the inner main surface of the upper housing 21 faces, and the outer camera 25 is capable of taking an image in a direction opposite to an imaging direction of the inner camera 23, namely, in a direction in which the outer main surface of the upper housing 21 faces. Thus, in the present embodiment, the two cameras, that is, the inner camera 23 and the outer camera 25 are provided such that the imaging directions thereof are opposite to each other. For example, a player can take, by the inner camera 23, an image of a view as seen from the game apparatus 1 toward the player, and take, by the outer camera 25, an image of a view as seen from the game apparatus 1 in a direction opposite to a direction toward the player.

In the inner main surface in the vicinity of the connection portion, a microphone (a microphone 41 shown in FIG. 2) is accommodated as a voice input device. In the inner main surface in the vicinity of the connection portion, a microphone hole 16 is formed to allow the microphone 41 to detect sound outside the game apparatus 1. The position in which the microphone 41 is accommodated and the position of the microphone hole 16 are not necessarily on the inner main surface in the vicinity of the connection portion. For example, the microphone 41 may be accommodated in the lower housing 11, and the microphone hole 16 may be formed in the lower housing 11 so as to correspond to the position in which the microphone 41 is accommodated.

In the outer main surface of the upper housing 21, a fourth LED 26 (indicated by a dashed line in FIG. 1) is mounted. The fourth LED 26 is lit up at a time when photographing is performed (when the shutter button is pressed) by the outer camera 25. Further, the fourth LED 26 is lit up while a moving picture is being taken by the outer camera 25. By the fourth LED 26, an object person whose image is taken and people around the object person can be notified of photographing having been performed (being performed) by the game apparatus 1.

Further, sound holes 24 are formed in the inner main surface of the upper housing 21 to the left and the right, respectively, of the upper LCD 22 provided in the vicinity of the center of the inner main surface of the upper housing 21. The speakers are accommodated in the upper housing 21 and at the back of the sound holes 24. Through the sound holes 24, sound is released from the speakers to the outside of the game apparatus 1.

As described above, the inner camera 23 and the outer camera 25 which are components for taking an image, and the upper LCD 22 which is display means for displaying, for example, the operation explanation screen at the time of photographing are provided in the upper housing 21. On the other hand, the input devices (the touch panel 13, the operation buttons 14A to 14K, and the analog operation component 14L) for performing an operation input on the game apparatus 1, and the lower LCD 12 which is display means for displaying the game screen are provided in the lower housing 11. Accordingly, when using the game apparatus 1, a player can hold the lower housing 11 and perform an input on the input device while seeing a taken image (an image taken by one of the cameras) displayed on the lower LCD 12.

Next, an internal configuration of the game apparatus 1 will be described with reference to FIG. 2. FIG. 2 is a block diagram illustrating an exemplary internal configuration of the game apparatus 1.

Figure 2:
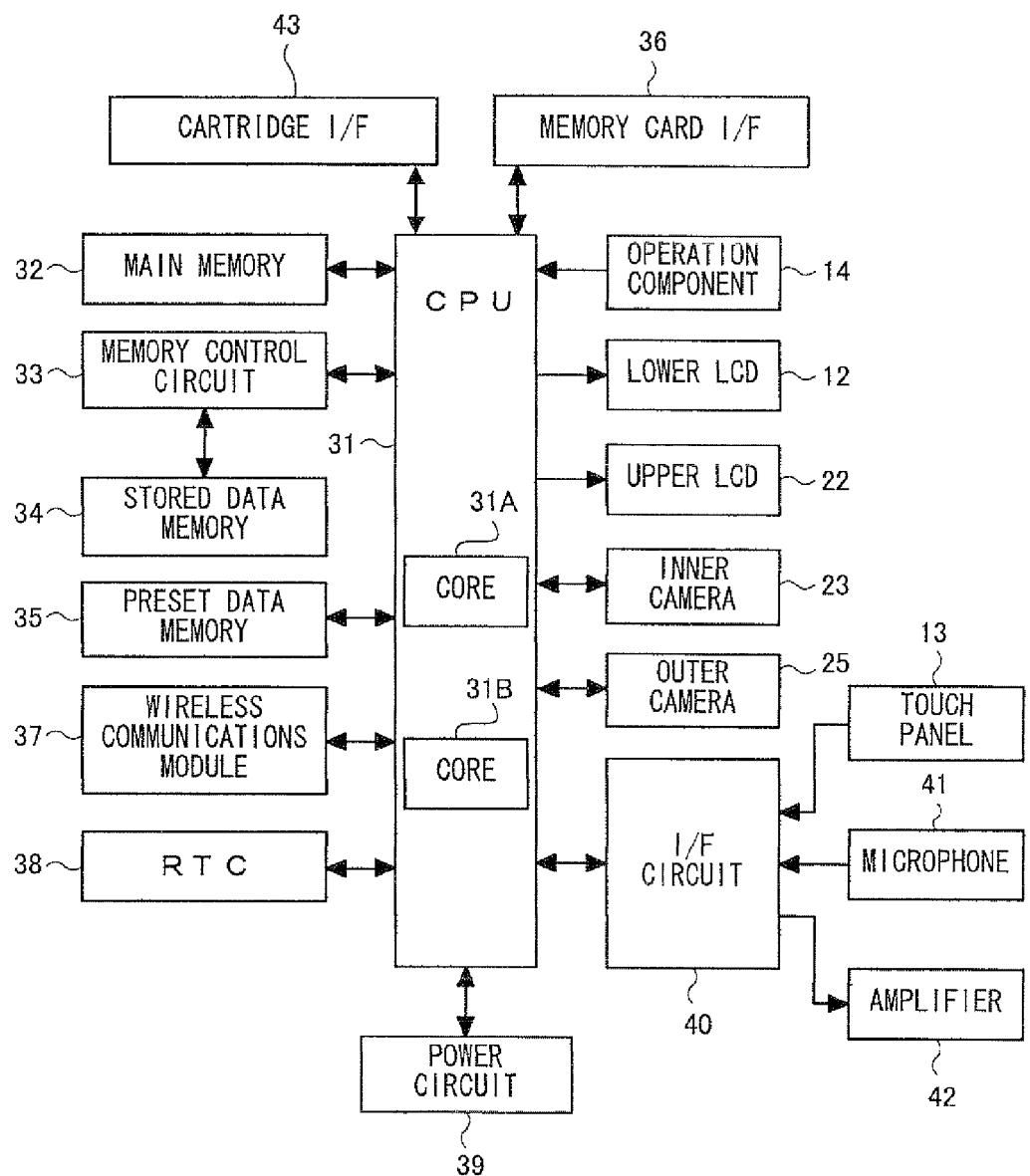
FIG. 2 is a block diagram illustrating an exemplary internal configuration of the game apparatus.

As shown in FIG. 2, the game apparatus 1 includes electronic components including a CPU (Central Processing Unit) 31, a main memory 32, a memory control circuit 33, a stored data memory 34, a preset data memory 35, a memory card interface (memory card I/F) 36 and a cartridge I/F 43, a wireless communications module 37, a real time clock (RTC) 38, a power circuit 39, an interface circuit (I/F circuit) 40, and the like. These electronic components are mounted on an electronic circuit substrate and accommodated in the lower housing 11 (or may be accommodated in the upper housing 21).

The CPU 31 is information processing means for executing a predetermined program (including an information processing program of the present invention). The CPU 31 includes a core 31A for executing processes associated with communications, and a core 31B for executing applications. In the present embodiment, a predetermined program is stored in a memory (e.g. the stored data memory 34) within the game apparatus 1 or in the memory card 28 and/or the cartridge 29. The core 31A executes the predetermined program to perform a portion of the communications process.

Further, the core 31B executes the predetermined program to perform a predetermined game process. The predetermined game process includes a process of generating game image data. More specifically, the core 31B performs, as the process of generating the game image data, a calculation process necessary for displaying 3D graphics such as modeling process, a process of setting a virtual camera and a light source, and a rendering process, to generate the game image data every predetermined time period (for example, every 1/60 seconds) and writes the game image data in a VRAM area of the main memory 32. The predetermined game process includes a main process. The main process will be described below in detail with reference to FIG. 24.

In the present embodiment, the core 31A is dedicated to the communications process, and the game apparatus 1 can communicate with another game apparatus regardless of execution of an application also while the core 31B is performing the application. It is to be noted that a program executed by the CPU 31 may be stored in advance in a memory within the game apparatus 1, may be obtained from the memory card 28 and/or the cartridge 29, or may be obtained from another apparatus through communications with the other apparatus. For example, the program may be downloaded via the Internet from a predetermined server, or may be obtained by downloading a predetermined program stored in a stationary game apparatus through communications with the stationary game apparatus.

The main memory 32, the memory control circuit 33, and the preset data memory 35 are connected to the CPU 31. The stored data memory 34 is connected to the memory control circuit 33. The main memory 32 is storage means used as a work area and a buffer area of the CPU 31. In other words, the main memory 32 stores various data used for the process performed by the CPU 31, and also stores a program obtained from the outside (the memory cards 28, the cartridge 29, other apparatuses, and the like). The main memory 32 includes a VRAM area used for performing screen display. In the present embodiment, for example, a PSRAM (Pseudo-SRAM) is used as the main memory 32. The stored data memory 34 is storage means for storing, for example, a program executed by the CPU 31, and data of images taken by the inner camera 23 and the outer camera 25. The stored data memory 34 is implemented as a nonvolatile storage medium, for example, as a NAND flash memory, in the present embodiment. The memory control circuit 33 is a circuit for controlling reading of data from the stored data memory 34 or writing of data in the stored data memory 34, according to an instruction from the CPU 31. The preset data memory 35 is storage means for storing data (preset data) of various parameters and the like which are set in advance in the game apparatus 1. A flash memory connected to the CPU 31 via an SPI (Serial Peripheral Interface) bus can be used as the preset data memory 35.

The memory card I/F 36 is connected to the CPU 31. The memory card I/F 36 reads data from the memory card 28 mounted on the connector or writes data in the memory card 28 according to an instruction from the CPU 31. In the present embodiment, data of images taken by the outer camera 25 is written in the memory card 28, and image data stored in the memory card 28 is read from the memory card 28 to be stored in the stored data memory 34, for example.

The cartridge I/F 43 is connected to the CPU 31. The cartridge I/F 43 reads data from the cartridge 29 mounted on the connector or writes data in the cartridge 29 according to an instruction from the CPU 31. In the present embodiment, an application program is read from the cartridge 29 to be executed by the CPU 31, and data regarding the application program (e.g. saved data for a game and the like) is written in the cartridge 29.

The wireless communications module 37 has a function for connecting to a wireless LAN by, for example, a method compliant with the IEEE802.11.b/g standard. The wireless communications module 37 is connected to the core 31A. The core 31A is capable of receiving data from and transmitting data to another apparatus using the wireless communications module 37 via the Internet or without using the Internet.

Further, the wireless communications module 37 has a function of performing wireless communications with the same type of game apparatus in a predetermined communications method. Radio wave used in the wireless communications is weak radio wave which, for example, requires no license from wireless stations, and the wireless communications module 37 performs short distance wireless communications within a range of data transmission distance of 10 m, for example. Therefore, when the core 31A is located within a range in which the game apparatus 1 and another game apparatus 1 can make communications with each other (for example, when a distance between two apparatuses is less than or equal to 10 m), the core 31A enables data transmission to and data reception from the other game apparatus 1 by using the wireless communications module 37. The data transmission and data reception are performed when an instruction is issued from a player. Further, the data transmission and data reception are automatically performed repeatedly at predetermined time intervals regardless of an instruction from a player.

Further, the RTC 38 and the power circuit 39 are connected to the CPU 31. The RTC 38 counts a time, and outputs the time to the CPU 31. For example, the CPU 31 is capable of calculating a current time (date) and the like based on the time counted by the RTC 38. The power circuit 39 controls electric power from a power supply (typically, a battery accommodated in the lower housing 11) of the game apparatus 1 to supply the electric power to each component of the game apparatus 1.

The game apparatus 1 includes the microphone 41 and an amplifier 42. The microphone 41 and the amplifier 42 are connected to the I/F circuit 40. The microphone 41 detects voice produced by a player toward the game apparatus 1, and outputs, to the I/F circuit 40, a sound signal indicating the voice. The amplifier 42 amplifies the sound signal from the I/F circuit 40, and causes the speakers (not shown) to output the sound signal. The I/F circuit 40 is connected to the CPU 31.

The touch panel 13 is connected to the I/F circuit 40. The I/F circuit 40 includes a sound control circuit for controlling the microphone 41 and the amplifier 42 (the speakers), and a touch panel control circuit for controlling the touch panel 13. The sound control circuit performs A/D conversion and D/A conversion of the sound signal, and converts the sound signal into sound data in a predetermined format. The touch panel control circuit generates touch position data in a predetermined format based on a signal from the touch panel 13, and outputs the touch position data to the CPU 31. For example, the touch position data is data indicating a coordinate of a position at which an input is performed on an input surface of the touch panel 13. The touch panel control circuit reads a signal from the touch panel 13 and generates the touch position data every predetermined time period. The CPU 31 is capable of recognizing a position at which an input is performed on the touch panel 13 by obtaining the touch position data through the I/F circuit 40.

The operation component 14 includes the operation buttons 14A to 14K, and the analog operation component 14L, and is connected to the CPU 31. Operation information representing an input state of each of the operation buttons 14A to 14K and the analog operation component 14L (whether or not each of the operation buttons 14A to 14K and the analog operation component 14L is pressed) is outputted from the operation component 14 to the CPU 31. The CPU 31 obtains the operation information from the operation component 14, and performs a process according to an input performed on the operation component 14.

The inner camera 23 and the outer camera 25 are connected to the CPU 31. Each of the inner camera 23 and the outer camera 25 takes an image according to an instruction from the CPU 31, and outputs data of the taken image to the CPU 31. In the present embodiment, the CPU 31 issues an imaging instruction to one of the inner camera 23 or the outer camera 25, and the camera which has received the imaging instruction takes an image and transmits image data to the CPU 31.

The lower LCD 12 and the upper LCD 22 are connected to the CPU 31. Each of the lower LCD 12 and the upper LCD 22 displays an image thereon according to an instruction from the CPU 31.

Hereinafter, contents of the shooting game executed by the game apparatus 1 of the present embodiment will be described with reference to FIG. 3 to FIG. 22. In the shooting game, a plurality of stages are provided, and when a player clears one stage, the player can proceed to the subsequent stage. Further, two types of the stages, that is, an aerial battle stage and a ground battle stage are provided. In the aerial battle stage, a player character flies in a virtual space representing the air such as sky or outer space. In the ground battle stage, the player character walks or runs in a virtual space representing a land. In the aerial battle stage, a path on which the player character moves is previously defined, and the player character automatically moves along the path. The player character is allowed to move away from the path by a predetermined distance according to an operation performed by a player. On the other hand, in the ground battle stage, the player character does not automatically move, and freely moves according to an operation performed by the player. In each of the aerial battle stage and the ground battle stage, a start point and a goal (or criterion, such as a state in which a boss character is knocked down, for determining that the goal is reached) are defined in the virtual space. When the player character reaches the goal by a player performing a character movement operation for moving the player character from the start point to the goal, the game is cleared.

In the route from the start point up to the goal, enemy characters appear and attack. When a physical value of the player character becomes zero due to the attack of the enemy character, the game is ended. A player can perform operations for moving the player character, and can cause the player character to shoot at and defeat the enemy characters by issuance of instruction for shooting action, or to avoid attack from the enemy characters. The shooting direction is determined based on a position of the aim in the virtual space as described above.

The features of the present embodiment are that a position of the aim, and an orientation, a position, and an angle of view of the virtual camera are changed according to an operation performed on the touch panel 13 by a player. Hereinafter, the features of the present embodiment that a position of the aim, and an orientation, a position, and an angle of view of the virtual camera are changed will be described. Process of changing a position of the aim, and an orientation, a position, and an angle of view of the virtual camera are different between in the ground battle stage and in the aerial battle stage. Therefore, the process of changing a position of the aim, and an orientation, a position, and an angle of view of the virtual camera will be described separately for the ground battle stage and for the aerial battle stage.

(Change of Position of Aim in Ground Battle Stage During Sliding Operation)

Figure 3:
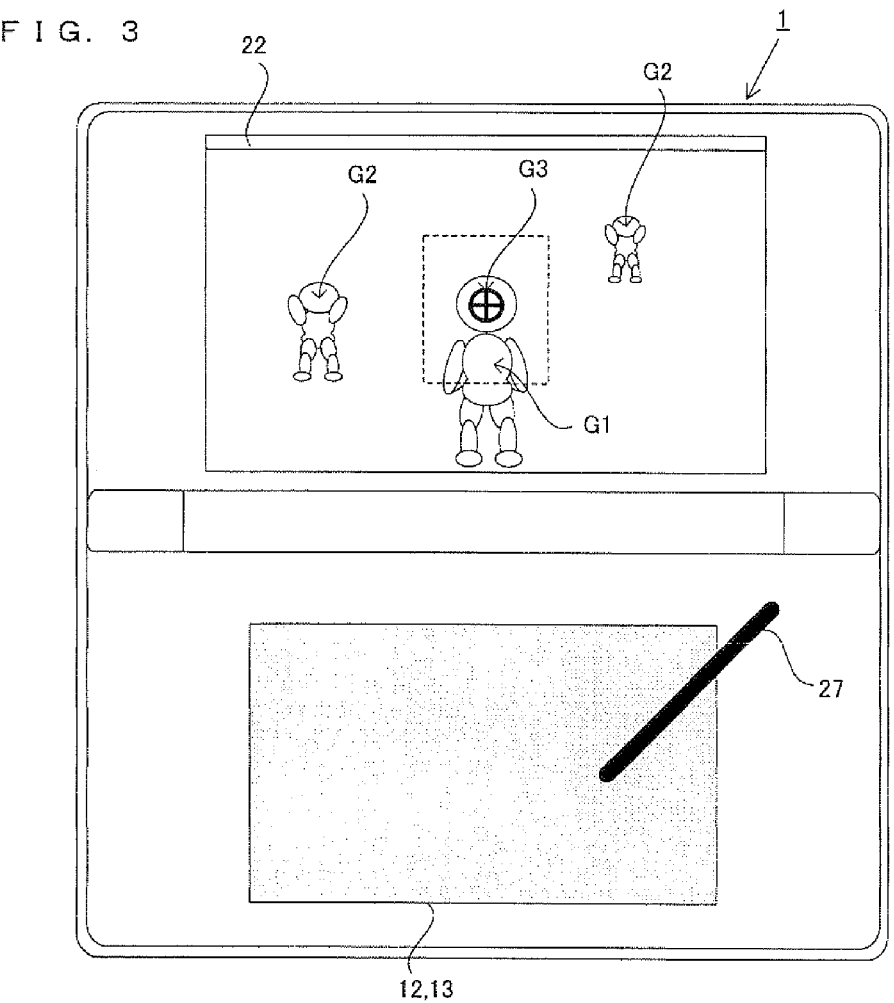
FIG. 3 is a diagram illustrating an exemplary display screen for a ground battle stage.

FIG. 3 is a diagram illustrating an exemplary display screen for the ground battle stage. In the ground battle stage, the virtual space as viewed from a virtual camera Ca (see FIG. 4) is displayed on the upper LCD 22. A player character G1, a plurality of enemy characters G2 which are non-player characters that attack the player character, and an aim G3 (a plate polygon object which is controlled so as to be constantly oriented toward the virtual camera) are positioned in the virtual space. Further, a background object representing the ground is positioned in the virtual space, which is not shown. In the ground battle stage, the player character G1 is able to freely move in the virtual space according to the character movement operation performed by a player using the analog operation component 14L.

Figure 4:
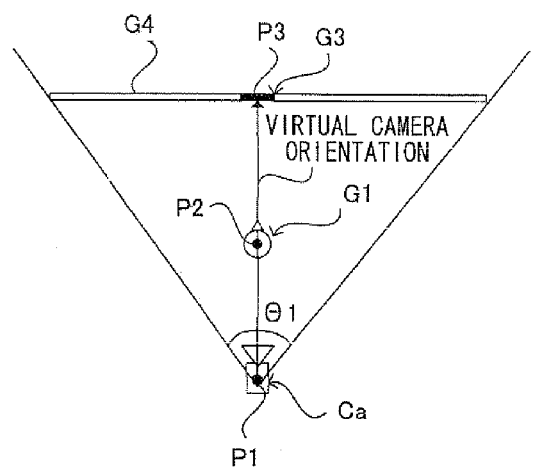
FIG. 4 is a diagram illustrating a position and an orientation of a virtual camera Ca in default state.

In the present embodiment, the virtual camera Ca is controlled such that the position and the orientation of the virtual camera Ca basically move so as to follow the movement of the character. FIG. 4 is a diagram illustrating the position and the orientation of the virtual camera Ca in the default state. FIG. 4 shows a state in which the virtual space is viewed from vertically above the virtual space. FIG. 7, FIG. 10, FIG. 13 to FIG. 15, FIG. 17, FIG. 18, FIG. 19 and FIG. 22B show the similar state.

As shown in FIG. 4, in the default state, the position of the virtual camera Ca (represented as "P1" in the drawings) is set on the same level plane as a representative point P2 of the player character G1, so as to be distant from the representative point P2 by a predetermined distance. Further, in the default state, the position of the virtual camera Ca is set such that the orientation of the player character G1 in the horizontal direction (direction toward which the front of the player character G1 is oriented) and the orientation of the virtual camera Ca in the horizontal direction are the same. The orientation of the virtual camera is set such that the virtual camera in the default state is horizontally set and oriented toward the player character G1 (the representative point P2). Further, the representative point P2 is set to, for example, a position of a predetermined part of the player character G1 (for example, position corresponding to the center of gravity of the head).

Next, the default position of the aim G3 will be described with reference to the drawings (FIG. 4). A representative point P3 of the aim G3 in the default state is set to a point of intersection of a screen surface G4 and a straight line extending from the representative point P2 of the player character G1 in a direction toward which the virtual camera Ca is oriented. For example, the representative point P3 is set to a predetermined position (for example, the center position) of the plate polygon object of the aim G3. In the present embodiment, the aim G3 is positioned on the screen surface G4. However, instead thereof, the aim G3 may be positioned on the plane which is distant from the representative point P2 by a predetermined distance in the direction toward which the virtual camera Ca is oriented, and which is orthogonal to the imaging direction of the virtual camera Ca. Further, in the present embodiment, objects superimposed on (in front of) the aim G3 is subjected to transmission process so as to prevent a state in which the aim G3 is hidden behind the player character G1 and the enemy characters G2, and is not displayed. Thus, the aim G3 is constantly displayed without hiding the aim G3 behind other objects. Instead thereof, the position of the aim G3 in the virtual space may be transformed to a position (position-on-screen) on a screen, and an image of the aim G3 may be combined with an image taken by the virtual camera Ca at the position-on-screen of the image taken by the virtual camera Ca.

Figure 5:
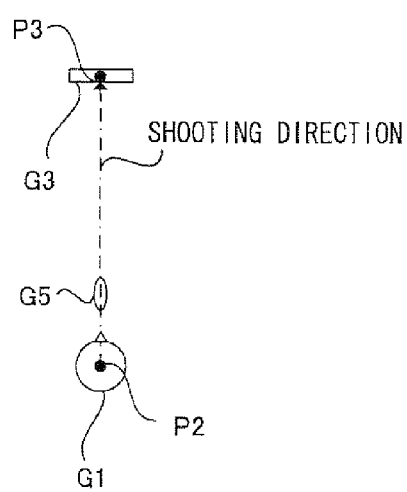
FIG. 5 is a diagram illustrating a relationship between a position of an aim G3 and a shooting direction of a shooting operation performed by a player.

FIG. 5 is a diagram illustrating a relationship between a position of the aim G3 and a shooting direction. FIG. 5 shows a state of the virtual space as viewed from vertically above the virtual space. As shown in FIG. 5, the shooting direction is a direction from the representative point P2 of the player character G1 toward the representative point P3 of the aim G3, and a bullet object G5 is shot from the representative point P2, and flies in this shooting direction. The enemy character G2 which collides against the bullet object G5 is shot, and defeated. In the present embodiment, when the enemy character G2 is positioned horizontally within a predetermined angular range which includes, at the center thereof, a straight line connecting between the representative point P2 of the player character G1 and the representative point P3 of the aim G3, the shooting direction is amended so as to be oriented toward the enemy character G2 positioned within the predetermined angular range.

Figure 6:
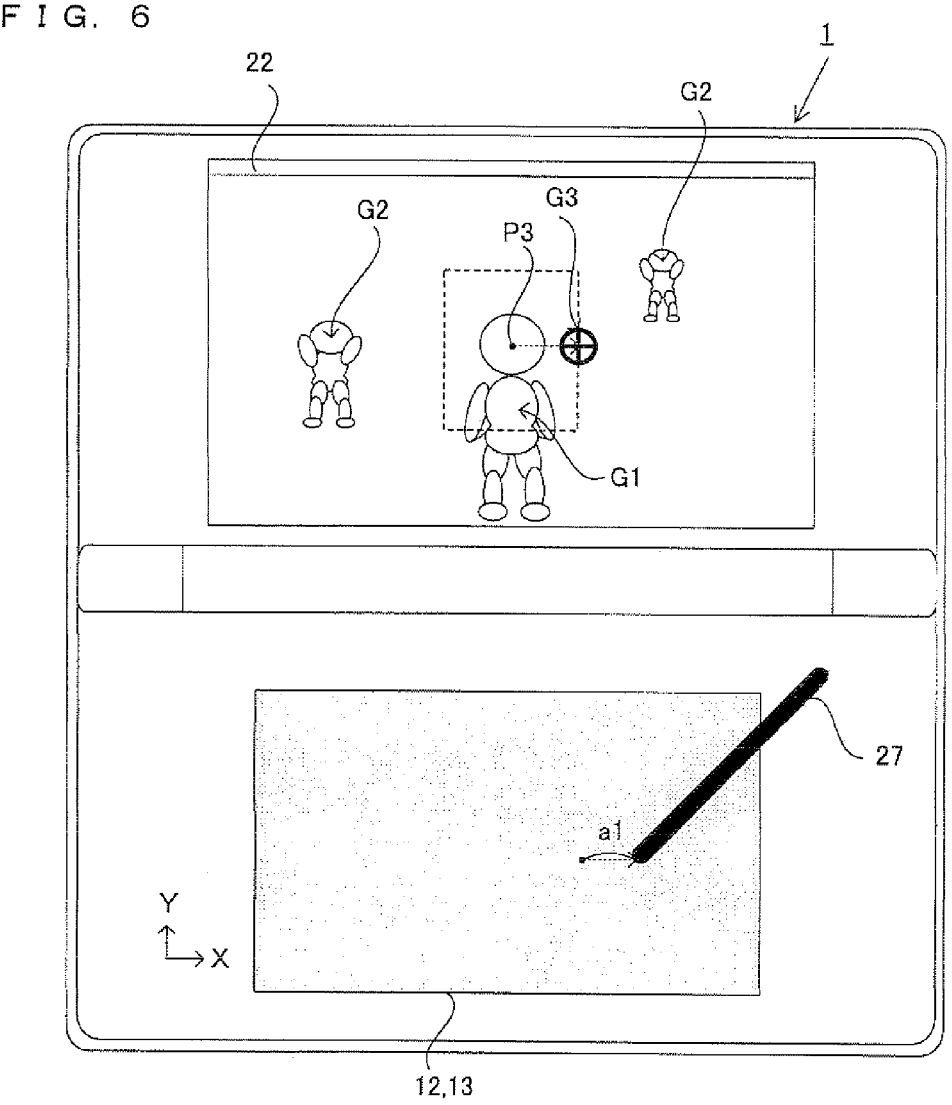
FIG. 6 is a diagram illustrating an exemplary display screen for the ground battle stage.

Next, movement of the aim during the sliding operation (a state in which the sliding operation is performed, and touch-off is not performed) will be described with reference to FIG. 6 to FIG. 8. FIG. 6 is a diagram illustrating an exemplary display screen for the ground battle stage. FIG. 6 shows a state in which the aim G3 is moved according to the sliding operation. In the present embodiment, when a player performs the sliding operation on the touch panel 13, the aim G3 is moved in the virtual space by a moving distance based on a sliding amount in a moving direction based on the sliding amount. In FIG. 6, the touch pen 27 is slid from the touched position shown in FIG. 3 by a sliding amount a1 in an X-axis positive direction. The X-axis positive direction herein is defined in a coordinate system of the touch panel 13. In the coordinate system of the touch panel 13, the X-axis positive direction is defined as the rightward direction in FIG. 6, the X-axis negative direction is defined as the leftward direction in FIG. 6, the Y-axis positive direction is defined as the upward direction in FIG. 6, and the Y-axis negative direction is defined as the downward direction in FIG. 6. At this time, the aim G3 is moved from the default position by the moving distance corresponding to the sliding amount a1 in the X-axis direction of a camera coordinate system. The aim G3 is not allowed to move without limitation according to the sliding operation. The aim G3 is allowed to move in a range (aim movement allowable range) indicated by dotted line shown in FIG. 6. It is to be noted that the dotted line is not displayed on the screen.

Figure 7:
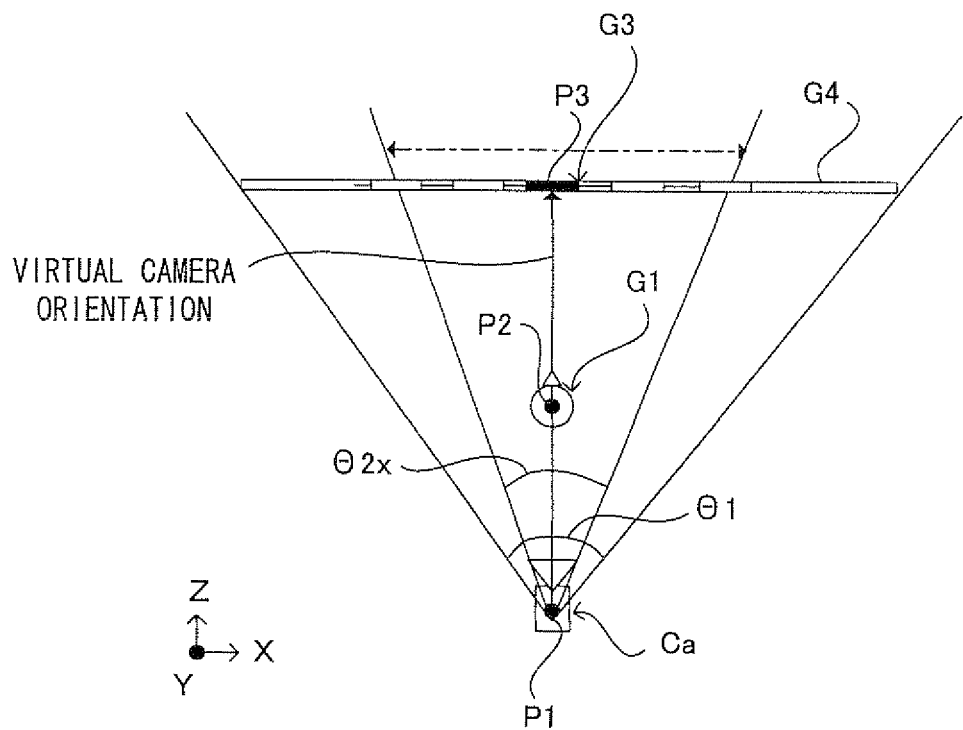
FIG. 7 is a diagram illustrating an aim movement allowable range.

FIG. 7 shows the aim movement allowable range. The aim movement allowable range is defined as a range defined, on the screen surface G4, by an angle smaller than the angle θ1 of view of the virtual camera Ca. Specifically, as shown in FIG. 7, the aim G3 is allowed to move rightward and leftward within a range which is horizontally defined by an angle θ2x (smaller than θ1), and which includes, at the center thereof, a straight line extending from the representative point P2 in the direction toward which the virtual camera Ca is oriented. Further, the aim G3 is allowed to move upward and downward within a range which is vertically defined by an angle θ2y (smaller than θ1), and which includes, at the center thereof, the straight line extending from the representative point P2 in the direction toward which the virtual camera Ca is oriented.

As described above, the representative point P3 of the aim G3 in the default state is on the straight line extending from the representative point P2 of the player character G1 in the direction toward which the virtual camera Ca is oriented, and the aim movement allowable range is a range which is horizontally defined by the angle θ2x so as to extend rightward and leftward from the straight line extending from the representative point P2 of the player character G1 in the direction toward which the virtual camera Ca is oriented, and which is vertically defined by the angle θ2y so as to extend upward and downward from the same straight line. Namely, the position of the aim G3, and the aim movement allowable range are determined based on the position and the orientation of the virtual camera; and are changed so as to follow the position and the orientation of the virtual camera Ca.

Figure 8:
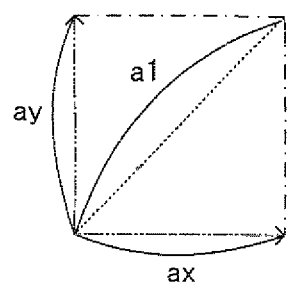
FIG. 8 is a diagram illustrating a state in which change of touch position according to sliding operation is separated into X-component change and Y-component change.

As shown in FIG. 8, change of the touch position in the sliding operation is detected separately as the change of the X-component and the change of the Y-component in the coordinate system of the touch panel 13. Among the sliding amount a1, a change amount of the X-component is represented as a change amount ax, whereas the change amount of the Y-component is represented as a change amount ay. The representative point P3 of the aim G3 is moved in the X-axis direction in the coordinate system of the virtual camera Ca by a moving distance based on the change amount ax of the X-component. The representative point P3 of the aim G3 is moved in the Y-axis direction in the coordinate system of the virtual camera Ca by a moving distance based on the change amount ay of the Y-component. In the coordinate system of the virtual camera Ca, the X-axis positive direction is defined as the rightward direction in FIG. 7, the X-axis negative direction is defined as the leftward direction in FIG. 7, the Y-axis positive direction is defined as the front side direction in FIG. 7, and the Y-axis negative direction is defined as the far side direction in FIG. 7.

As described above, in the present embodiment, the position of the aim G3 in the virtual space can be changed by a player performing the sliding operation which is a simple intuitive operation. In conventional technology, the aim G3 is constantly located at the center of the display screen, and the orientation of the virtual camera itself needs to be changed in order to change the position of the aim. However, in the present embodiment, the position of the aim G3 can be changed within a predetermined range without changing the orientation or the position of the virtual camera Ca, thereby enabling the shooting direction to be changed.

(Change of Orientation and Position of Virtual Camera in Ground Battle Stage Through Sliding Operation)

Figure 9:
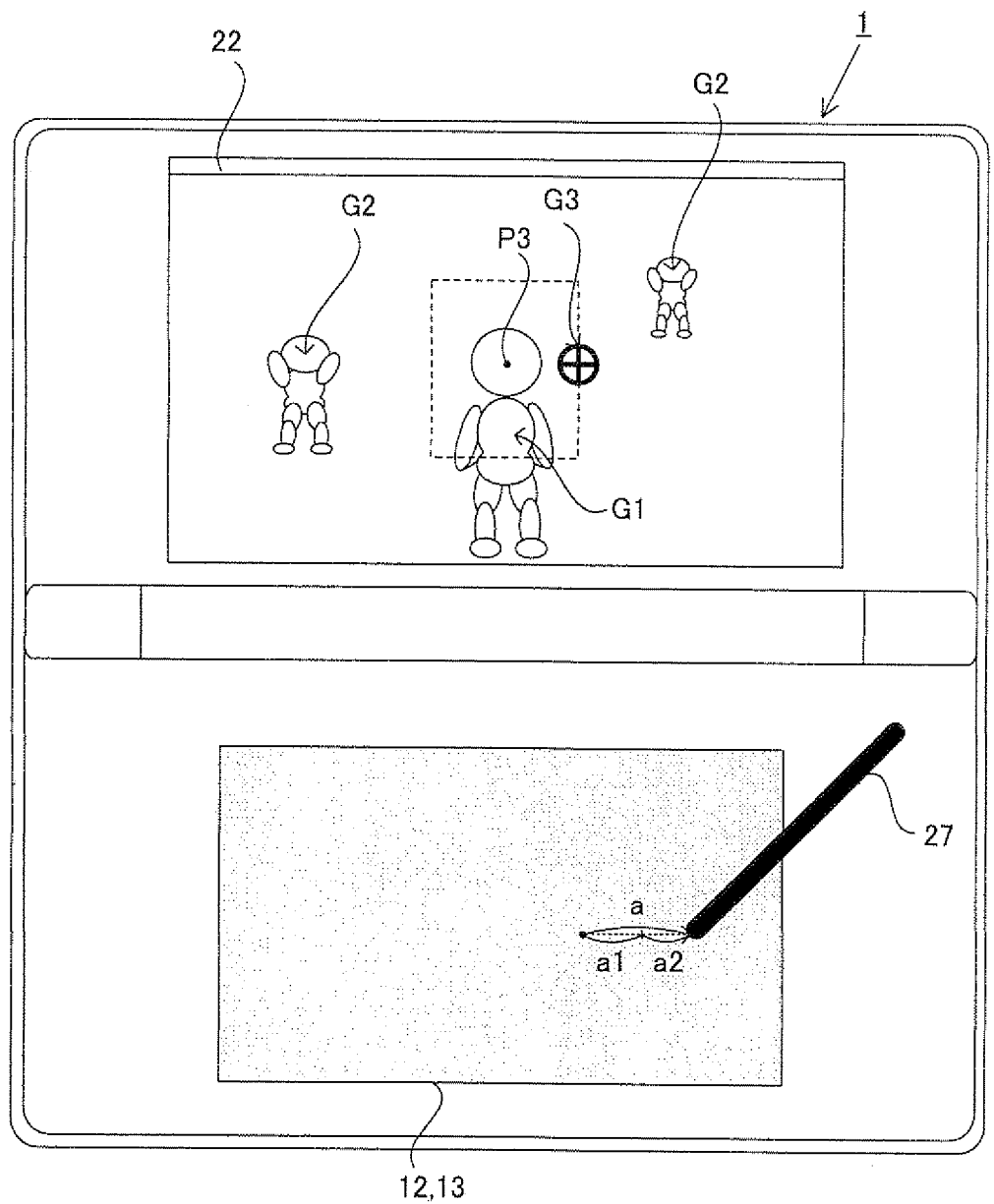
FIG. 9 is a diagram illustrating an exemplary display screen for the ground battle stage.

Next, change of an orientation and a position of the virtual camera during the sliding operation will be described with reference to FIG. 9 to FIG. 11. FIG. 9 is a diagram illustrating an exemplary display screen for the ground battle stage. In the example of FIG. 9, the touch pen 27 is further slid by a sliding amount a2 from the touch position shown in FIG. 6. Therefore, in this example, the touch pen 27 is moved from the touch-on position by the sliding amount a (the sliding amount a1+the sliding amount a2). In this example, when the aim G3 moves by a moving distance corresponding to the sliding amount a1, the aim G3 reaches a boundary of the aim movement allowable range. In the present embodiment, until the aim G3 reaches a boundary position, the position of the aim G3 is changed according to the sliding operation, and after the aim G3 has reached the boundary position, the orientation and the position of the virtual camera Ca are changed according to the sliding operation.

Namely, the orientation and the position of the virtual camera Ca are changed, in a degree corresponding to the sliding amount a2, in the direction corresponding to the direction in which the sliding operation is performed, after the aim G3 has reached the boundary.

In the following description, a2x represents a sliding amount obtained in the X-axis direction (the X-axis direction in the coordinate system of the touch panel 13) after the aim G3 has reached the boundary position in the X-axis direction, and a2y represents a sliding amount obtained in the Y-axis direction (the Y-axis direction in the coordinate system of the touch panel 13) after the aim G3 has reached the boundary position in the Y-axis direction.

Figure 10:
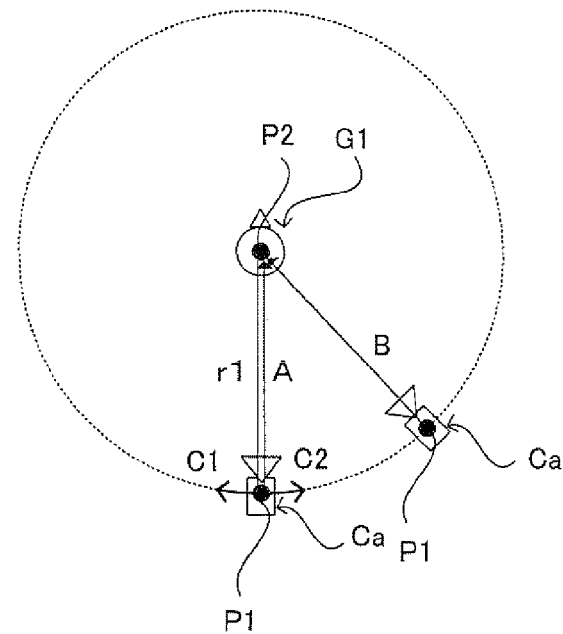
FIG. 10 is a diagram illustrating a state in which the orientation and position of the virtual camera Ca are changed in the horizontal direction during the sliding operation.

FIG. 10 is a diagram illustrating a state in which the orientation and the position of the virtual camera Ca are changed in the horizontal direction during the sliding operation. The position of the virtual camera Ca is set, on the circumference of the circle having a predetermined radius r1 and having the representative point P2 at the center thereof, on the level plane including the representative point P2 of the player character G1. Namely, the movement allowable range (virtual camera movement allowable range) of the virtual camera Ca in the horizontal direction is set on the circumference of the circle. When the sliding operation is performed in the rightward direction (the X-axis positive direction) shown in FIG. 1, the position of the virtual camera Ca is changed according to the sliding amount a2x from the default position in the direction represented by C1 after the aim G3 has reached the right side boundary in the X-axis direction. On the other hand, when the sliding operation is performed in the leftward direction (the X-axis negative direction) shown in FIG. 1, the position of the virtual camera Ca is changed according to the sliding amount a2x from the default position in the direction represented by C2 after the aim G3 has reached the left side boundary in the X-axis direction.

Also after the virtual camera Ca has been moved, the orientation of the virtual camera Ca is changed so as to orient the virtual camera Ca toward the representative point P2 of the player character G1. In FIG. 10, although the orientation of the virtual camera Ca in the default state is set so as to orient the virtual camera Ca toward the direction indicated by an arrow A, the orientation of the virtual camera Ca is changed so as to orient the virtual camera Ca toward the direction indicated by an arrow B after the position has been changed. As described above, the position of the virtual camera Ca is changed according to the sliding amount a2x and the direction in which the sliding operation is performed, so that the orientation of the virtual camera Ca is changed according to the sliding amount a2x and the direction in which the sliding operation is performed.

Figure 11:
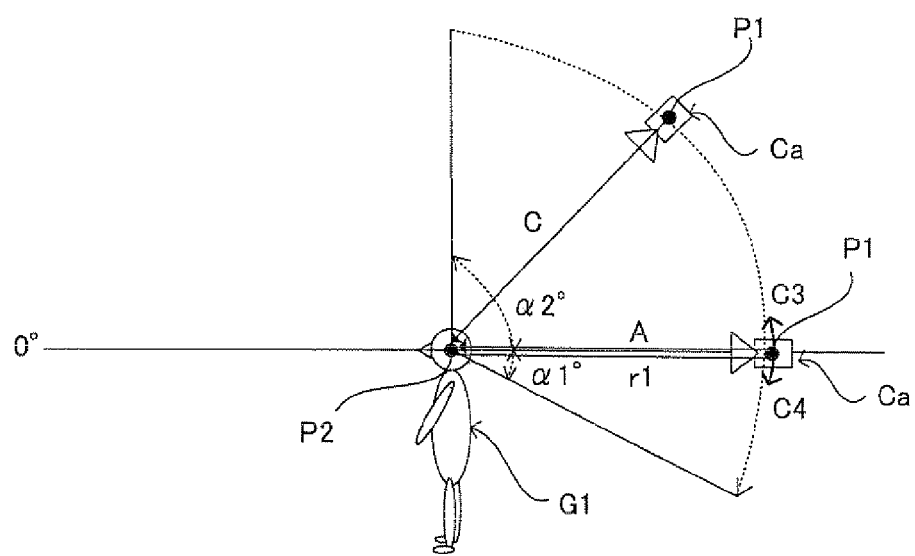
FIG. 11 is a diagram illustrating a state in which the orientation and position of the virtual camera Ca are changed in the vertical direction during the sliding operation.

FIG. 11 is a diagram illustrating a state where the orientation and the position of the virtual camera Ca are changed in the vertical direction during the sliding operation. The position of the virtual camera Ca is set, on the circumference of an arc of the circle having a predetermined radius r1 and having the representative point P2 at the center thereof, on the vertical plane including the representative point P2 of the player character G1. Namely, the movement allowable range of the virtual camera in the vertical direction is set on the circumference of the arc of the circle. Further, the virtual camera Ca is movable downward within a range defined by an angle α1° (smaller than 90 degrees) relative to the straight line r1, and upward within a range defined by an angle α2° (for example, 90 degrees) relative to the straight line r1. When the sliding operation in the upward direction shown in FIG. 1 is performed, the position of the virtual camera Ca is changed from the default position according to the sliding amount a2y in the direction represented by C3 after the aim G3 has reached the upper side boundary in the Y-axis direction. Further, when the sliding operation in the downward direction shown in FIG. 1 is performed, the position of the virtual camera Ca is changed from the default position according to the sliding amount a2y in the direction represented by C4 after the aim G3 has reached the lower side boundary in the Y-axis direction.

The orientation of the virtual camera Ca is changed such that the virtual camera Ca is oriented toward the representative point P2 of the player character G1 after the virtual camera Ca has been moved. In FIG. 11, although the orientation of the virtual camera Ca in the default state is set so as to orient the virtual camera Ca toward the direction indicated by an arrow A, the orientation of the virtual camera Ca is changed such that the virtual camera Ca is oriented toward the direction indicated by an arrow C after the position has been changed. As described above, also in the vertical direction, the position of the virtual camera Ca is changed according to the sliding amount a2y and the direction in which the sliding operation is performed, so that the orientation of the virtual camera Ca is changed according to the sliding amount a2y and the direction in which the sliding operation is performed.

As described above, in the present embodiment, the position of the aim G3, the orientation and the position of the virtual camera Ca may be changed by the sliding operation being performed, and further the position of the aim G3, and the orientation and the position of the virtual camera Ca are changed due to inertial force also after "slide-off" (touch-off is performed during the sliding operation) is performed. The change due to inertial force does not occur during the sliding operation.

Hereinafter, change of the position of the aim G3, and the orientation and the position of the virtual camera Ca due to inertial force, will be described with reference to FIG. 7, FIG. 10, and FIG. 12 to FIG. 15.

(Change of Position of Aim in Ground Battle Stage after Slide-Off)

Firstly, when the aim does not reach the boundary of the aim movement allowable range at a time point when the slide-off is performed, the position of the aim G3 is changed due to inertial force.

The movement of the aim G3 due to inertial force will be described. Firstly, the aim movement allowable range is the same as the aim movement allowable range set for the sliding operation described with reference to FIG. 7. However, the aim movement allowable range set for the change due to inertial force is different from the aim movement allowable range set for the sliding operation in the following points. That is, the aim G3 is moved, during the sliding operation, according to the direction corresponding to the direction in which the sliding operation is performed, and the moving distance corresponding to the sliding amount, whereas, after slide-off, the aim G3 is moved due to inertial force according to the sliding direction and the sliding amount obtained immediately before touch-off, and the aim G3 gradually decelerates and stops. When a player touches a desired one point on the touch panel 13 before the aim G3 stops in the operation due to the inertial force, the aim G3 immediately stops moving. Therefore, in order to move the aim G3 to a position desired by the player, the player may simply touch on a desired position when the aim moving due to the inertial force reaches the desired position after slide-off. Thus, the aim G3 can be moved to a desired position with enhanced operability without continuing the touch operation.

(Change of Orientation and Position of Virtual Camera in Ground Battle Stage after Slide-Off)

When the aim has already reached the boundary of the aim movement allowable range at a time point when the slide-off is performed, or after the aim G3 moving due to inertial force has reached the boundary of the aim movement allowable range, the orientation and the position of the virtual camera are changed due to inertial force.

Change of the orientation of the virtual camera Ca due to inertial force, and change of the position of the virtual camera Ca due to inertial force will be described. The virtual camera movement allowable range in the horizontal direction and the change of the orientation of the virtual camera Ca in the horizontal direction are the same as those during the sliding operation described with reference to FIG. 10. However, the virtual camera movement allowable range in the vertical direction and the change of the orientation of the virtual camera Ca in the vertical direction are different from those during the sliding operation.

Figure 12:
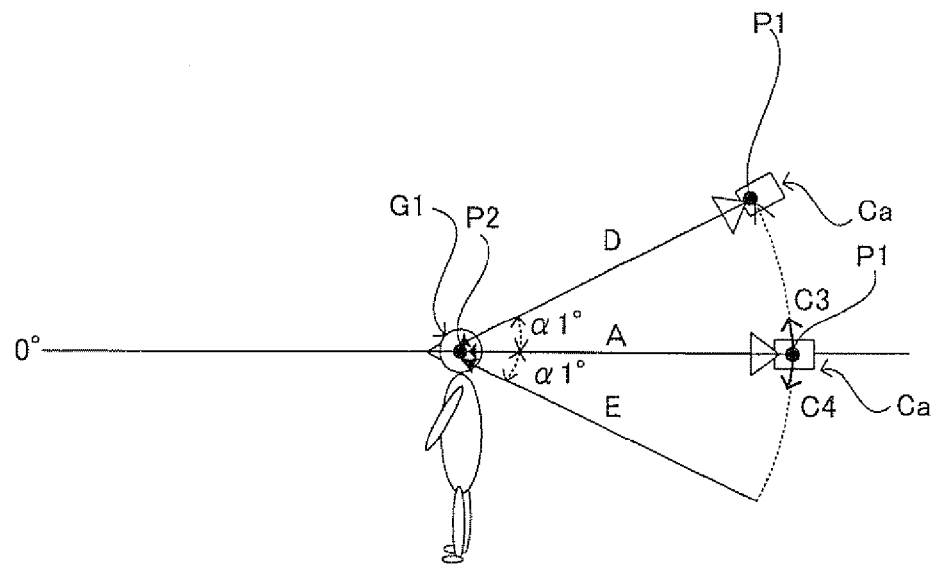
FIG. 12 is a diagram illustrating a virtual camera movement allowable range in the vertical direction after slide-off, and change of an orientation of the virtual camera Ca in the vertical direction after slide-off.

FIG. 12 is a diagram illustrating the virtual camera movement allowable range in the vertical direction after slide-off, and change of the orientation of the virtual camera Ca in the vertical direction after slide-off. As shown in FIG. 12, also after the slide-off, the position of the virtual camera Ca is set, on the circumference of an arc of the circle having the predetermined radius r1 and having the representative point P2 of the player character G1 at the center thereof, on the vertical plane including the representative point P2 of the player character G1, similarly to in the sliding operation. The position of the virtual camera Ca can be changed on the circumference of the arc. However, after slide off, the virtual camera movement allowable range is defined such that the virtual camera Ca is movable downward within a range defined by an angle α1° (smaller than 90 degrees) relative to the straight line r1, and upward within a range defined by the angle α1° relative to the straight line r1, unlike in the sliding operation. It is to be noted that, during the sliding operation, the virtual camera Ca is movable upward within the range defined by the angle α2°, and the angle α2° is greater than the angle α1°. Thus, the virtual camera movement allowable range after slide-off is narrower than that for the sliding operation. The orientation of the virtual camera Ca after slide-off is changed in the same manner as that for the sliding operation. However, since the virtual camera movement allowable range in the vertical direction after slide-off is narrower than that for the sliding operation, the orientation of the virtual camera Ca in the vertical direction can be changed after slide-off to a degree less than a degree for the sliding operation (the orientation of the virtual camera Ca in the vertical direction can be changed in a range between the D direction and the E direction after slide-off).

After the aim G3 has reached the boundary of the aim movement allowable range, the orientation and the position of the virtual camera Ca are changed or moved, after slide-off, due to inertial force based on the sliding direction and the sliding amount obtained immediately before the touch-off. The change of the orientation and the position of the virtual camera Ca gradually decelerates to stop. If a player touches a desired one point on the touch panel 13 before the change of the orientation and the position of the virtual camera Ca due to the inertial force stops, the change of the orientation and the position of the virtual camera Ca immediately stops. Therefore, in order to change the orientation and the position of the virtual camera Ca as desired by a player, the player may simply touch on a desired position when the orientation and the position of the virtual camera Ca changing due to inertial force reaches the desired orientation and position after slide-off. Thus, the orientation and the position of the virtual camera Ca can be changed to desired orientation and position without continuing touch operation by the player, thereby enabling the orientation and the position of the virtual camera Ca to be changed with enhanced operability.

After slid of the position and the orientation of the virtual camera Ca in the vertical direction are automatically restored gradually to the default position (on the same level plane as the representative point P2 of the player character G1) and the (horizontal) default orientation.

As described above, the position of the aim G3 is determined based on the position and the orientation of the virtual camera Ca. Therefore, when the position and the orientation of the virtual camera Ca are changed by the sliding operation being performed or due to the inertial force after slide-off, the position of the aim G3 is changed according thereto. However, the position of the aim G3 on the screen is not changed (for example, when the virtual camera Ca is moved due to inertial force after the aim has reached the boundary position, the aim G3 remains located at the boundary position).

(Change of Deceleration Rate of Deceleration of Virtual Camera Controlled According to Inertial Force: when NPC Exists within a Predetermined Range in Imaging Direction of Virtual Camera)

Figure 13:
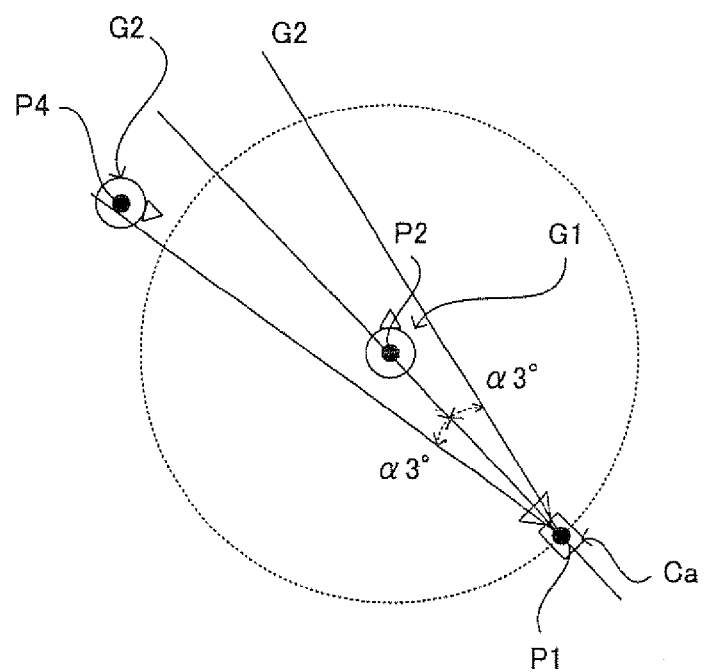
FIG. 13 is a diagram illustrating a case where change of a position of the aim G3, and a position and an orientation of the virtual camera Ca due to inertial force is decelerated at an increased deceleration rate.

As described above, the position of the aim G3, and the orientation and the position of the virtual camera Ca are changed due to inertial force after slide-off, and the change gradually decelerates. In the present embodiment, the rate of the deceleration of the change is increased when a predetermined condition is satisfied. Specifically, when a non-player character (NPC) exists within a predetermined range in the imaging direction of the virtual camera, the deceleration rate is increased. For example, as shown in FIG. 13, when an angle formed between: a straight line extending from a position of the virtual camera Ca moving due to inertial force, in the direction toward which the virtual camera Ca is oriented; and a straight line extending from the position of the virtual camera Ca to a position of an NPC, is less than or equal to a predetermined angle α3°, the rate of the deceleration of the change of the orientation and the position of the virtual camera Ca due to inertial force is increased. A subject object for which the rate of the deceleration is increased when the subject object exists within the predetermined range in the imaging direction may be any NPC, or a specific NPC (for example, all the enemy characters, or a specific type of the enemy characters). Alternatively, when the enemy characters have attacked the player character G1 and delivered a damaging blow to the player character G1, the identification information of such enemy characters G2 are stored, and only such enemy characters G2 may be identified as the subject object for which the rate of the deceleration is increased when the subject object exists within the predetermined range in the imaging direction (or the rate of the deceleration for such enemy characters may be further increased). The rate of the deceleration may be changed according to the type of the NPC. Thus, when, for example, the enemy characters G2 to be shot by a player are displayed in the vicinity of the center of the imaging range of the virtual camera, the orientation and the position of the virtual camera Ca are gradually changed, so that the enemy characters G2 can be easily captured by the virtual camera.

(Change of Rate of Deceleration of Virtual Camera Controlled According to Inertial Force: when the Number of NPCs that Exist Near Player Character is Greater than or Equal to a Predetermined Number)

Figure 14:
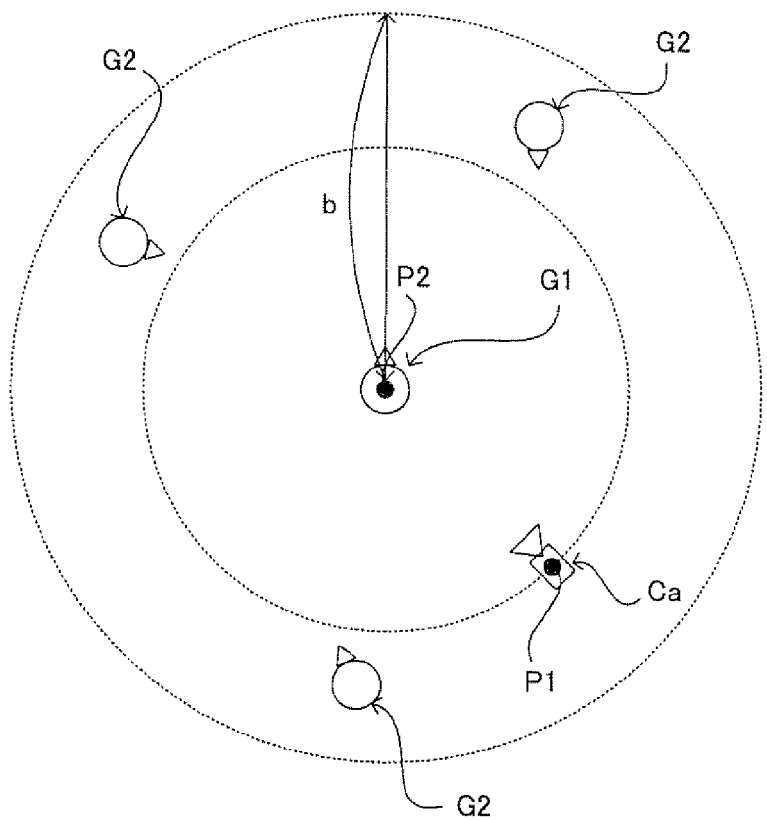
FIG. 14 is a diagram illustrating a case where change of a position of the aim G3, and a position and an orientation of the virtual camera Ca due to inertial force is stopped.

Further, as shown in FIG. 14, when the number of the enemy characters G2 that are distant from the player character G1 by a predetermined or shorter distance, is greater than or equal to a predetermined number (or the number of the enemy characters G2 that exist in the present subject play area is greater than or equal to a predetermined number), a process for "change of rate of deceleration: when NPC exists within a predetermined range in imaging direction of virtual camera Ca" as described above may be stopped. When an increased number of the enemy characters G2 exist, a probability of the enemy characters G2 existing in the imaging direction is increased, and the deceleration is frequently enhanced, so that the camera control due to inertial force does not effectively function. Therefore, when the increased number of the enemy characters G2 are located near the player character G2, the process of the change of the rate of the deceleration as described above is stopped.

(Change of Rate of Deceleration of Virtual Camera Controlled According to Inertial Force: when Imaging Direction is the Same as Direction Toward which Player Character is to Move)

Figure 15:
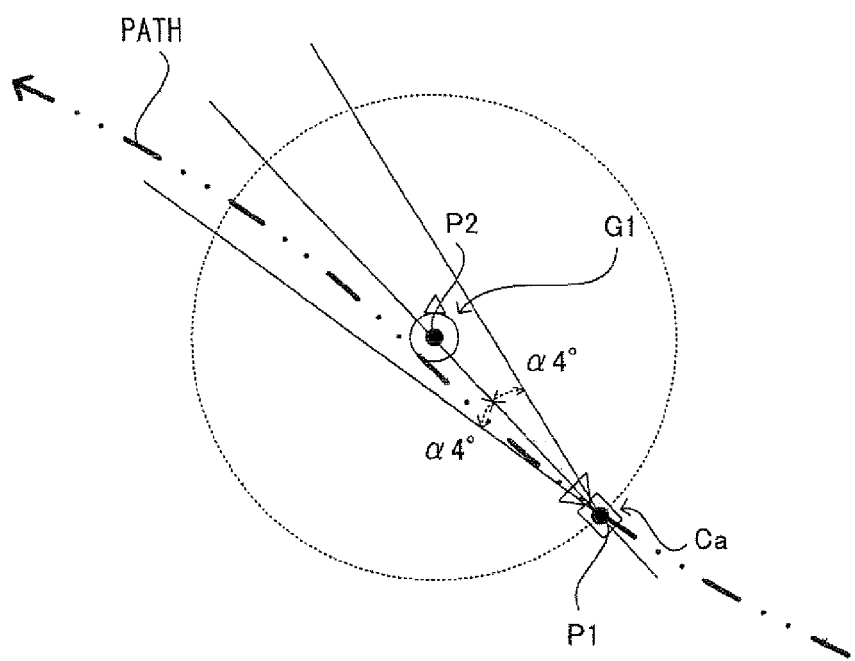
FIG. 15 is a diagram illustrating a case where change of a position of the aim G3, and a position and an orientation of the virtual camera Ca due to inertial force is decelerated at an increased deceleration rate.

Further, in the present embodiment, in the ground battle stage, a predetermined route connecting between the start point and the goal for the ground battle stage is defined as a path. The path is used for guiding the player character G1 in the direction (route) in which the player character G1 is to move, and the coordinates of the path and the moving direction (only horizontal direction) set for each coordinate of the path are defined in the virtual game space. (Alternatively, the coordinates and each moving direction may be defined so as to be buried in the ground object). For example, when the player character G1 is near the path (for example, is distant from the path by a predetermined or shorter distance), an arrow object indicating the moving direction is displayed. As shown in FIG. 15, when the virtual camera Ca (or the player character G1) is near the path (for example, when a distance from the virtual camera Ca to the path is shorter than or equal to a predetermined distance, or when a distance from the player character G1 to the path is shorter than or equal to a predetermined distance), the rate of the deceleration of the change of the orientation and the position of the virtual camera Ca due to inertial force may be increased. Specifically, in a case where the moving direction (horizontal direction) defined at a point on the path nearest to a point (or a point at which the player character G1 is positioned) at which the virtual camera Ca is positioned is distant by an angular distance of an angle α4° or less relative to the direction (horizontal direction) toward which the virtual camera Ca is oriented, the rate of the deceleration of the change may be increased. Therefore, when the position of the virtual camera Ca (or the position of the player character G1) is near the path, and the orientation of the virtual camera Ca is approximate to the direction indicated by the path, the orientation and the position of the virtual camera Ca are gradually changed, so that a player can easily control the virtual camera Ca so as to be oriented toward the direction in which the player character G1 is to move.

(Zooming Process in Ground Battle Stage)

Figure 16:
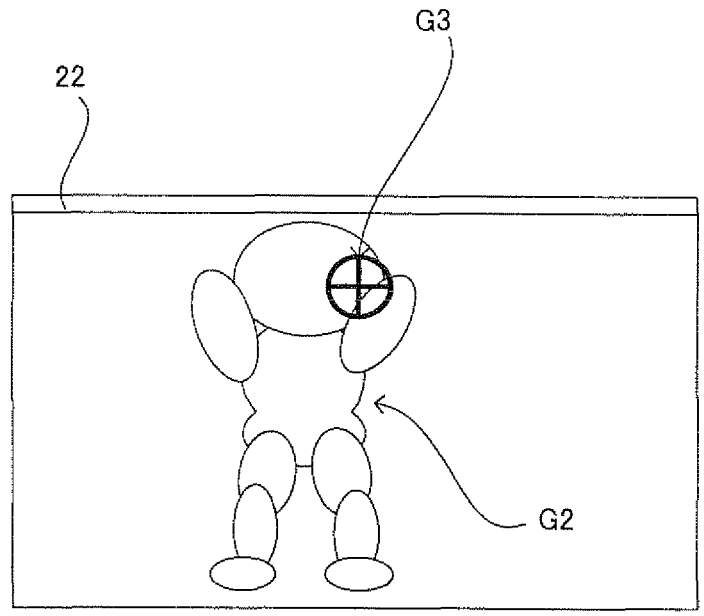
FIG. 16 is a diagram illustrating an upper LCD on which the virtual space having been zoomed in on is displayed.
Figure 17:
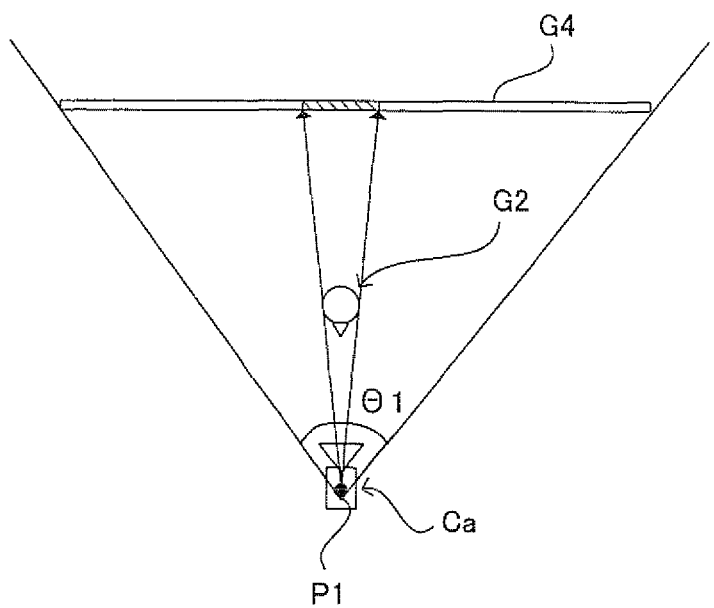
FIG. 17 is a diagram illustrating an angle of view in a normal state.
Figure 18:
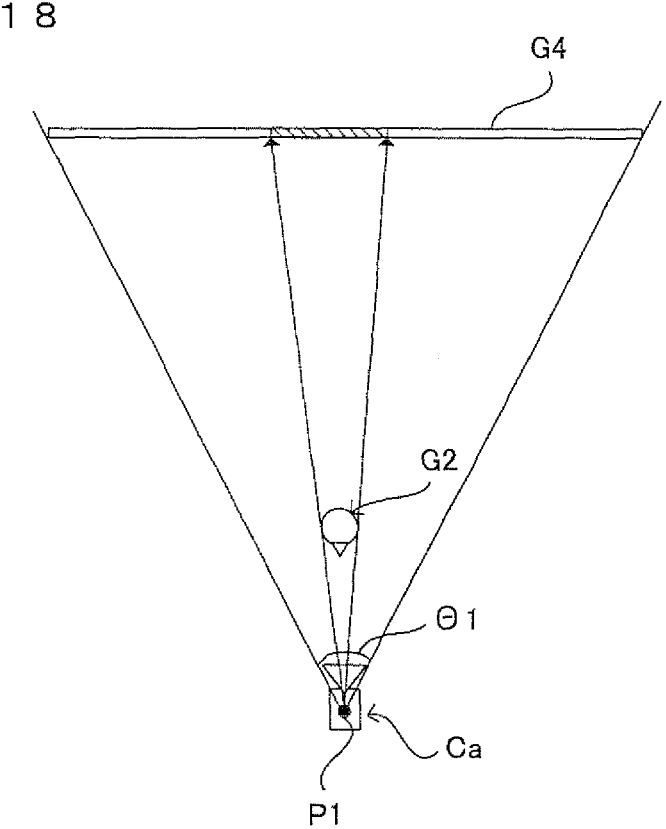
FIG. 18 is a diagram illustrating an angle of view in zoomed-in-on state.

Next, zooming process in the ground battle stage will be described with reference to FIG. 16 to FIG. 18. FIG. 16 is a diagram illustrating the upper LCD 22 on which the virtual space having been zoomed in on is displayed. In the ground battle stage, when a player performs double tapping operation on the touch panel 13, the point of view of the virtual camera Ca is changed to a subjective point of view as shown in FIG. 16, and the virtual space which is zoomed in on is projected by the virtual camera Ca so as to be greater than the virtual space in a normal state. Specifically, in a state where the gazing point is maintained so as to be constant, the angle θ1 of view of the virtual camera Ca is changed, thereby displaying the virtual space which is zoomed in on. FIG. 17 is a diagram illustrating an angle of view in a normal state (when the zooming is not performed in the ground battle stage), and FIG. 18 is a diagram illustrating an angle of view for a period (in the zoomed state) in which the virtual space which is zoomed in on is displayed. When the double tapping operation is performed, the angle θ1 of view of the virtual camera Ca is reduced, so that the projection range on the screen surface G4 for an object such as the enemy character G2 is enlarged. The oblique line portions in FIG. 17 and FIG. 18 represent the projection range of the enemy character G2. Therefore, when the angle θ1 of view is reduced, the zoomed display is performed.

The zooming process described above is performed by the double tapping operation. The double tapping operation may be performed in any position in a predetermined range (for example, the entire surface of the touch panel 13) on the touch panel 13. Thus, when a player performs a simple operation such as the double tapping operation on a desired position on the touch panel 13, the game apparatus 1 is instructed to execute the zooming process.

The zooming is performed while the second touch operation in the double tapping is continued, and when the second touch operation is off, the zooming process is cancelled, and the process is restored to a normal process. While the second touch operation in the double tapping is being continued, the zooming process is continued even if the touch position is changed.

In the zooming, the point of view of the virtual camera Ca is changed to the subjective point of view, as described above. Namely, the position of the virtual camera Ca is set to the position of the representative point P2 of the player character G1 (see FIG. 19). Further, even when the sliding operation is performed during the zooming (namely, even when, while the second touch operation of the double tapping is continued, the touch position is changed), the orientation and the position the virtual camera Ca are not changed. When the sliding operation is performed during the zooming, the position of the aim G3 is changed.

(Movement of Aim G3 During Zooming Process)

Hereinafter, movement of the aim G3 during the zooming process will be described with reference to FIG. 19. Also when the zooming is performed, the aim G3 is positioned on the screen surface G4, and the default position in the zoomed state is the same as the default position in the normal state (non-zoomed state). Further, the aim G3 is moved from the default position according to the direction and the sliding amount of the sliding operation performed during the zooming process. However, the position of the aim G3 can be changed only by the sliding operation during the zooming process, and the aim G3 cannot be moved due to inertial force.

Figure 19:
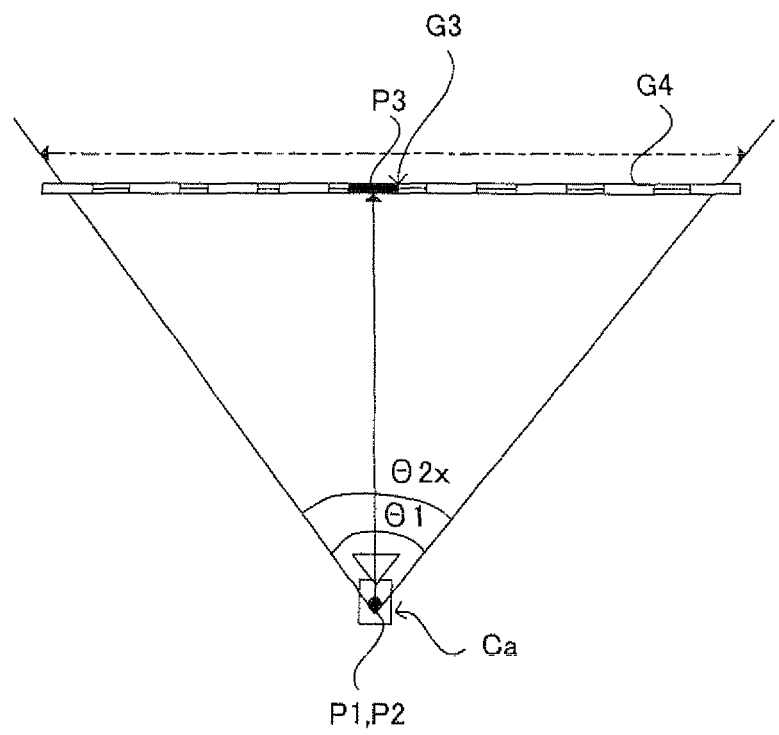
FIG. 19 is a diagram illustrating an aim movement allowable range set during zoomed-in-on state.

Further, FIG. 19 is a diagram illustrating the aim movement allowable range set during the zoomed-in-on state. As shown in FIG. 19, the aim movement allowable range is enlarged as compared to the aim movement allowable range in the normal status. Specifically, the aim movement allowable range is the entirety of the screen surface G4 during the zooming. Namely, an angle θ2 (θ2x, θ2y) for defining the movement allowable range during the zooming is greater than an angle θ2 (θ2x, θ2y) for the normal state. Specifically, the angle is set so as to be equal to the angle θ1 of view. Further, the moving distance of the aim G3 relative to the amount of the sliding operation is smaller than that for the normal status. Thus, a player is allowed to minutely adjust the position of the aim G3 during the zooming, as compared to in the normal state.

(Change of Position of Aim, and Orientation and Position of Camera in Aerial Battle Stage)

Figure 20:
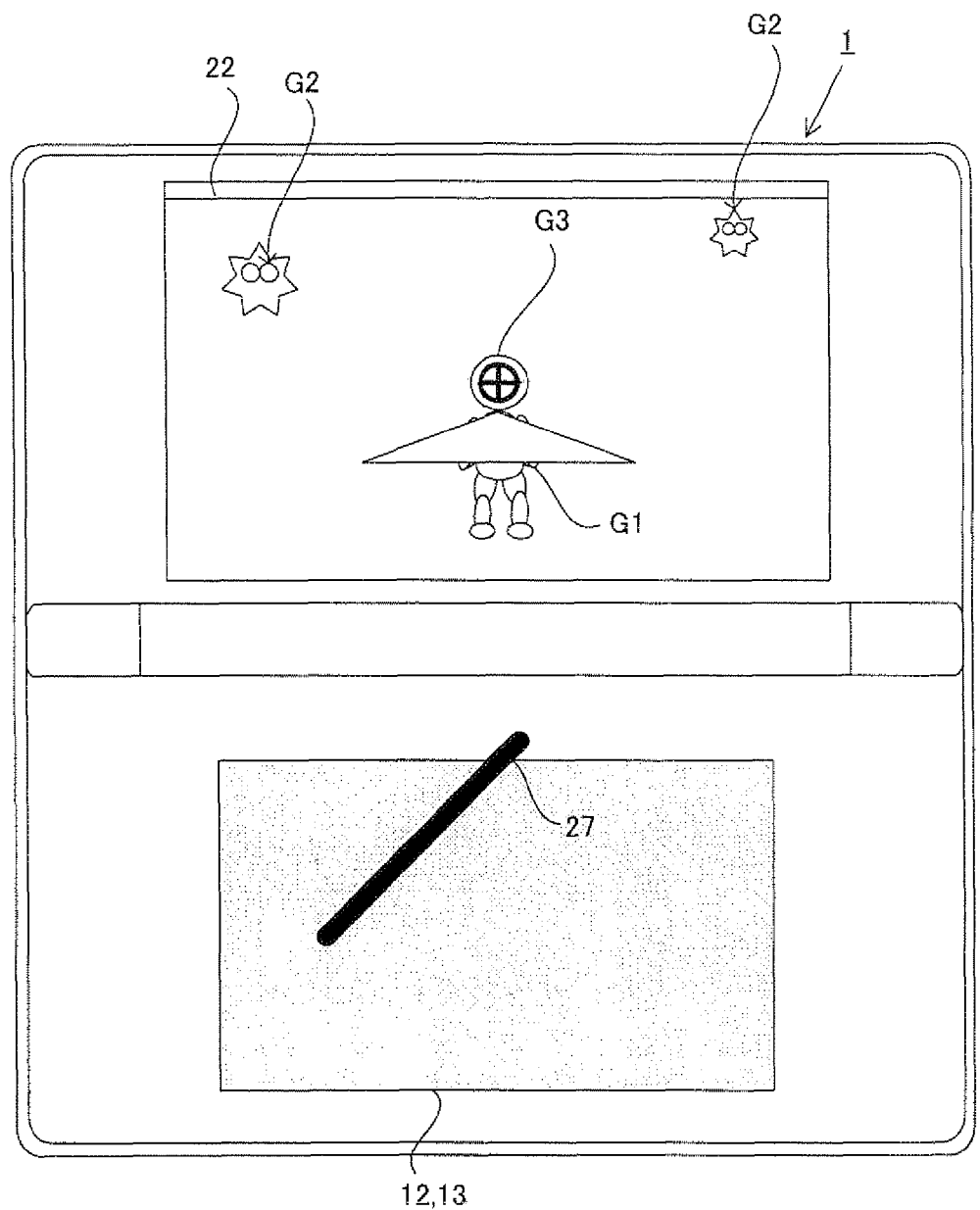
FIG. 20 is a diagram illustrating an exemplary display screen for an aerial battle stage.

Next, process steps associated with the position of the aim G3, and the orientation and the position of the virtual camera Ca in the aerial battle stage will be described. In the aerial battle stage, the angle θ1 of view of the virtual camera Ca is not changed, and the virtual space to be displayed is not zoomed. FIG. 20 is a diagram illustrating an exemplary display screen for the aerial battle stage As shown in FIG. 20, also in the aerial battle stage, similarly to in the ground battle stage, the virtual space as viewed from the virtual camera Ca (see FIG. 4) is displayed on the upper LCD 22. As in the ground battle stage, the player character G1, a plurality of the enemy characters G2 corresponding to non-player characters that attack the player character, and the aim G3 are positioned in the virtual space. Further, in the aerial battle stage, a background object representing, for example, the air such as sky or the outer space are positioned in the virtual space, which are not shown, unlike in the ground battle stage.

Figure 21A:
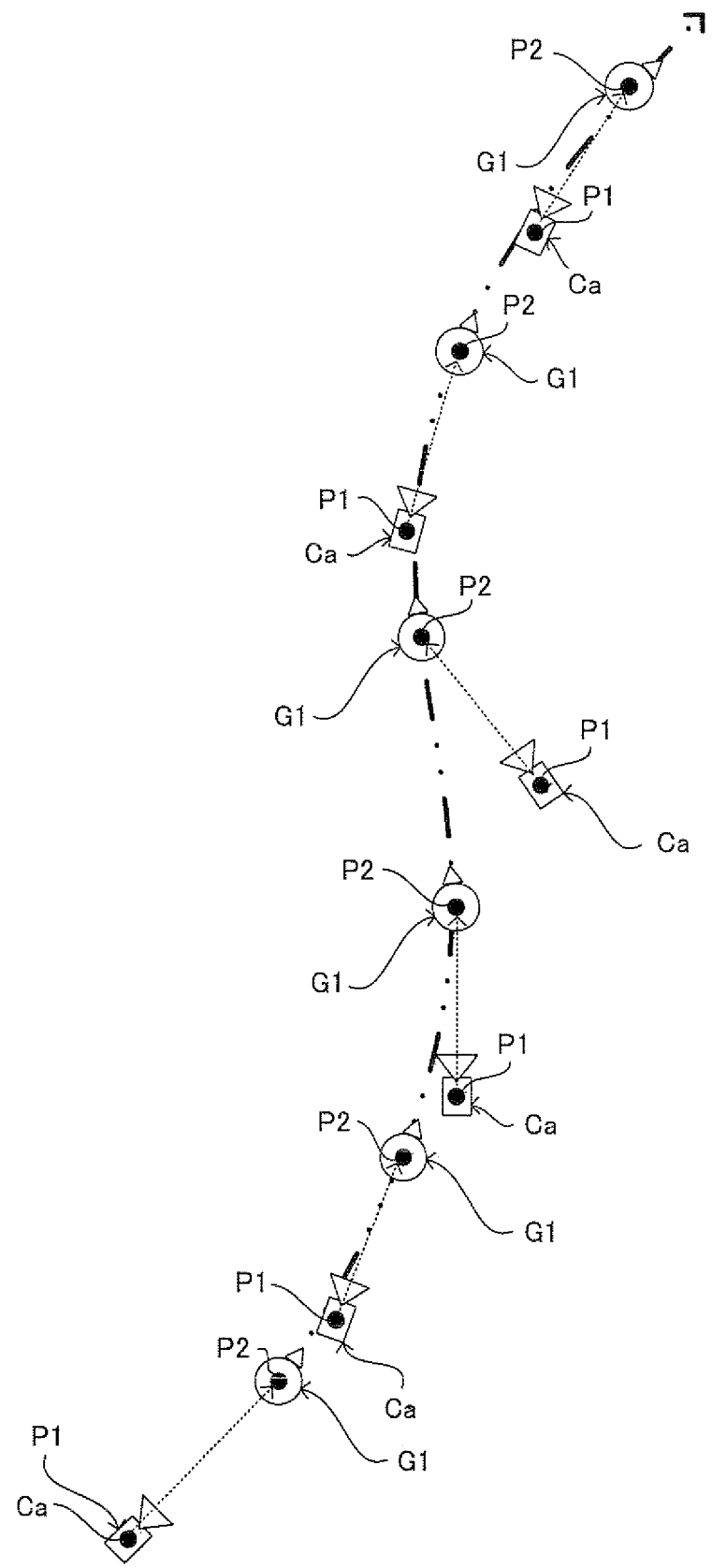
FIG. 21A is a diagram illustrating a relationship between a path defined in a virtual space, and a moving route of a player character.

In the present embodiment, also in the aerial battle stage, a predetermined route is defined, as a path, in a virtual area section from a start point to a goal as described above. However, unlike in the ground battle stage, the player character G1 automatically moves along the defined path even if a player does not perform the character movement operation. FIG. 21A is a diagram illustrating a relationship between the path defined in the virtual space, and the moving route of the player character. FIG. 21A shows the virtual space as viewed from vertically above the virtual space. In FIG. 21A, the position and the direction of the path are indicated by an arrow of an alternate long and two short dashes line. It is to be noted that the path is not displayed on the screen. FIG. 21A shows a state in which the player character G1 automatically moves in a case where a player never performs the character movement operation (namely, a player never operates the analog operation component 14L). Thus, when the character movement operation is not performed, the player character G1 moves along the path such that the representative point P2 passes through the path. However, a player is allowed to move the player character G1 from the path within a predetermined range by performing the character movement operation.

Figure 21B:
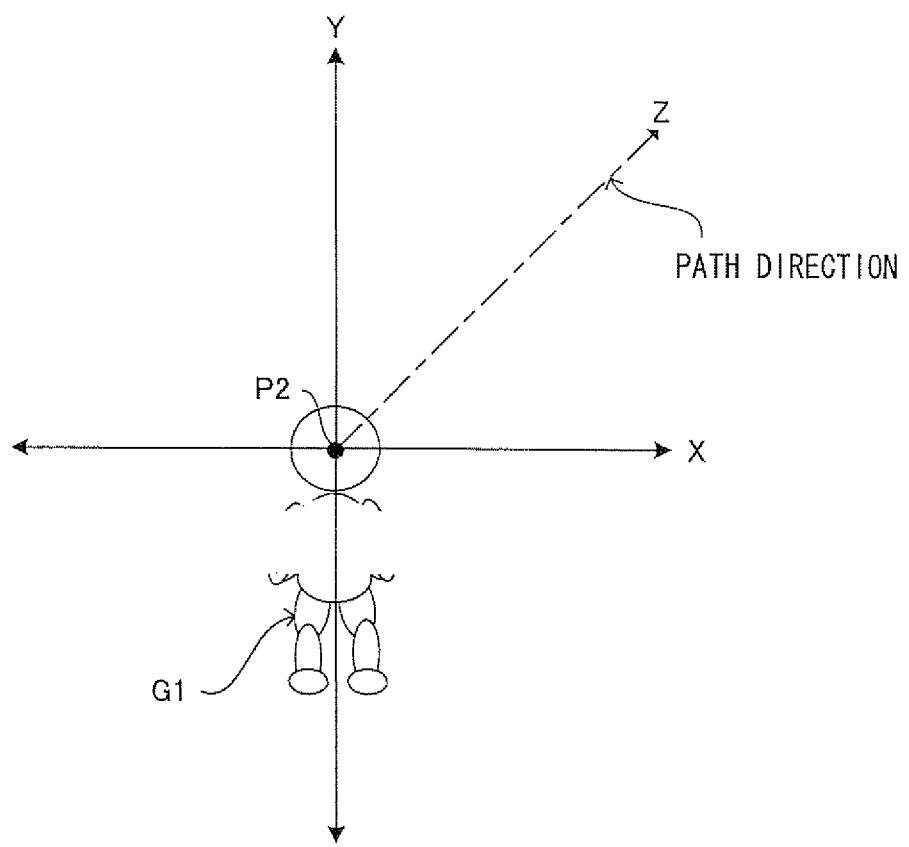
FIG. 21B is a diagram illustrating a movement allowable direction for a player character G1.

Next, movement of the player character G1 based on the character movement operation will be described with reference to FIG. 21B. FIG. 21B is a diagram illustrating the movement allowable direction for the player character G1. As shown in FIG. 21B, in the present embodiment, the Z-axis direction in the local coordinate system of the player character G1 is defined so as to correspond to the path direction. The player character G1 is automatically moved in the Z-axis direction in the local coordinate system of the player character G1, and is not moved in the Z-axis direction in the local coordinate system according to a player performing the character movement operation. However, the position of the player character G1 can be changed from the position of the path only within a predetermined range in the X-axis direction and the Y-axis direction in the local coordinate system according to a player performing the character movement operation.

Specifically, when a player slides the analog operation component 14L in the leftward direction shown in FIG. 1, the player character G1 is moved from the path leftward (in the X-axis negative direction). On the other hand, when a player slides the analog operation component 14L in the rightward direction shown in FIG. 1, the player character G1 is moved from the path rightward (in the X-axis positive direction). When a player slides the analog operation component 14L in the upward direction shown in FIG. 1, the player character G1 is moved from the path upward (in the Y-axis positive direction). When a player slides the analog operation component 14L in the downward direction shown in FIG. 1, the player character G1 is moved from the path downward (in the Y-axis negative direction).

The orientation and the position of the virtual camera Ca in the default state in the aerial battle stage will be described. Firstly, correspondence points are defined over the entire route of the path. The default position and default orientation of the virtual camera Ca are defined for each correspondence point. In FIG. 21A, the default position and default orientation of the virtual camera Ca are determined according to the position and orientation defined in the correspondence point at which the player character G2 is positioned. It is to be noted that it is essential that the default position of the virtual camera Ca is defined on the same level plane as the plane on which the player character G1 is positioned. Further, it is essential that the default orientation of the virtual camera Ca is determined so as to orient the virtual camera Ca toward the representative point P2 of the player character G1. Therefore, when the player character G1 is not moved, the player character G1 is always displayed at the center of the screen.

The position and orientation of the virtual camera Ca are not basically changed when the player character G1 is moved upward, downward, leftward, and rightward from the path according to an operation performed by a player. Therefore, when the player character G1 is moved from the path, the player character G1 is displayed at a position to which the player character G1 has moved from the center of the screen (see FIG. 22C).

In the aerial battle stage, the position and orientation of the virtual camera Ca are not changed according to the sliding operation. Further, the position and the orientation of the virtual camera Ca are not changed after slide-off.

Figure 22A:
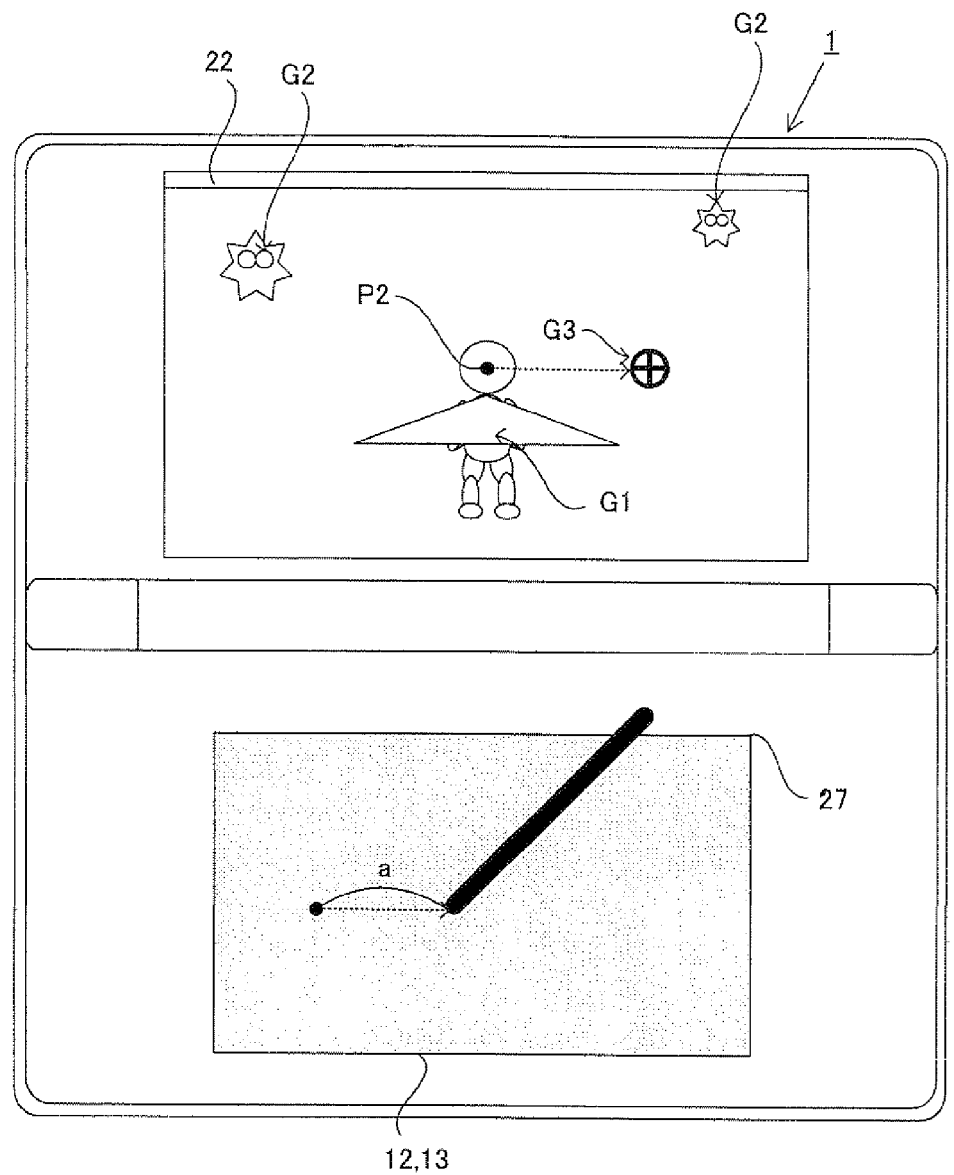
FIG. 22A is a diagram illustrating an exemplary display screen for the aerial battle stage.

Next, the aim G3 in the aerial battle stage will be described with reference to FIG. 22A. FIG. 22A is a diagram illustrating an exemplary display screen for the aerial battle stage.

Figure 22B:
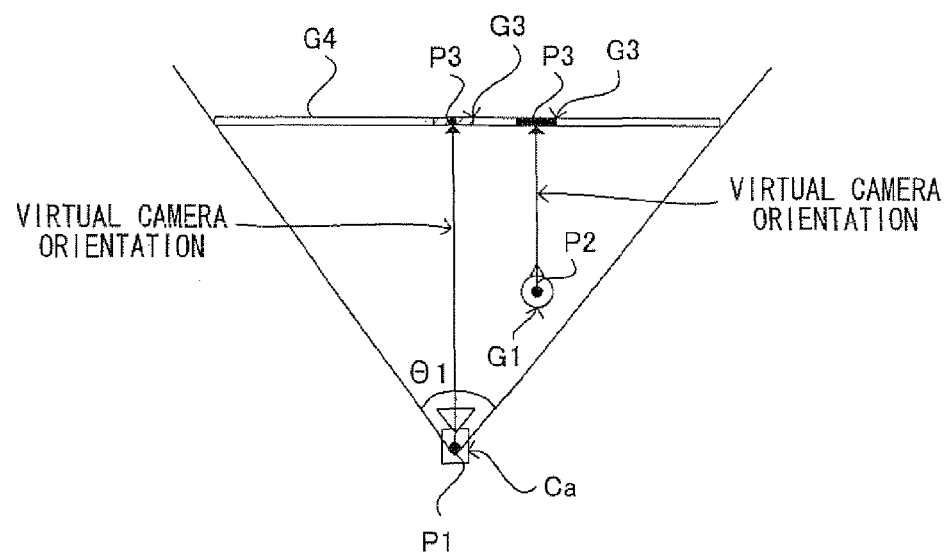
FIG. 22B is a diagram illustrating change of a default position of the aim G3 on a screen surface G4.

As in the ground battle stage, the default position of the aim G3 is set to a point of intersection of the screen surface G4 (or a plane that is distant from the representative point P2 by a predetermined distance in the direction toward which the virtual camera Ca is oriented, and that is orthogonal to the direction toward which the virtual camera Ca is oriented) and a straight line extending from the representative point P2 of the player character G1 in a direction toward which the virtual camera Ca is oriented. When the player character G1 is moved, the default position of the aim G3 is changed based on the position of the representative point P2 of the player character G1 having moved, as shown in FIG. 22B. FIG. 22B is a diagram illustrating a state in which the default position of the aim position G3 on screen surface G4 is changed according to the movement of the player character G1. In FIG. 22B, the default position of the aim G3 obtained before the player character G1 has been moved is indicated by oblique lines, and the default position of the aim G3 obtained after the player character G1 has been moved is indicated by black rectangle.

Figure 22C:
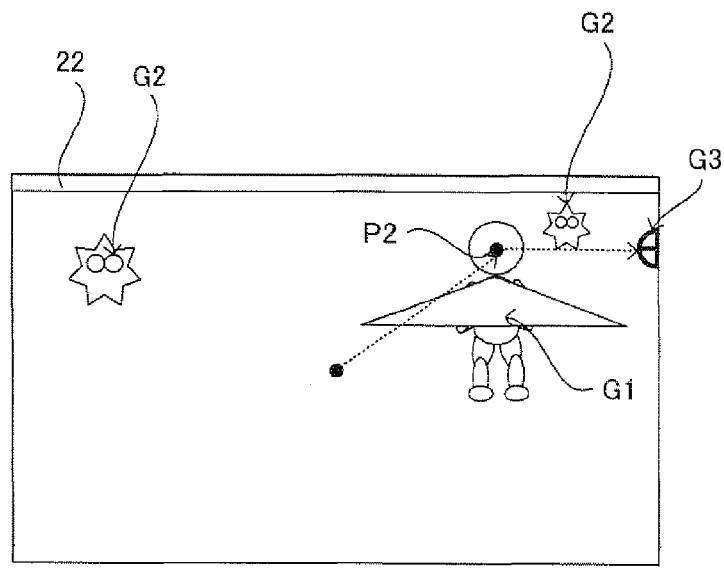
FIG. 22C is a diagram illustrating the upper LCD on which a state is displayed where the default position of the player character G1, and the aim G3 for the default position of the player character G1 are changed.

As described above, the default position of the aim G3 is changed according to the movement of the player character G1. When the sliding operation is not performed, the position of the aim G3 is set to the default position. The aim G3 is moved from the default position according to the moving direction and the sliding amount of the sliding operation during the sliding operation, as in the normal state (when zooming is not performed) in the ground battle stage. Further, the aim G3 is moved due to inertial force after slide-off, as in the normal state in the ground battle stage. In FIG. 22A, the position of the aim G3 is changed from the default position. FIG. 22C is a diagram illustrating the upper LCD 22 on which a state in which the player character G1 is moved from a state shown in FIG. 22A is represented.

As described above, as a result of the position of the aim G3 which is changed from the default position being calculated, the position of the aim G3 (the representative point P3) may be beyond the boundary position of the screen surface G4 according to movement of the player character G1 in some cases. At this time, as shown in FIG. 22C, the position of the aim G3 is amended so as to be the boundary position of the screen surface G4. The aim movement allowable range of the aim G3 in the aerial battle stage is the entire surface area of the screen surface G4. Further, also in the aerial battle stage, as in the ground battle stage, the aim G3 is a plate polygon object which is oriented toward the virtual camera.

Next, various programs and various data stored in the main memory 32 by the game apparatus 1 will be described with reference to FIG. 23.

Figure 23:
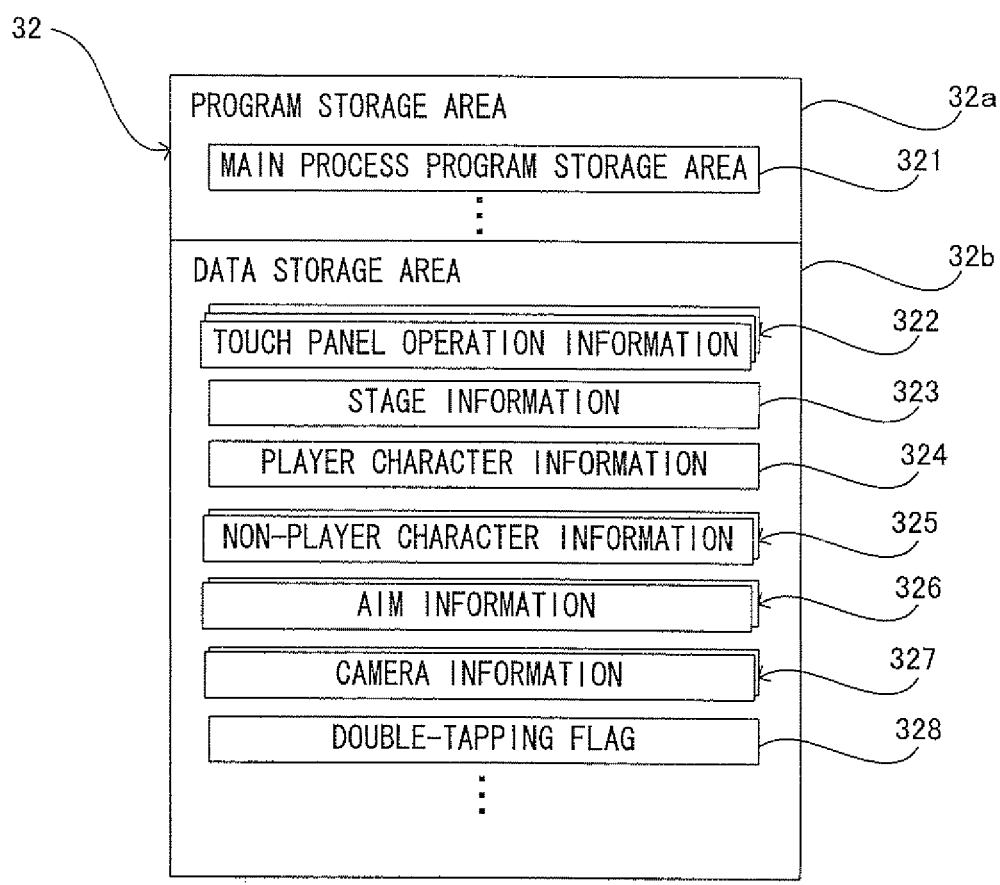
FIG. 23 is a diagram illustrating examples of programs and various data stored in a main memory.

FIG. 23 is a diagram illustrating examples of programs and various data stored in the main memory 32. The various data are stored according to the programs being executed by the game apparatus 1.

Figure 24:
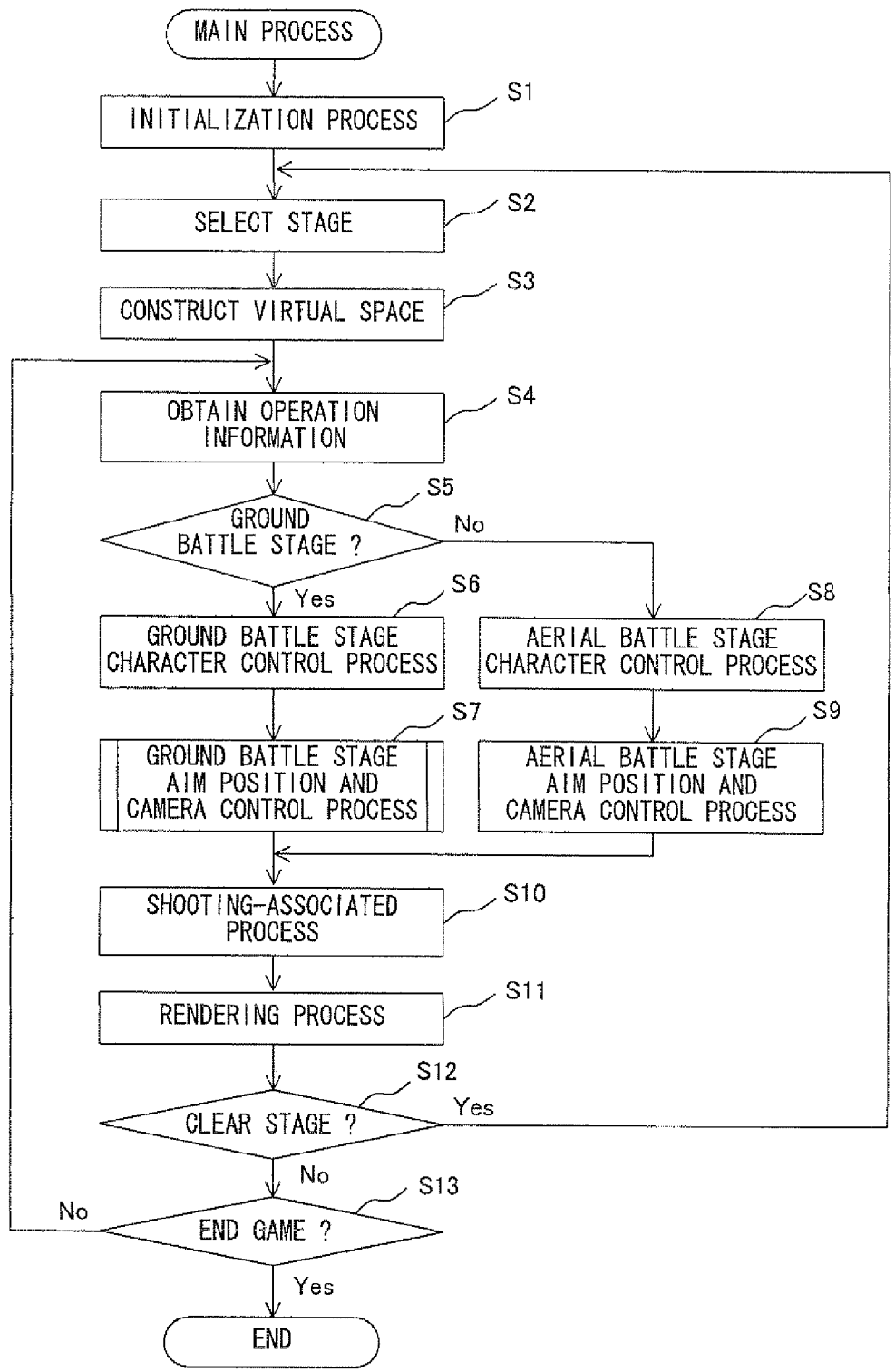
FIG. 24 is a flow chart showing an exemplary main process.

The main memory 32 includes a program storage area 32*a* and a data storage area 32*b*. In the program storage area 32*a*, for example, a main process program 321 for executing a main process which will be described below with reference to FIG. 24 is stored.

In the data storage area 32*b*, touch panel operation information 322, stage information 323, player character information 324, non-player character information 325, aim information 326, camera information 327, and double-tapping flag 328, and the like are stored. The touch panel operation information 322 indicates whether touching is performed, and indicates a position (touch coordinate, that is, input coordinate) on which the touch panel 13 is touched by a player. An input signal from the touch panel 13 is detected at predetermined time intervals (for example, at every rendering cycle of 1/60 seconds). The touch panel operation information 322 represents a touch coordinate based on the input signal. The touch panel operation information 322 obtained over multiple number of times is stored in the data storage area 32b. Further, the stage information 323 is information necessary for generating the virtual space for each stage, and includes, for example, information about background objects, information about a position of each path defined in the virtual space, and information about the start points and the goals.

The player character information 324 is information necessary for generating the player character G1 in the virtual space, and includes, for example, polygon data and texture data of the player character G1, and data representing possessed item. Further, the non-player character information 325 is information necessary for generating the enemy characters G2 in the virtual space, and includes, for example, data representing types and initial positions of the enemy characters G2, polygon data and texture data thereof, and data representing action patterns thereof. As the non-player character information 325, data for the number of the enemy characters G2 positioned in the virtual space is stored. Further, a predetermined flag is set as ON for a predetermined time period in the non-player character information 325 corresponding to the enemy character G2 which has made a specific attack on the player character.

The aim information 326 is information representing a position of the aim G3 on the screen surface G4 as, for example, a vector from the default position on the screen surface G4. Further, the aim information 326 represents a position and an orientation of the aim G3 in the virtual space. It is to be noted that not only the aim information 326 which has been obtained in the most recent process loop, but also the aim information 326 which has been obtained in several previous process loops immediately preceding the most recent process loop are stored. The camera information 327 represents a position, an orientation, a position of a gazing point, and an angle of view of the virtual camera Ca in the virtual space. The double-tapping flag 328 is a flag indicating whether a player has performed double tapping operation. The double-tapping flag 328 is set as ON from a time point when the double tapping operation has been detected, up to a time point when the second tapping in the double tapping operation becomes off.

Hereinafter, a main process performed by the game apparatus 1 will be described with reference to FIG. 24. FIG. 24 is a flow chart showing an exemplary main process performed by the game apparatus 1. Firstly, the core 31B performs an initialization process for the game (S1). Specifically, for example, the core 31B selects, from among a plurality of characters, the player character G1 used in the game, and selects equipment (possessed item) for the player character G1 according to selection of a player. The core 31B selects a stage from among a plurality of stages (S2). At first, a first stage is selected. The core 31B reads, from the cartridge 29, data representing game characters such as the player character G1 and the enemy characters G2, and data representing the topography object for constructing the virtual space for the selected stage, to perform a process of constructing the virtual space (S3). Specifically, the core 31B performs process of, for example, constructing a three-dimensional space for the stage by using the read data, and process of positioning the player character G1, the enemy characters G2, and other objects at initial positions in the virtual space. Further, the core 31B sets the aim G3 and the virtual camera Ca at the default positions in the virtual space, and sets the orientation of the virtual camera Ca to the default orientation.

Next, the core 31B obtains the operation information. Specifically, since the operation information transmitted from the operation component 14 is stored in the main memory, the core 31B obtains the operation information to determine contents of the operation (S4). For example, the core 31B determines whether the touch panel 13 is touched, and determines a touch position on which the touch panel 13 is touched, and the core 31B generates the touch panel operation information 322, and stores the touch panel operation information 322 in the data storage area 32b. Further, the core 31B determines an amount of operation at which and the direction in which the analog operation component 14L is operated, and determines whether the L button 14I is pressed, for example, and stores the determination results in the data storage area 32b.

Next, the core 31B determines whether the stage selected in step S2 is the ground battle stage (S5). When the core 31B determines that the selected stage is the ground battle stage (YES in S5), the core 31B performs a ground battle stage character control process (S6). In the ground battle stage character control process, the core 31B changes a position, an orientation, and an action of the player character G1, based on the operation direction in which and the operation amount at which the analog operation component 14L is operated, and updates the associated data in the main memory 32. The rendering process of S11 described below is performed based on the position, the orientation, and the action of the player character G1 which are updated in the main memory 32. As described above, in the ground battle stage, the core 31B controls the player character G1 so as to horizontally move the player character G1 in the virtual space, based on the operation on the analog operation component 14. Further, in the ground battle stage character control process, the core 31B determines an orientation, a position, and an action of each enemy character G2 in the virtual space, by using a predetermined algorithm, and updates the associated data in the main memory 32. The rendering process of step S11 described below is performed based on the position, the orientation, and the action of each enemy character G2 which are updated in the main memory 32.

Subsequently, the core 31B performs a ground battle stage aim position and camera control process (S7). In the ground battle stage aim position and camera control process, change of the position of the aim, and camera control (change of position and orientation of the camera) are performed as described above during the sliding operation by a player or after slide-off. In the ground battle stage aim position and camera control process, zooming process and change of the position of the aim during the zooming process as described above may be performed. The ground battle stage aim position and camera control process will be described below in detail with reference to, for example, FIG. 25. Thereafter, the core 31B advances the process to subsequent step S10.

On the other hand, when the core 31B determines that the selected stage is not the ground battle stage, namely, when the core 31B determines that the selected stage is the aerial battle stage (NO in S5), the core 31B performs an aerial battle stage character control process (S8). In the aerial battle stage character control process, a position, an orientation, and an action of the player character G1 is set based on the path, and the operation direction in which and the operation amount at which the analog operation component 14L is operated, and updates the associated data in the main memory 32. As described above, in the aerial battle stage, unlike in the ground battle stage, the player character G1 automatically moves along the path defined in the virtual space. The player character G1 is allowed to move from the path by a predetermined or shorter distance in the X-axis direction and in the Y-axis direction in the local coordinate system of the player character G1, based on the operation direction in which and the operation amount at which the analog operation component 14L is operated. Therefore, the core 31B automatically changes the position of the player character G1 so as to move the player character G1 by a predetermined distance in the Z-axis direction in the local coordinate system of the player character G1. Further, when the analog operation component 14L is operated, the player character G1 is moved from the path by the predetermined or shorter distance in the X-axis direction and in the Y-axis direction in the local coordinate system of the player character G1, based on the operation direction in which and the operation amount at which the analog operation component 14L is operated, and the position of the player character G1 is updated in the main memory 32. Data is stored in the main memory 32 such that the player character G1 is always oriented toward the path forward direction. The rendering process of step S11 described below is performed, based on the position, the orientation, and the action of the player character G1, which are updated in the main memory 32. Further, in the aerial battle stage character control process, an orientation, a position, and an action of each enemy character G2 in the virtual space are determined by using a predetermined algorithm, and the associated data is updated in the main memory 32. The rendering process of step S11 described below is performed based on the position, the orientation, and the action of each enemy character G2, which are updated in the main memory 32.

Next, the core 31B performs the aerial battle stage aim position and camera control process (S9). In the aerial battle stage aim position and camera control process, the position of the aim G3 is changed, as described above, while a player is performing the sliding operation. Further, camera control (setting of the position and the orientation) is performed according to the orientation and the position of the virtual camera Ca defined in the path, and the position of the player character G1 in the virtual space. The aerial battle stage aim position and camera control process will be described below in detail with reference to, for example, FIG. 33. Thereafter, the core 31B advances the process to the subsequent step S10.

In step S10, the core 31B performs attack associated process (S10). In the attack associated process, a shooting process associated with shooting performed by the player character G1, and an enemy attack process associated with attacking from the enemy characters G2 upon the player character G1 are performed. In the shooing process, whether an input for shooting operation is performed is determined, and when it is determined that the shooting operation is inputted, the rendering is performed in the rendering process of step S11 described below so as to shoot a bullet. When the shooting operation is detected, the core 31B calculates a shooting direction. The shooting direction is a direction from the position of the representative point P2 of the player character G1 toward the position of the representative point P3 of the aim G3.

Thereafter, the core 31B determines whether the enemy character G2 is successfully shot. Specifically, the core 31B determines whether the bullet object G5 shot from the representative point P2 of the player character G1 in the shooting direction collides against the enemy character G2, and when the collision is detected, it is determined that the enemy characters G2 is successfully shot (a shot bullet hits the enemy character G2). As described above, even if the enemy character G2 is not on a shooting straight line (a straight line of a predetermined length on which the bullet object G5 flies which is shot from the representative point P2 of the player character G1 in the shooting direction), when the position of the enemy character G2 is distant from the shooting straight line by a predetermined or smaller angular distance, and is distant from the player character G1 by a predetermined or shorter distance, the shooting direction is amended so as to be oriented toward the enemy character G2. Therefore, it is determined that the enemy characters G2 is successfully shot.

In the enemy attack process, the core 31B determines whether the enemy character G2 is to perform an attacking action of attacking the player character G1 (for example, shooting action), by using a predetermined algorithm. When it is determined that the enemy character G2 is to perform the attacking action, the core 31B performs the rendering process of step S11 described below so as to cause the enemy character G2 to perform the attacking motion over several frames. The core 31B determines whether the enemy character G2 successfully attacks the player character G1, by using a predetermined algorithm. When the enemy character G2 successfully attacks the player character G1, the physical value of the player character G1 is reduced by a predetermined amount.

Thereafter, the core 31B performs a rendering process for displaying the virtual space on the upper LCD 22 (S11). The core 31B performs a process for displaying a predetermined image also on the lower LCD 12.

Thereafter, the core 31B determines whether the player character G1 reaches the goal, and the stage selected in step S2 is successfully resolved (stage is cleared) (S12). When the stage selected in step S2 is cleared (YES in S12), the core 31B returns the process to step S2, and selects another stage anew, to repeat process step of step S3 and the subsequent process steps. On the other hand, when it is determined that the stage selected in step S2 is not cleared (NO in S12), the core 31B determines whether the game is to be ended due to for example, the physical value of the player character indicating zero (S13). When it is determined that the game is not to be ended (NO in S13), the core 31B returns the process to step S4. On the other hand, when it is determined that the game is to be ended (YES in S13), the core 31B ends the main process.

Figure 25:
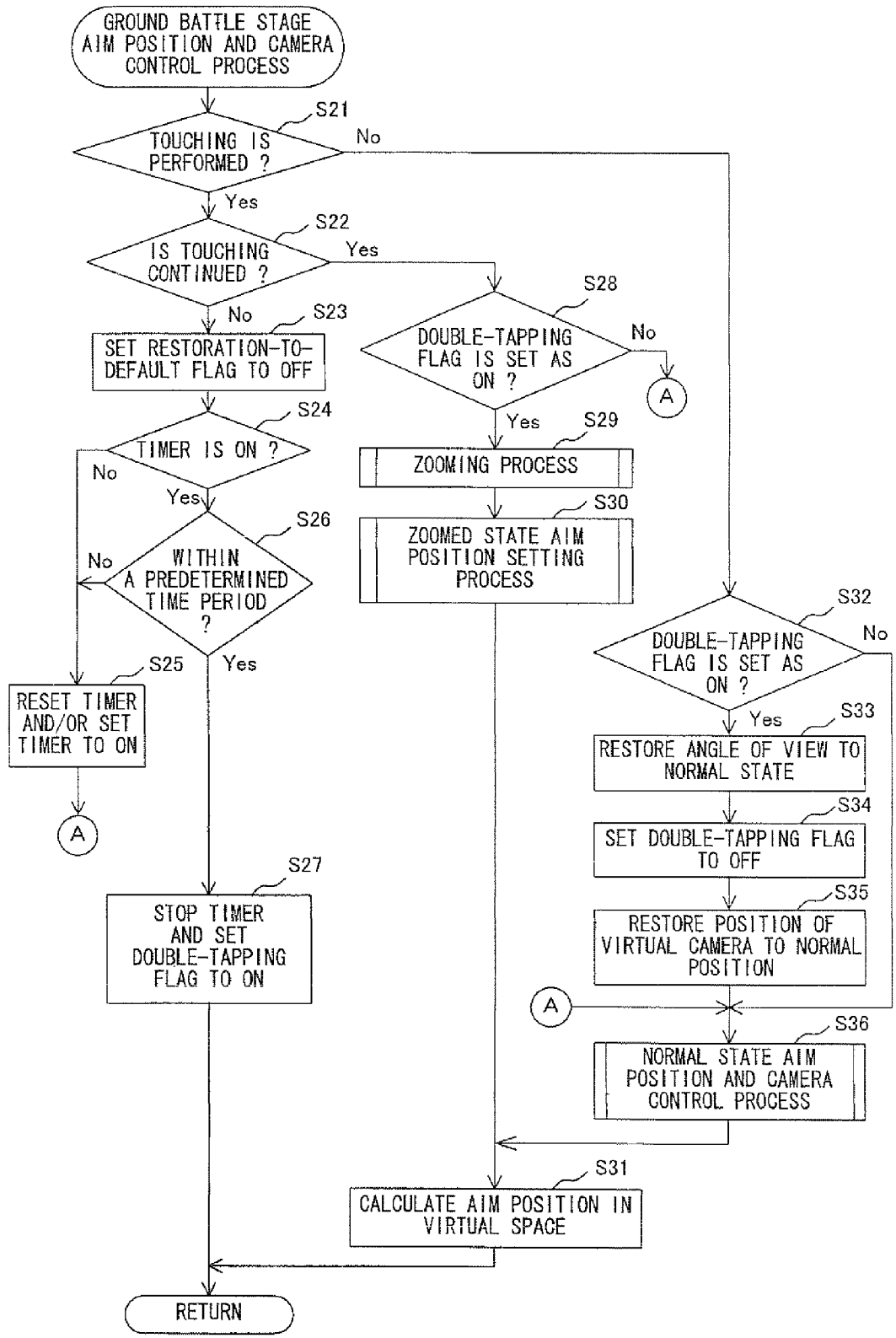
FIG. 25 is a flow chart showing an exemplary ground battle stage aim position and camera control process.

Hereinafter, the ground battle stage aim position and camera control process of step S7 will be described with reference to FIG. 25. FIG. 25 is a flow chart showing an exemplary ground battle stage aim position and camera control process. Firstly, the core 31 determines whether touching is performed (whether an input is performed), with reference to the touch panel operation information 322 having been most recently obtained (S21). When it is determined that the touching is performed (YES in S21), the core 31B determines whether the touching is being continued (S22). The core 31B determines whether the touching is being continued, according to whether the touching has been performed in the process loop of the immediately preceding frame. At this time, the touch panel operation information 322 having been obtained in the immediately preceding process loop is used.

When it is determined that the touching is not being continued (NO in S22), the core 31B sets the restoration-to-default flag (which will be described below in detail) to OFF (S23), and determines whether the timer is on (S24). The timer is not on only in the first process loop, and in a period from touch-off of the second touching in the double tapping operation, up to the immediately following touch-on. In other cases, the timer is on. When it is determined that the timer is not on (NO in S24), the core 31B resets a timer counted value, and sets the timer so as to be on (S25), thereby advancing the process to step S36. On the other hand, when it is determined that the timer is on (YES in S24), the core 31B determines whether the timer counted period is shorter than or equal to a predetermined time period (S26). When it is determined that the timer counted period is shorter than or equal to the predetermined time period (YES in S26), the core 31B resets the timer counted value, and sets the timer so as to be off, and sets the double-tapping flag 328 to ON (S27). Thereafter, the core 31B ends the ground battle stage aim position and camera control process, and returns the process to step S10 shown in FIG. 24.

On the other hand, when the timer counted period is longer than the predetermined time period (NO in S26), the core 31B resets the timer counted value. Thus, when the timer counter period is longer than the predetermined time period, the timer is reset to an initial value, and the counting is started again from the initial value. Thereafter, the core 31B advances the process to step S36. Specifically, the timer measures a time period from the immediately preceding touch-on to the most recent touch-on. This is used for determining whether the double tapping is performed.

Next, a process performed when it is determined in step S22 that the touching is being continued (YES in S22) will be described. At this time, the core 31B determines whether the double-tapping flag 328 is set as ON (S28). When it is determined that the double-tapping flag 328 is not set as ON, namely, when it is determined that the double tapping operation is not performed (NO in S28), the core 31B performs a process step of step S36 described below. On the other hand, when it is determined that the double-tapping flag 328 is set as ON (YES in S28), the core 31B performs a zooming process (S29) for displaying the virtual space which is zoomed in on, and a zoomed state aim position setting process for setting a position of the aim G3 to a position desired by a player on the screen surface G4 (S30). The zooming process and the zoomed state aim position setting process will be described below in detail with reference to FIG. 31 and FIG. 32. Thereafter, the core 31B calculates a position of the aim G3 in the world coordinate system, based on the position of the aim G3 set on the screen surface G4, and updates the associated data in the main memory 32 (S31). The aim G3 is rendered in step S11 shown in FIG. 24, based on the set position of the aim G3. The core 31B then ends the ground battle stage aim position and camera control process, and returns the process to step S10 shown in FIG. 24.

Next, a process performed when it is determined in step S21 that the touching is not performed (non-input state) will be described. When it is determined that the touching is not performed (NO in S21), the core 31B determines whether the double-tapping flag 328 is set as ON (S32). When it is determined that the double tapping flag 328 is set as ON (YES in S32), the core 31B restores the setting of the angle θ1 of view of the virtual camera Ca to a normal setting (S33). Thus, when the touch-off is detected, a particular setting for the double tapping operation is cancelled.

The core 31B sets the double-tapping flag 328 to OFF (S34). Subsequently, the core 31B horizontally moves the virtual camera Ca positioned at a position (in a subjective point of view) of the representative point P2 of the player character G1, in a direction opposite to the imaging direction of the virtual camera Ca, to a position which is distant from the representative point P2 by a predetermined distance (S35). Thereafter, a normal state aim position and camera control process is performed (S36). The normal state aim position and camera control process will be described below in detail with reference to FIG. 31 and FIG. 32. The rendering process of step S11 shown in FIG. 24 is performed based on the orientation and the position of the virtual camera Ca having been set in the normal state aim position and camera control process. Thereafter, the core 31B calculates a position of the aim G3 in the world coordinate system in step S31, and update the associated data in the main memory 32 (S31). The core 31B ends the ground battle stage aim position and camera control process, and returns the process to step S10 shown in FIG. 24.

Figure 26:
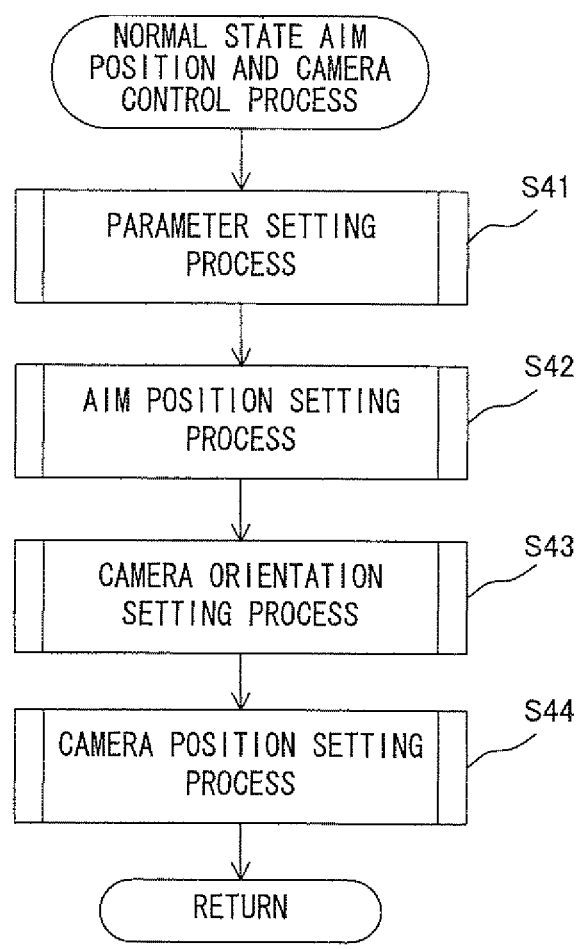
FIG. 26 is a flow chart showing an exemplary normal state aim position and camera control process.

Next, the normal state aim position and camera control process of step S36 shown in FIG. 25 will be described with reference to FIG. 26 to FIG. 30. FIG. 26 is a flow chart showing an exemplary normal state aim position and camera control process. Firstly, the core 31B performs a process (parameter setting process) for setting various parameters necessary for calculating the position of the aim G3, and the orientation and the position of the virtual camera Ca (S41). The parameter setting process will be described below in detail with reference to FIG. 27. Next, the core 31B calculates the position of the aim G3 on the screen surface G4, and performs a process (aim position setting process) for determining the position and the orientation of the aim G3 in the virtual space, based on the calculated position of the aim G3 (S42). The aim position setting process will be described below in detail with reference to FIG. 28.

After that, the core 31B performs a process (camera orientation setting process) for calculating and setting an orientation of the virtual camera Ca in the virtual space (S43). The camera orientation setting process will be described below in detail with reference to FIG. 29. The core 31B performs a process (camera position setting process) for calculating and setting the position of the virtual camera Ca in the virtual space, based on the orientation of the virtual camera Ca having been calculated in step S43 (S44). The camera position setting process will be described below in detail with reference to FIG. 30. After that, the core 31B ends the normal state aim position and camera control process, and advances the process to step S31 shown in FIG. 25.

Figure 27:
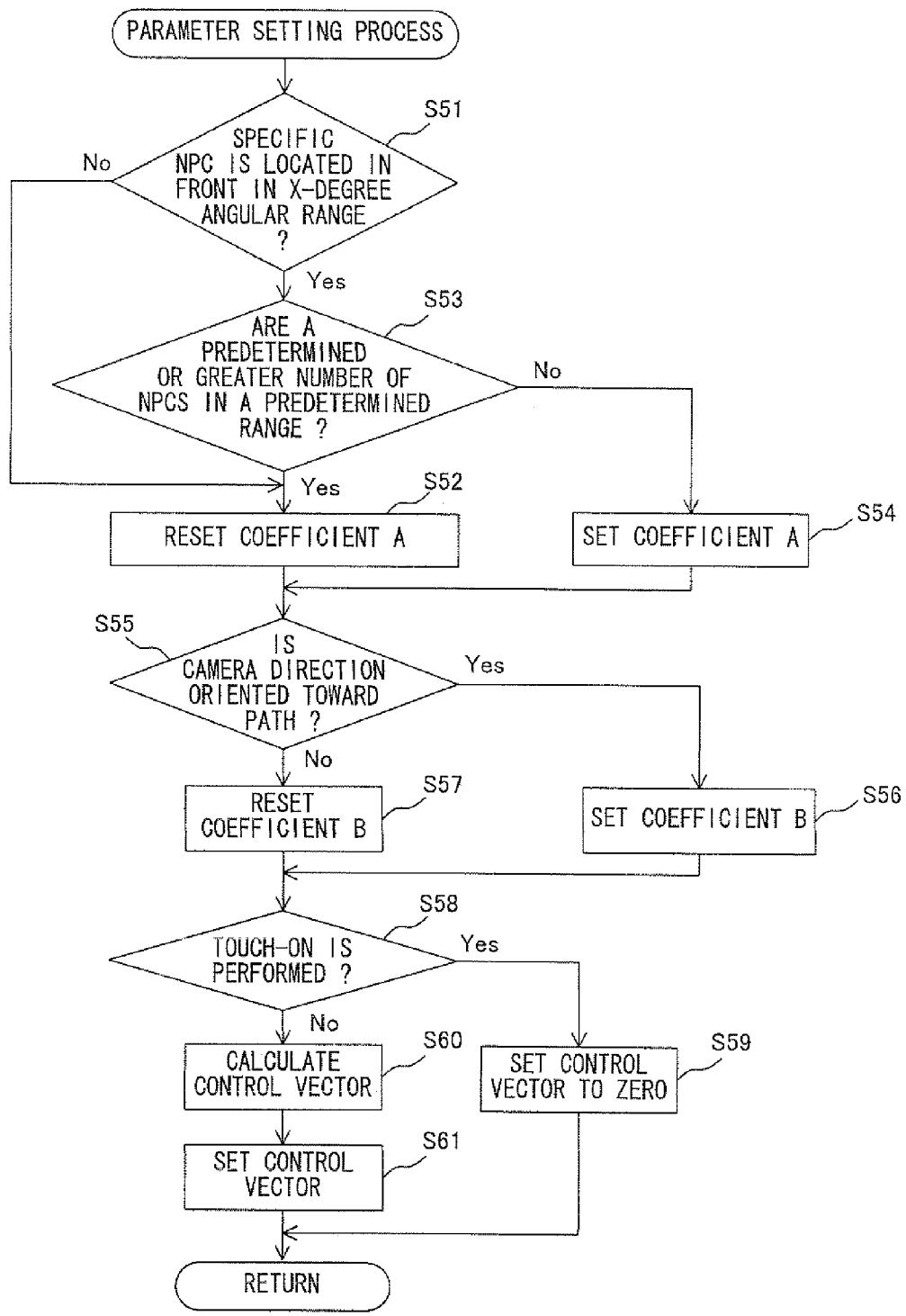
FIG. 27 is a flow chart showing an exemplary parameter setting process.

The parameter setting process of step S41 will be described with reference to FIG. 27. FIG. 27 is a flow chart showing an exemplary parameter setting process. Firstly, the core 31B determines whether an angle between a straight line extending from the position of the virtual camera Ca in the imaging direction of the virtual camera Ca, and a straight line extending from the position of the virtual camera Ca to a specific one of the enemy characters G2, is less than or equal to a predetermined angle (S51).

The specific one of the enemy characters G2 is determined according to, for example, the flag set in the non-player-character information 315 shown in FIG. 23. Further, although, in the present embodiment, the determination of step S51 is performed only for a specific one of the enemy characters G2, the determination of step S51 may be performed for all the enemy characters G2. Moreover, the determination of step S51 may be performed for the non-player character other than the enemy characters G2. Instead thereof, in step S51, it may be determined whether a specific one of the enemy characters G2 is positioned on the screen surface G4 so as to be distant, by a predetermined or shorter distance, from the position of the aim G3 having been obtained in the immediately preceding process loop.

When the determination of step S51 indicates No, the core 31B resets a coefficient A (which will be described below in detail), namely, sets the coefficient A to one (S52), and the core 31b advances the process to step S55. On the other hand, when the determination of step S51 indicates Yes, the core 31B determines whether the number of the enemy characters G2 which are distant from the representative point P2 of the player character G1 by a predetermined or shorter distance is greater than or equal to a predetermined number (S53). The core 31B may determine whether the number of the enemy characters G2 which are distant from the position of the virtual camera Ca, instead of the representative point P2 of the player character G1, by a predetermined or shorter distance is greater than or equal to a predetermined number. When the core 31B determines that the number of the enemy characters G2 which are distant from the representative point P2 of the player character G1 by the predetermined or shorter distance is greater than or equal to the predetermined number (YES in S53), the core 31B resets the coefficient A (S52), and advances the process to step S55. On the other hand, when the core 31B determines that the number of the enemy characters G2 which are distant from the representative point P2 of the player character G1 by the predetermined or shorter distance is less than the predetermined number (NO in S53), the core 31B sets (S54) the coefficient A to, for example, a positive value smaller than one, and advances the process to step S55.

Next, the process step of step S55 will be described. In step S55, the core 31B determines whether the virtual camera Ca is positioned so as to be distant from the path by a predetermined or shorter distance, and a value representing a difference between the orientation of the virtual camera Ca and the orientation of the path is less than or equal to a predetermined value (S55). When it is determined that the value representing the difference between the orientation of the virtual camera Ca and the orientation of the path is less than or equal to the predetermined value (YES in S55), the core 31B sets a coefficient B to, for example, a positive value smaller than one (S56), and advances the process to the subsequent step S58. On the other hand, when it is determined that the value representing the difference between the orientation of the virtual camera Ca and the orientation of the path is greater than the predetermined value (NO in S55), the core 31B resets coefficient B (specifically, sets the coefficient B to one) (S57), and advances the process to subsequent step S58.

In step S58, the core 31B determines whether the touch-on is performed. The touch-on represents a state in which the touch is detected in the process loop of the most recent frame, and non-touch (no touch) is detected in the process loop of the frame immediately preceding the most recent frame (that is, the moment the touch is performed), as described above. When it is determined that the touch-on is performed (YES in S58), the core 31B sets a control vector to zero (S59), and the core 31B ends the aim position setting process, and advances the process to the camera orientation setting process of step S43 shown in FIG. 26.

On the other hand, when it is determined that the touch-on is not performed (NO in S58), the core 31B calculates the control vector (S60). The control vector is a value used for calculating the position of the aim G3, and the position and the orientation of the virtual camera Ca. Hereinafter, a method for calculating the control vector will be described in detail. The method for calculating the control vector is different among "touch-on time (the moment touch-on is performed), "when touching is being continued", "touch-off time (the moment touch-off is performed", and "when non-touching is being continued". Next, the method for calculating the control vector "when touching is being continued" will be described. "When touching is being continued", touching on the touch panel 13 is being continuously detected. At this time, the control vector is calculated by using the following equation (A).

$$\text{Control vector} = \text{the most recent touch position} - \text{immediately preceding touch position} \quad \text{equation (A)}$$

As described above, the change of the touch position can be separated into the X-coordinate change and the Y-coordinate change. Therefore, both the X-coordinate control vector and the Y-coordinate control vector are calculated by using the equation (A). Hereinafter, the X-coordinate control vector and the Y-coordinate control vector may be referred to as "X-control vector" and "Y-control vector", respectively. When the touch position is changing due to sliding on the touch panel (during the sliding operation), the control vector does not indicate zero. However, when the touching is being continuously performed on one fixed point on the touch panel 13, the most recent touch position is equal to the immediately preceding touch position, and the control vector indicates zero. The most recent touch position and the immediately preceding touch position are obtained based on the touch panel operation information 322.

Next, a method for calculating the control vector during "touch-off time" will be described. The "touch-off time" is a time in which non-touch is detected in the process loop of the most recent frame, and touch has been detected in the process loop of the frame immediately preceding the most recent frame. At this time, the control vector is calculated by using the following equation (B). Both the X-control vector and the Y-control vector are calculated as in the same manner as in the method for calculating the control vector "when touching is being continued".

$$\text{Control vector} = (\text{touch position}(n) - \text{touch position}(n+1)) + (\text{touch position}(n-1) - \text{touch position}(n)) \ldots (\text{touch position}(1) - \text{touch position}(2))/n \quad \text{equation (B)}$$

In equation (B), n represents a natural number greater than or equal to two. The touch position (n) is a touch position detected in a frame preceding, by n frames, the frame in which the touch-off is detected. The touch position (n+1) is a touch position detected in a frame preceding, by (n+1) frames, the frame in which the touch-off is detected. The touch position (n−1) is a touch position detected in a frame preceding, by (n−1) frames, the frame in which the touch-off is detected. Further, the touch position (1) is a touch position detected in a frame immediately preceding the frame in which the touch-off is detected, and the touch position (2) is a touch position detected in a frame preceding, by two frames, the frame in which the touch-off is detected. In equation (B), a difference between each of the touch positions in the previous n frames and the corresponding immediately preceding touch position is calculated, and an average of the differences is calculated. Namely, an average of each sliding amount (change amount of touch position per one frame) in the previous n frames is calculated according to equation (B). In the present embodiment, n is a fixed value.

In equation (B), when the sliding operation is performed at least once in the previous n frames, the control vector calculated in equation (B) does not indicate zero. However, when the touch position is not changed in any of the previous n times operations (when the touch panel 13 is touched at one fixed point so as to stop the touching operation), the control vector calculated in equation (B) indicates zero.

Subsequently, a method for calculating the control vector "when non-touching is being continued" will be described. Herein, "when non-touching is being continued" is a time period in which no touching is performed on the touch panel 13. "When non-touching is being continued" does not include the "touch-off time". At this time, the control vector is calculated by using the following equation (C). Both the X-control vector and the Y-control vector are calculated in the same manner as in the method for calculating the control vector for "when touching is being continued", and for the "touch-off time".

Control vector=(immediately preceding control vector+(immediately preceding control vector×attenuation rate))+2×coefficient A×coefficient B   equation (C)

As described above, when the sliding operation is not performed at all in the previous n frames immediately preceding the frame in which touch-off is performed, the control vector calculated in equation (B) indicates zero. At this time, the control vector in the immediately preceding frame is calculated as zero according to equation (C), so that the control vector is calculated as zero in equation (C).

The core 31B updates the control vector calculated as described above in the main memory 32 (S61). The control vector is used for calculating a position of the aim in the aim position setting process of step 42 of FIG. 26, and is used for calculating an orientation of the virtual camera Ca in the camera orientation setting process of step S43. Thereafter, the core 31B ends the parameter setting process, and advances the process to the aim position setting process of step S42 of FIG. 26.

Figure 28:
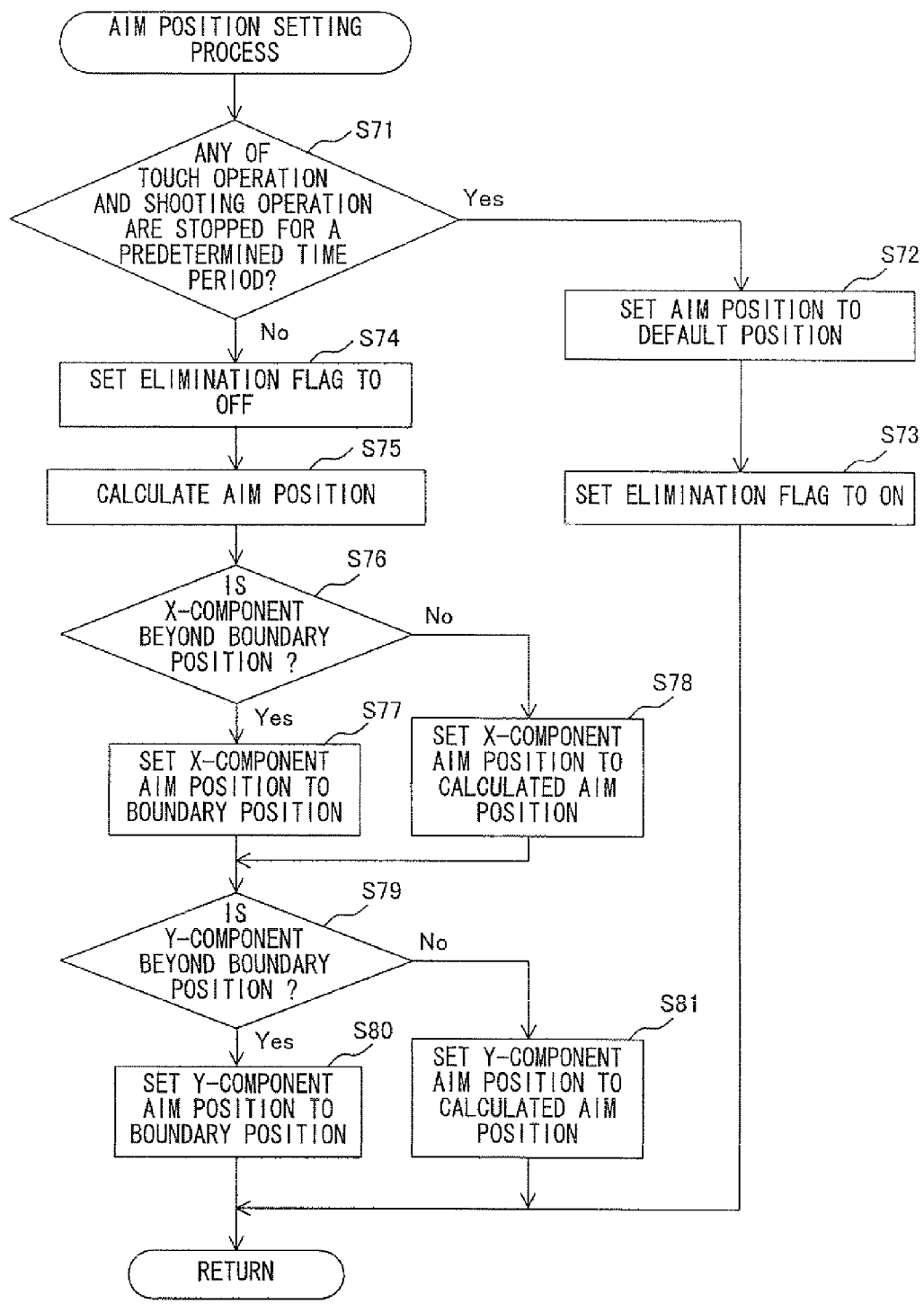
FIG. 28 is a flow chart showing an exemplary aim position setting process.

Next, the aim position setting process of step S42 will be described with reference to FIG. 28. FIG. 28 is a flow chart showing an exemplary aim position setting process. Firstly, the core 31B determines whether both of touching operation on the touch panel 13 and shooting operation are stopped for a predetermined time period (S71). When it is determined in step S71 that both of touching operation on the touch panel 13 and shooting operation are stopped fort the predetermined time period, the core 31B sets the position of the aim G3 on the screen surface G4 to the default position (S72), and sets the elimination flag to ON (S73). When the elimination flag is set to ON, the aim G3 is not rendered (S11) in the rendering process (step S11). Thus, if a player stops both of touching operation and shooting operation for the predetermined time period, the aim G3 is restored to the default position. Thereafter, the core 31B ends the aim position setting process, and advances the process to the camera orientation setting process of step S43 shown in FIG. 26.

On the other hand, a process performed when it is determined in step S71 that at least one of touching operation and shooting operation is performed within the predetermined time period, will be described. At this time, the core 31B sets the elimination flag to OFF (S74), and calculates the position of the aim G3 on the screen surface G4 (S75). Hereinafter, a method for calculating the position of the aim will be described. The position (aim position) of the aim G3 on the screen surface G4 is calculated by using the following equation (D).

The most recent aim position=immediately preceding aim position+control vector   equation (D)

The aim position is calculated separately as an X-coordinate position and a Y-coordinate position. The aim position is calculated as coordinates by using the default position as a reference (X=0, Y=0).

As described above, the control vector does not indicate zero during inertial force control after the slide-off and during sliding operation. Therefore, the most recent aim position is different from the immediately preceding aim position. On the other hand, when no touching is performed (excluding the inertial force control after slide-off), or when the touch-on is performed, or when the same position is being continuously touched, the control vector indicates zero. Therefore, the most recent aim position is not changed from the immediately preceding aim position. When the touch-on is performed, the control vector indicates zero. By utilizing this, in a case where, while the position of the aim G3 is being changed due to inertial force after slide-off, a player touches on a desired point on the touch panel 13, change of the position of the aim G3 moving due to the inertial force can be stopped.

Next, the core 31B determines whether the position of the aim G3 calculated in step S75 is beyond the X-coordinate boundary position (outside the aim movement allowable range) (S76). When the position of the aim. G3 is determined to be beyond the X-coordinate boundary position (YES in S76), the core 31B sets (S77) the X-coordinate position of the aim G3 on the screen surface G4 to the X-coordinate boundary position (a coordinate position of the boundary beyond which the calculated coordinate position is changed). Thereafter, the core 31B advances the process to step S79. On the other hand, the position of the aim G3 is not determined to be beyond the X-coordinate boundary position (NO in S76), the core 31B sets the X-coordinate position of the aim G3 on the screen surface G4, to the position calculated in step S75 (S78). Thereafter, the core 31B advances the process to step S79.

Next, the process step of step S79 will be described. The core 31B determines whether the position of the aim G3 calculated in step S75 is beyond the Y-coordinate boundary position (outside the aim movement allowable range) (S79). When the position of the aim G3 is determined to be beyond the Y-coordinate boundary position (YES in S79), the core 31B sets (S80) the Y-coordinate position of the aim G3 on the screen surface G4 to the Y-coordinate boundary position (a coordinate position of the boundary beyond which the calculated coordinate position is changed). Thereafter, the core 31B ends the aim position setting process, and advances the process to the camera orientation setting process of step S43 shown in FIG. 26. On the other hand, the position of the aim G3 is not determined to be beyond the Y-coordinate boundary position (NO in S79), the core 31B sets the Y-coordinate position of the aim G3 on the screen surface G4, to the position calculated in step S75 (S81). Thereafter, the core 31B ends the aim position setting process, and advances the process to the camera orientation setting process of step S43 shown in FIG. 26.

Figure 29:
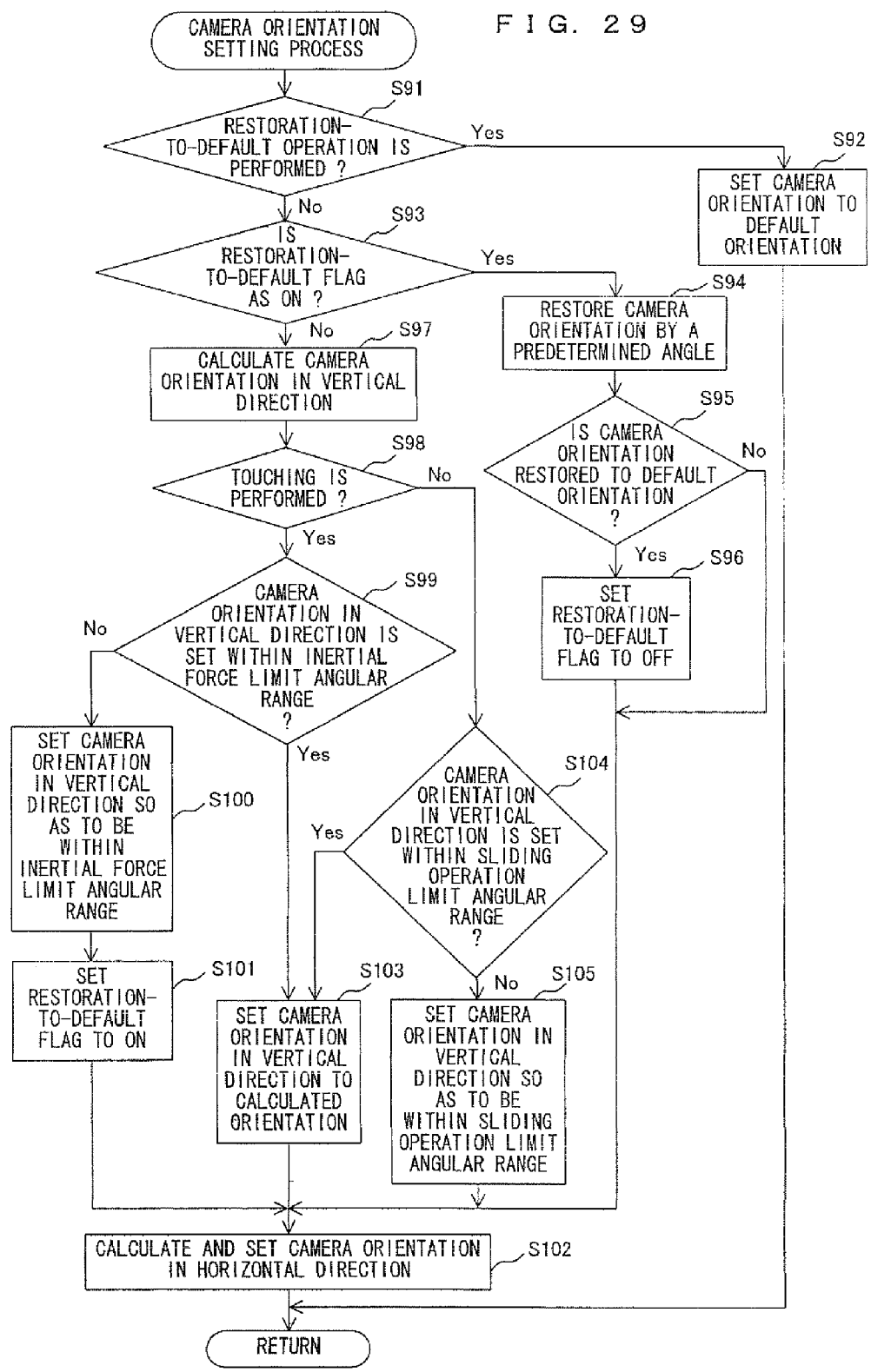
FIG. 29 is a flow chart showing an exemplary camera orientation setting process.

The camera orientation setting process of step S43 will be described with reference to FIG. 29. FIG. 29 is a flow chart showing an exemplary camera orientation setting process. Firstly, the core 31B determines whether a player performs restoration-to-default operation (S91). The restoration-to-default operation herein is, for example, an operation of pressing the R button 14J. When the restoration-to-default operation is determined to be performed (YES in S91), the core 31B sets the orientation of the virtual camera Ca to the default orientation (S92). Thereafter, the core 31B ends the camera orientation setting process, and advances the process to the camera position setting process of step S44 shown in FIG. 26. In step S92, specifically, the orientation of the virtual camera Ca is set in the default state such that the virtual camera Ca is horizontally oriented toward the player character G1 (the representative point P2). Further, when the orientation of the virtual camera Ca is set in this manner, the position of the virtual camera is set, in the camera position setting process of step S44 described below, to a position which is on the same level plane as the position of the representative point P2 of the player character G1, and is distant from the representative point P2 by a predetermined distance, such that the orientation of the player character G1 in the horizontal direction is the same as the orientation of the virtual camera Ca in the horizontal direction.

On the other hand, when it is determined that the restoration-to-default operation is not performed (NO in S91), the core 31B determines whether the restoration-to-default flag is set as ON (S93). When the restoration-to-default flag is set as ON (YES in S93), the core 31B restores the virtual camera Ca to the default position by a predetermined angle in the vertical direction (S94). Thus, when the restoration-to-default flag is set as ON, an angle of the virtual camera Ca in the vertical direction, relative to the vertical direction, is gradually restored to an angle corresponding to the default orientation (restoration-to-default state). It is to be noted that, as shown in FIG. 25, when the touch-on is performed, the restoration-to-default flag is set to OFF (S23), and therefore the restoration-to-default state is cancelled by a player performing the touch-on.

The core 31B determines whether the orientation of the virtual camera Ca has been restored to the default orientation (S95). When the orientation of the virtual camera Ca has been restored to the default orientation (YES in S95), the core 31B sets the restoration-to-default flag to OFF (S96). Thereafter, the core 31B advances the process to step S102. On the other hand, when the orientation of the virtual camera Ca has not been restored to the default orientation (NO in S95), the core 31B advances the process to step S102 without setting the restoration-to-default flag to OFF.

Next, a process performed by the core 31B when the determination of step S93 indicates NO, will be described. When the restoration-to-default flag is set as OFF (NO in S93), the core 31B calculates an orientation of the virtual camera Ca in the vertical direction (S97). Hereinafter, the method for calculating the orientation of the virtual camera Ca will be described. In step S97, only the orientation of the virtual camera Ca in the vertical direction is calculated. A method for calculating the orientation of the virtual camera Ca in the horizontal direction in step S102 described below will be described here. Firstly, a camera head rotation vector is calculated by using equation (E).

$$\text{Camera head rotation vector} = \text{control vector} - (\text{the most recent aim position} - \text{the immediately preceding aim position}) \quad \text{equation (E)}$$

In equation (E), the difference between the most recent aim position and the immediately preceding aim position is subtracted from the control vector for the following reason. Namely, among components of the control vector, as shown in FIG. 9, the sliding amount a1 of the sliding operation performed until the aim G3 reaches the boundary, is used for moving the aim G3, and the sliding amount a2 obtained after the aim G3 reaches the boundary is used for changing the orientation of the virtual camera. Further, also after slide-off, a component of the control vector for moving the aim G3 so as to reach the boundary, is used for moving the aim G3. Therefore, the component used for moving the aim G3 is eliminated from the control vector according to equation (E), to calculate the camera head rotation control vector used for changing the orientation of the virtual camera Ca. As described above, the control vector contains the Y-control vector and the X-control vector. Therefore, the camera head rotation vector is calculated separately as the X-component and the Y-component. The X-component camera head rotation vector and the Y-component camera head rotation vector may be separately referred to as an "X-camera head rotation vector", and a "Y-camera head rotation vector", respectively.

As described above, the control vector does not indicate zero during inertial force control after slide-off and during the sliding operation. Therefore, at this time, the camera head rotation vector does not indicate zero. On the other hand, when touching is not performed (excluding inertial force control after slide-off), when the touch-on is performed, or when the same position is being continuously touched, the control vector indicates zero. Therefore, the camera head rotation vector also indicates zero. When the touch-on is performed, the camera head rotation vector indicates zero. By utilizing this, while the position and the orientation of the virtual camera Ca are being changed due to inertial force after slide-off, if a player touches on the touch panel 13 at a point desired by the player so as to fix the touch position, the change of the position and the orientation of the virtual camera Ca can be stopped.

Next, a camera angular velocity is calculated by using equation (F).

$$\text{Camera angular velocity} = \text{camera head rotation vector} \times \text{coefficient } D \quad \text{equation (F)}$$

The camera angular velocity (vertical direction camera angular velocity) in the vertical direction is calculated by using the Y-camera head rotation vector, and the camera angular velocity (horizontal direction camera angular velocity) in the horizontal direction is calculated by using the X-camera head rotation vector.

The orientation of the virtual camera Ca in the vertical direction is calculated such that the virtual camera Ca is rotated by the horizontal direction camera angular velocity in the vertical direction. Further, the orientation of the virtual camera Ca in the horizontal direction is calculated such that the virtual camera Ca is rotated by the horizontal direction camera angular velocity in the horizontal direction. The center about which the virtual camera Ca is rotated is the representative point P2 of the player character.

As described above, the camera head rotation vector does not indicate zero during the inertial force control after slide-off and during the sliding operation. Therefore, the camera angular velocity does not indicate zero, and the orientation of the virtual camera Ca is changed. On the other hand, when touching is not performed (excluding the inertial force control after slide-off), when the touch-on is performed, or when the same position is being continuously touched, the camera head rotation vector indicates zero. Therefore, the camera angular velocity also indicates zero, and the orientation of the virtual camera Ca is not changed.

After the orientation of the virtual camera Ca in the vertical direction is calculated, in step S97, by using the method for calculating the orientation of the virtual camera Ca as described above, the core 31B determines whether the touch panel 13 is in the touched state (S98). When the core 31B determines that the touch panel 13 is in the non-touched state (NO in S98), the core 31B determines whether difference between the default orientation and the calculated orientation of the virtual camera Ca in the vertical direction is less than or equal to a predetermined angle (S99). The predetermined angle is an angle of the change allowable range of the orientation of the virtual camera Ca, which is used after slide-off, and is, for example, angle $\alpha 1°$ as shown in FIG. 12. Hereinafter, the predetermined angle is referred to as an inertial force limit angle.

When it is determined that the difference between the default orientation and the calculated orientation of the virtual camera Ca in the vertical direction is greater than the inertial force limit angle (NO in S99), the core 31B amends the orientation of the virtual camera Ca calculated in step S97 such that the difference between the default orientation and the orientation of the virtual camera Ca is less than or equal to the inertial force limit angle, and the orientation of the virtual camera Ca is set to the orientation having been obtained by the amendment (S100). After that, the core 31B sets the restoration-to-default flag to ON (S101). Thus, when the difference between the default orientation and the orientation of the virtual camera Ca in the vertical direction is less than or equal to the inertial force limit angle, the orientation of the virtual camera Ca in the vertical direction is gradually restored to the default orientation by execution of steps S94 to S96. Thereafter, the core 31B calculates the orientation of the virtual camera Ca in the horizontal direction, by using the method for calculating the orientation of the virtual camera Ca as described above, and sets, to the calculated orientation, the orientation of the virtual camera Ca in the horizontal direction (S102). Thereafter, the core 31B ends the camera orientation setting process, and advances the process to the camera position setting process of step S44 shown in FIG. 26.

On the other hand, when the core 31B determines that the difference between the default orientation and the calculated orientation of the virtual camera Ca in the vertical direction is less than or equal to the inertial force limit angle (YES in S99), the core 31B sets the orientation of the virtual camera Ca in the vertical direction, to the orientation calculated in step S97 (S103). The core 31B calculates and updates the orientation of the virtual camera Ca in the horizontal direction in step S102. Thereafter, the core 31B ends the camera orientation setting process, and advances the process to the camera position setting process of step S44 shown in FIG. 26.

Next, a process performed when the determination of step S98 indicates YES will be described. When the core 31B determines that the touch panel 13 is in the touched state (YES in S98), the core 31B determines whether difference between the default orientation and the calculated orientation of the virtual camera Ca in the vertical direction is less than or equal to a predetermined angle (S104). The predetermined angle is different from the angle used in step S99, and is an angle indicating the change allowable range of the orientation of the virtual camera Ca, which is used in the sliding operation. The predetermined angle is, for example, angle $\alpha 1°$ and $\alpha 2°$ shown in FIG. 11. Hereinafter, the predetermined angle is referred to as a sliding operation limit angle.

When the core 31B determines that the difference between the default orientation and the calculated orientation of the virtual camera Ca in the vertical direction is greater than the sliding operation limit angle (NO in S104), the core 31B amends the orientation of the virtual camera Ca calculated in step S97 such that the difference between the default orientation and the orientation of the virtual camera Ca is less than or equal to the sliding operation limit angle, and sets the orientation of the virtual camera Ca to the orientation having been obtained by the amendment (S105). The core 31B calculates and updates the orientation of the virtual camera Ca in the horizontal direction in step S102. Thereafter, the core 31B ends the camera orientation setting process, and advances the process to the camera position setting process of step S44 shown in FIG. 26.

On the other hand, when the core 31B determines that the difference between the default orientation and the calculated orientation of the virtual camera Ca in the vertical direction is less than or equal to the sliding operation limit angle (YES in S104), the core 31B sets the orientation of the virtual camera Ca in the vertical direction, to the orientation calculated in step S97 (S103). The core 31B calculates and updates the orientation of the virtual camera Ca in the horizontal direction in step S102. Thereafter, the core 31b ends the camera orientation setting process, and advances the process to the camera position setting process of step S44 shown in FIG. 26.

Figure 30:
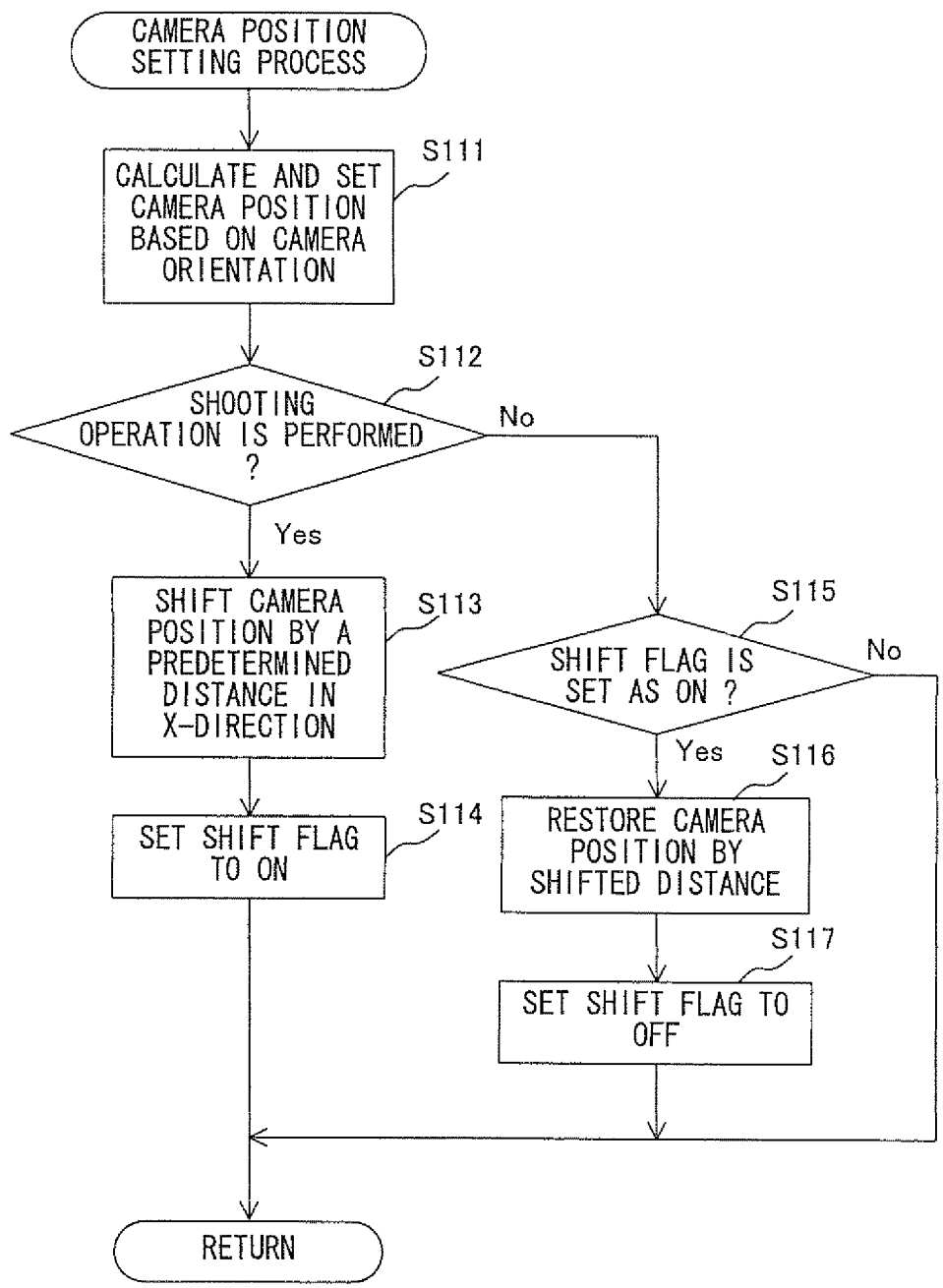
FIG. 30 is a flow chart showing an exemplary camera position setting process.

Next, the camera position setting process of step S44 will be described with reference to FIG. 30. FIG. 30 is a flow chart showing an exemplary camera position setting process. In the camera position setting process, the core 31B calculates a position of the virtual camera Ca in the virtual space, based on the orientation of the virtual camera Ca set in the camera orientation setting process, and updates the associated data in the main memory 32 (S111). The position of the virtual camera Ca is calculated and updated such that, as shown in FIG. 10 to FIG. 12, the virtual camera Ca is distant from the representative point P2 of the player character G1 by a predetermined distance, and is oriented toward the representative point P2.

The core 31B determines whether the shooting operation is performed (S112). When the core 31B determines that the shooting operation is performed (YES in S112), the core 31B amends the position of the virtual camera Ca calculated in step S111, so as to slide (shift) a coordinate position of the virtual camera Ca by a predetermined distance in the X-axis direction (S113). After that, the core 31B sets the shift flag to ON (S114). In the present embodiment, as shown in FIG. 3, the position of the aim G3 in the default state is displayed so as to be superimposed on the player character G1. Therefore, if the position of the virtual camera Ca is not shifted, display of the player character G1 prevents a player from viewing a state of shooting in the virtual space. When the position of the virtual camera Ca is changed so as to slide the virtual camera Ca during the shooting operation by the process step of step S113 being performed, display of the player character G1 does not prevent a player from viewing the state of the shooting, thereby allowing the player to view the state of shooting. Thereafter, the core 31B ends the camera position setting process and the normal state aim position and camera control process, and advances the process to step S31 shown in FIG. 25.

On the other hand, when the core 31B determines that the shooting operation is not performed (NO in S112), the core 31B determines whether the shift flag is set as ON (S115). When the core 31B determines that the shift flag is set as ON (YES in S115), the core 31B amends the position of the virtual camera Ca calculated in step S111 so as to be restored by a distance by which the virtual camera Ca is slid in step S113 (S116). After that, the core 31B sets the shift flag to OFF (S117). The core 31B ends the camera position setting process and the normal state aim position and camera control process, and advances the process to step S31 shown in FIG. 25. On the other hand, when the core 31B determines that the shift flag is not set as ON (NO in S115), the core 31B ends the camera position setting process and the normal state aim position and camera control process without performing the process steps of step S116 and S117, and advances the process to step S31 shown in FIG. 25.

As described above, process step of step S36 of the ground battle stage aim position and camera control process shown in FIG. 25 has been described. Subsequently, the zooming process of step S29 and the zoomed state aim position setting process of step S30 will be described with reference to FIG. 31 and FIG. 32.

Figure 31:
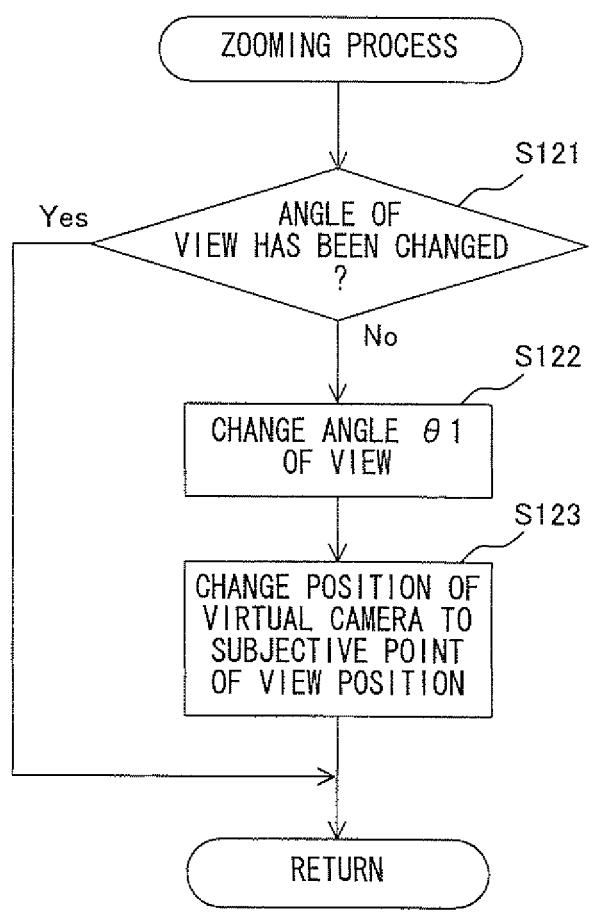
FIG. 31 is a flow chart showing an exemplary zooming-in-on process.

FIG. 31 is a flow chart showing an exemplary zooming-in-on process. Firstly, the core 31B determines whether the angle $\theta 1$ of view of the virtual camera Ca has been changed to an angle for zoomed state (S121). The angle for zoomed state is less than an angle for the normal state, as described above with reference to FIG. 17 and FIG. 18.

When it is determined that the angle $\theta 1$ of view has not been changed to the angle of view for the zoomed state (NO in S121), the core 31B changes the angle $\theta 1$ of view of the virtual camera Ca to the angle of view for the zoomed state (S122). In step S121, the angle $\theta 1$ of view may be determined as different angles according to whether a player character has a specific item (for example, weapon item). Further, specific items are classified into a plurality of types, and the angle $\theta 1$ of view may be determined as different angles according to the type of the specific item possessed by the player character. For example, a table in which the specific items and angles corresponding to the specific items, respectively, are registered, is stored in the main memory 32, and the core 31B retrieves the angle of view in the table according to the possessed item represented by the player character information 324. When the result of the retrieval indicates that the possessed item is registered, the angle $\theta 1$ of view is changed to the angle corresponding to the item. Subsequently, the core 31B changes the position of the virtual camera Ca to the position of the representative point P2 of the player character G1 while maintaining the imaging direction of the virtual camera Ca, in step S123 (changes the position of the virtual camera Ca to the subjective point of view position). Thereafter, the core 31B ends the zooming process, and advances the process to the zoomed state aim setting process of step S30 shown in FIG. 25.

On the other hand, it is determined that the angle $\theta 1$ of view has been changed to the angle of view for the zoomed state (YES in S121), the core 31B ends the zooming process without changing the angle $\theta 1$ of view of the virtual camera Ca to the angle for zoomed state, and advances the process to the zoomed state aim setting process of step S30 shown in FIG. 25.

Figure 32:
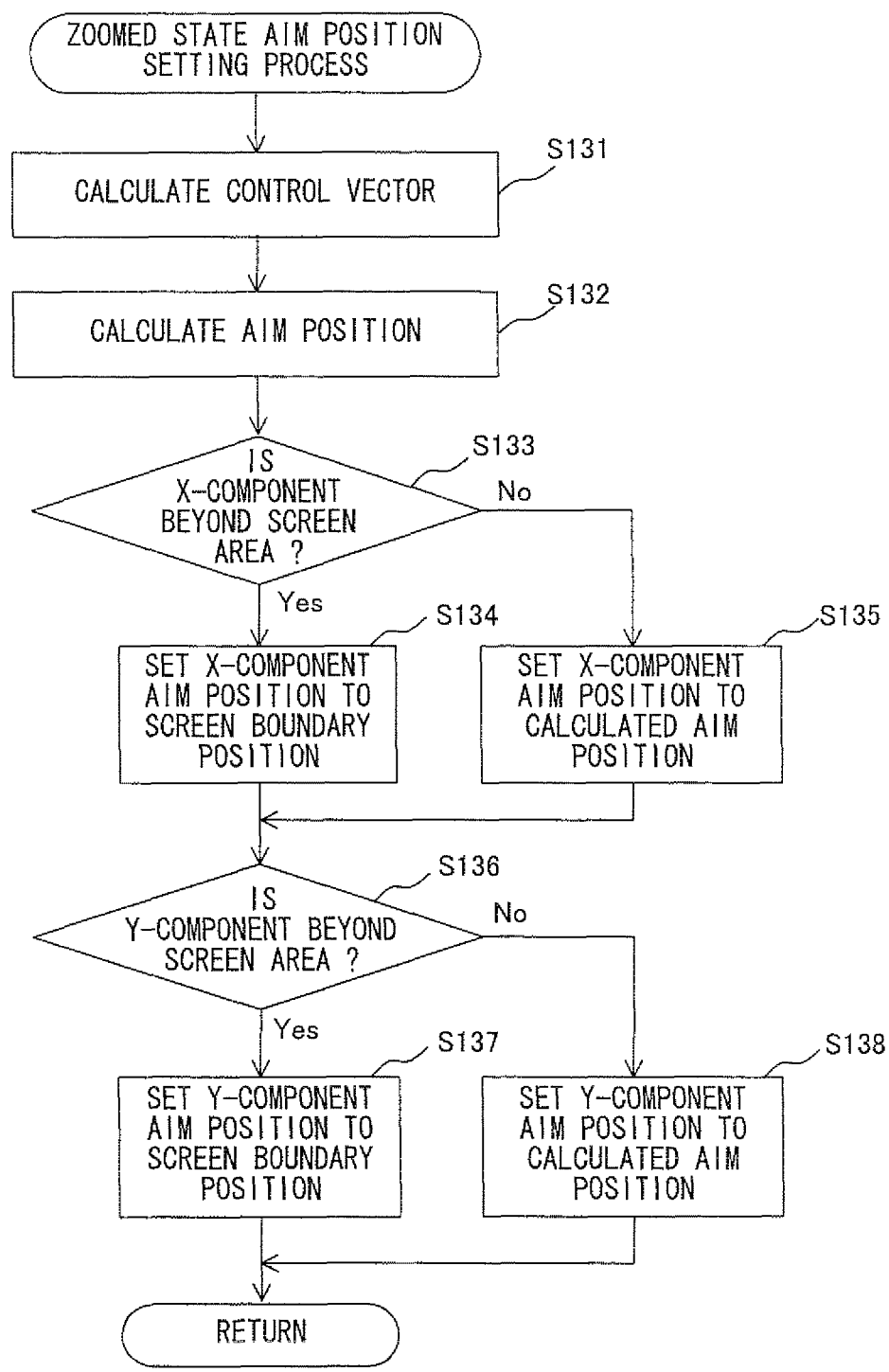
FIG. 32 is a flow chart showing an exemplary zoomed-in-on state aim setting process.

Next, the zoomed state aim setting process of step S30 shown in FIG. 25 will be described with reference to FIG. 32. FIG. 32 is a flow chart showing an exemplary zoomed-in-on state aim setting process. Firstly, the core 31B calculates (S131) a control vector by using equation (F).

$$\text{Control vector} = (\text{the most recent touch position} - \text{the immediately preceding touch position}) \times \text{coefficient } C \quad \text{equation (F)}$$

The coefficient C is a positive value smaller than one. Unlike in equation (A), the difference between the most recent touch position and the immediately preceding touch position is multiplied by the coefficient C (a positive value satisfying C<1). Therefore, on the condition that the distance of the sliding operation is the same between in the zoomed state and in the normal state, the control vector calculated in the zoomed state is smaller than the control vector calculated in the normal state.

The core 31B calculates (S132) the position of the aim G3 on the screen surface G4 by using equation (D). As described above, on the condition that the distance of the sliding operation is the same between in the zoomed state and in the normal state, the control vector calculated in the zoomed state is smaller than the control vector calculated in the normal state. Therefore, when the distance of the sliding operation is the same, change of the position of the aim G3 is smaller in the zoomed state than in the normal state. Thereafter, the core 31B determines (S133) whether the X-coordinate position calculated in step S132 is outside the range of the screen surface G4 (outside the aim movement allowable range). When the X-coordinate position calculated in step S132 is outside the range of the screen surface G4 (YES in S133), the core 31B sets (S134) X-coordinate position of the aim G3 to a coordinate position of the boundary of the screen surface G4 (a coordinate position of the boundary beyond which the calculated coordinate position is changed). Thereafter, the core 31B advances the process to step S136.

On the other hand, when the X-coordinate position calculated in step S132 is within the range of the screen surface G4 (NO in S133), the core 31B sets the X-coordinate position of the aim G3 to a coordinate position calculated in step S132 (S135). After that, the core 31B advances the process to step S136. In step S136, the core 31B determines (S136) whether the Y-coordinate position calculated in step S132 is outside the range of the screen surface G4 (outside the aim movement allowable range). When the Y-coordinate position calculated in step S132 is outside the range of the screen surface G4 (YES in S136), the core 31B sets (S137) the Y-coordinate position of the aim G3 to a coordinate position of the boundary of the screen surface G4 (a coordinate position of the boundary beyond which the calculated coordinate position is changed). Thereafter, the core 31B ends the zoomed state aim setting process, and advances the process to step S31 shown in FIG. 25.

Further, when the Y-coordinate position calculated in step S132 is within the range of the screen surface G4 (NO in S136), the core 31B sets the Y-coordinate position of the aim G3 to the coordinate position calculated in step S132 (S138). After that, the core 31B ends the zoomed state aim setting process, and advances the process to step S31 shown in FIG. 25.

As described above, the process of controlling the position of the aim G3, and the orientation and the position of the virtual camera Ca in the ground battle stage has been described. Hereinafter, the process of controlling the position of the aim G3, and the orientation and the position of the virtual camera Ca in the aerial battle stage will be described with reference to FIG. 28 and FIG. 33.

Figure 33:
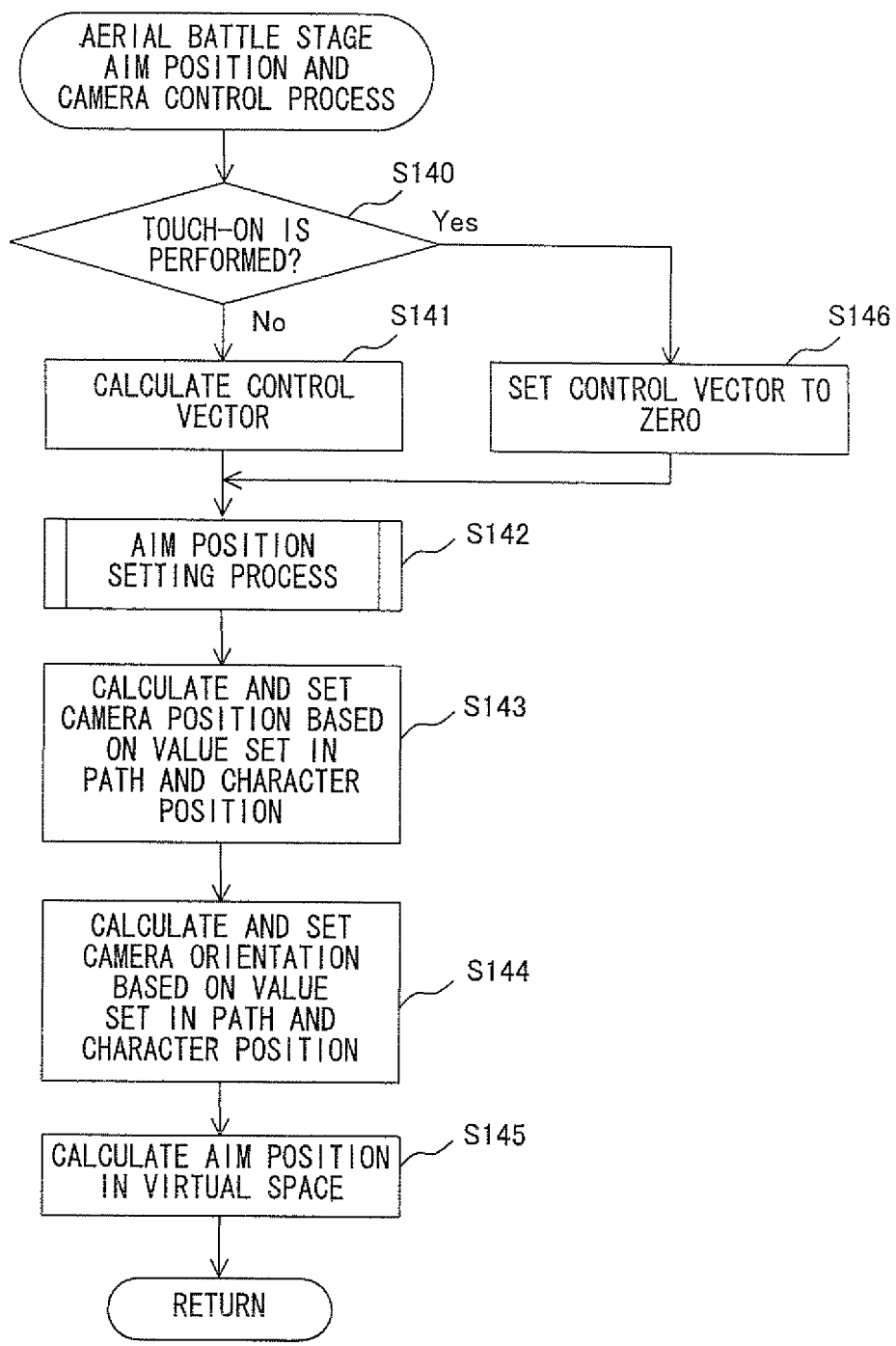
FIG. 33 is a flow chart showing an exemplary aerial battle stage character control process.

FIG. 33 is a flow chart showing an exemplary aerial battle stage character control process performed in step S9 of the main process shown in FIG. 24. In this process, the core 31B determines whether the touch-on is performed (S140). When it is determined that the touch-on is not performed (NO in S140), the core 31B calculates a control vector by using equation (A), equation (B), and equation (C) described above, as in the ground battle stage (S141). The method for calculating the control vector is the same as the method used in step S58 as shown in FIG. 27. Thus, also in the aerial battle stage, the position of the aim G3 is changed after slide-off as well as during the sliding operation as in the normal state of the ground battle stage.

Next, the core 31B performs the aim position setting process (S142). The aim position setting process of step S142 will be described with reference to FIG. 28. The aim position setting process of step S142 is a process for setting the position of the aim G3 on the screen surface G4, and is the same as the aim position setting process in the normal state of the ground battle stage as shown in FIG. 28. However, in the aim position setting process of step S142, the X-coordinate boundary position and the Y-coordinate boundary position which are used in the determinations of step S76 and step S79 are different from those for the aim position setting process in the normal state of the ground battle stage. Specifically, in the aim position setting process of step S142, the X-coordinate boundary position and the Y-coordinate boundary position which are used for the determinations of step S76 and step S79 are set at the edge of the screen surface G4. Thus, the aim movement allowable range is the entire of the screen surface G4.

The core 31B obtains the position of the player character G1, and determines a correspondence point which is closest to the position of the player character G1, among the correspondence points set in the path. The core 31B obtains the default position and the default orientation of the virtual camera Ca which are associated with the determined correspondence point. Thereafter, the core 31B calculates the position of the virtual camera Ca in the virtual space, based on the obtained default position of the virtual camera Ca, and the corrected value stored in the main memory 32 in step S145 described below, and updates the associated data in the main memory 32 (S143). The core 31B sets and updates, in the main memory 32, the orientation of the virtual camera Ca in the virtual space to the obtained default orientation of the virtual camera Ca (S144). The virtual space is rendered in step S11 of FIG. 24, based on the position and the orientation of the virtual camera Ca updated in the main memory 32.

The core 31B calculates a position of the aim G3 in the world coordinate system, based on the updated position of the aim G3 on the screen surface G4, and updates the associated data in the main memory 32 (S145). The aim G3 is rendered in step S11 of FIG. 24, based on the updated position of the aim G3. Thereafter, the core 31B ends the aerial battle stage aim position and camera control process, and advances the process to step S10 of FIG. 24.

When the determination of step S140 indicates YES, that is, when it is determined that touch-on is performed, the core 31B sets the control parameter to zero (S146), and performs the aim position setting process of step S142. Thus, also in the aerial battle stage, as in the ground battle stage, the movement of the aim G3 can be stopped by the touch panel 13 being simply touched on.

As described above, in the present embodiment, while a player is performing the sliding operation on the touch panel 13, the orientation of the virtual camera is changed according to the sliding amount of the sliding operation, and also when a player is not performing the touch operation on the touch panel 13, the orientation of the virtual camera can be changed. Namely, when a player performs slide-off, the orientation of the virtual camera is changed due to inertial force according to the sliding operation (sliding direction, sliding speed) immediately before the touch-off. Thus, also when the touch operation is not being performed, the orientation of the virtual camera Ca can be changed according to the operation having been previously performed by a player. Namely, in the present embodiment, even if the sliding operation is not continued until the virtual camera Ca is oriented toward a direction desired by a player, when the player simply touches the touch panel 13 (touches the touch panel 13 at one fixed point) in the case of the virtual camera Ca being oriented toward the desired direction due to inertial force after slide-off, the orientation of the virtual camera Ca can be set to the orientation desired by the player. Therefore, operability for changing the orientation of the virtual camera Ca can be improved.

Further, it is possible to zoom in on the screen by, for example, changing the angle of view of the virtual camera when a player performs the double tapping operation at a position desired by the player on the entire surface of the touch panel. Accordingly, as compared to the conventional technology in which the screen is zoomed in on when the object is touched, operability for zooming in on the screen can be improved for a player. Furthermore, the imaging direction of the virtual camera is not changed according to the input coordinate, so that a player can easily make an input for zoomed state without becoming conscious of input coordinate.

Moreover, in the present embodiment, the positions of the aim G3 on the screen surface G4 and in the three-dimensional virtual space can be changed from the default position according to the sliding operation performed on the touch panel by a player. Thus, unlike in the conventional technology in which the aim G3 is always positioned at the center of the display screen, the orientation or the position of the virtual camera need not be changed so as to change the position of the aim G3. In the present embodiment, the shooting direction can be changed without changing the position or the orientation of the virtual camera by performing the simple intuitive operation which is the sliding operation on the touch panel 13.

In the present embodiment, a deceleration rate of movement of the aim G3 and a deceleration rate of the change of the orientation and the position of the virtual camera Ca due to inertial force after slide-off cannot be changed by a player changing the setting. However, the deceleration rates may be changed by a player changing the setting. For example, the attenuation rate in equation (C) may be changed or multiplied by a predetermined coefficient, by a player changing the setting.

Furthermore, in the present embodiment, the orientation and the position of the virtual camera Ca are changed such that the virtual camera Ca is rotated about the position of the representative point P2 set in the player character G1, during the sliding operation and after slide-off. However, the present invention is not limited to this configuration. The orientation and the position of the virtual camera Ca may be changed such that the virtual camera Ca may be rotated about a predetermined position which is set outside the player character G1, and which satisfies a predetermined positional relationship with the player character G1 For example, the center of the rotation may be the position of the virtual camera Ca, a gazing point of the virtual camera Ca, or the position of a specific object. Further, a configuration may be used in which the position of the virtual camera Ca is not changed, and only the orientation of the virtual camera Ca may be changed.

In the present embodiment, the information processing apparatus of the present invention is applied to the game apparatus 1. However, the application of the present invention is not limited to a game apparatus. For example, the present invention may be applied to a hand-held information device such as a mobile telephone, a personal handyphone system (PHS), and a hand-held information terminal (PDA). Further, the present invention may be applied to a stationary game apparatus and a personal computer. In addition, the information processing apparatus of the present invention includes a plurality of devices (for example, a server and a client). The main process steps of the process performed by the information processing apparatus as described above may be executed on the server side, and other process steps may be executed on the client side.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein an information processing program which is executed by a computer processor of an information processing apparatus which utilizes a display device and an operation device including a touch panel enabling coordinate input, the information processing program causing the computer to function and perform operations comprising:

positioning a virtual camera in a virtual space;
generating an image of the virtual space by using the virtual camera;
displaying the image of the virtual space generated by the virtual camera on the display device;
determining whether the touch panel is in an inputted state in which a user is performing coordinate input on the touch panel or in a non-inputted state in which a user is not performing coordinate input on the touch panel, based on receiving an output signal from the touch panel;

changing an imaging direction of the virtual camera in accordance with a changing input coordinate position detected on the touch panel during an inputting state and, when the touch panel is detected as having entered into in a non-inputted state, continue changing an imaging direction of the virtual camera based upon changes of input coordinate position detected on the touch panel immediately before the touch panel enters the non-inputted state, wherein a changing of the imaging direction of the virtual camera after the touch panel enters the non-inputted state continues in a manner as though the changing of the imaging direction were a result of an inertial force which acts upon the virtual camera after the touch panel input has entered into the non-inputted state.

2. The non-transitory computer-readable storage medium according to claim 1, wherein the information processing program is configured to enable changing the imaging direction of the virtual camera by rotating the virtual camera in a direction based on a detecting a direction in which an input coordinate position which is designated on the touch panel immediately before the touch panel enters the non-inputted state is changed.

3. The non-transitory computer-readable storage medium according to claim 2, wherein the information processing program is configured to enable changing the imaging direction of the virtual camera by rotating the virtual camera at an angular velocity based on a degree of change of the input coordinate position that is designated on the touch panel immediately before the touch panel enters a non-inputted state, and decelerating the angular velocity to zero over time.

4. The non-transitory computer-readable storage medium according to claim 3, wherein the computer is further caused to position a predetermined object in the virtual space, and while the imaging direction is being changed, decelerate the angular velocity of the imaging direction of the virtual camera at an increased deceleration rate in a case where the predetermined object is in the imaging direction.

5. The non-transitory computer-readable storage medium according to claim 4, wherein the computer is further caused to position a player object in the virtual space, and the predetermined object is a specific non-player object which performs a predetermined action on the player object.

6. The non-transitory computer-readable storage medium according to claim 4, wherein the computer is further caused to position a player object in the virtual space, and wherein the angular velocity of the imaging direction of the virtual camera is not decelerated at an increased deceleration rate when the predetermined object is in the imaging direction in a case where a predetermined or greater number of objects are located in the virtual space so as to be distant from the player object by a predetermined or shorter distance, or so as to be distant from the virtual camera by a predetermined or shorter distance.

7. The non-transitory computer-readable storage medium according to claim 3, wherein the computer is further caused to function and perform operations comprising:

generating an image of the virtual space via the virtual camera from a predetermined position in the virtual space;

displaying, in the generated image, an aiming reticle representing a shooting direction;

positioning an object in the virtual space; and decelerating the angular velocity of the imaging direction of the virtual camera at an increased deceleration rate when a predetermined object is positioned in the virtual image so as to be distant from a position of the aiming reticle by a predetermined or shorter distance.

8. The non-transitory computer-readable storage medium according to claim 7, wherein the computer is further caused to position a player object in the virtual space, and wherein the predetermined object is a specific non-player object which performs a predetermined action on the player object.

9. The non-transitory computer-readable storage medium according to claim 3 wherein, while the imaging direction is being changed, the angular velocity of the imaging direction of the virtual camera is decelerated at an increased deceleration rate in a case where the imaging direction is the same as a direction in which a player object is to advance.

10. The non-transitory computer-readable storage medium according to claim 3, wherein the computer is further caused to function and perform operations comprising:

positioning a predetermined object in the virtual space; and changing the imaging direction of the virtual camera, based on a change direction in which and a change amount by which the input coordinate position designated on the touch panel is changed, while the touch panel is determined to be in the inputted state, the angular velocity of the imaging direction of the virtual camera being decelerated at an increased deceleration rate in a case where the predetermined object is in the imaging direction, while the imaging direction is being changed, wherein the imaging direction is changed based on the change direction and the change amount, regardless of whether the predetermined object is in the imaging direction, while the imaging direction is being changed.

11. The non-transitory computer-readable storage medium according to claim 3, wherein the computer is further caused to receive, from a user via the operation device, a setting change instruction for changing a setting of a deceleration rate of the angular velocity, and wherein the deceleration rate at which the angular velocity is decelerated is changed according to the received setting change instruction.

12. The non-transitory computer-readable storage medium according to claim 2 wherein, while the imaging direction is being changed, a changing of the imaging direction is stopped in a case where the non-inputted state shifts to the inputted state.

13. The non-transitory computer-readable storage medium according to claim 1 wherein, when the touch panel is determined as being in an inputted state, the imaging direction of the virtual camera is changed, based on change of the input coordinate position that is designated on the touch panel immediately before the touch panel is determined to be in the inputted state.

14. The non-transitory computer-readable storage medium according to claim 1, wherein the imaging direction of the virtual camera is changeable within a predetermined range in a vertical direction in the virtual space, and the imaging direction of the virtual camera is changeable in a horizontal direction in the virtual space.

15. The non-transitory computer-readable storage medium program according to claim 1, wherein the imaging direction of the virtual camera is changeable within a predetermined range in a vertical direction in the virtual space, and the imaging direction of the virtual camera is restored so as to orient the virtual camera toward a predetermined initial direction when the imaging direction of the virtual camera is changed beyond the predetermined range.

16. The non-transitory computer-readable storage medium according to claim 1, wherein the computer is further caused to function and perform operations, comprising:
- generating an image of the virtual space via the virtual camera from a predetermined position in the virtual space;
- displaying, in the generated image, an aiming reticle representing a shooting direction; and
- when the touch panel is determined as being in a non-inputted state, moving a display position of the aiming reticle within a predetermined range based on change of an input coordinate position that is designated on the touch panel immediately before the touch panel enters the non-inputted state, and changing the imaging direction of the virtual camera after the aiming reticle is moved beyond the predetermined range, in a case where the touch panel is determined to be in the non-inputted state.

17. The non-transitory computer-readable storage medium according to claim 16, wherein the computer is further caused to:
- calculate a first control parameter based on change of an input coordinate position that is designated on the touch panel immediately before the touch panel enters a non-inputted state, and
- move the aiming reticle within the predetermined range based on the first control parameter to change a position of the aiming reticle , and
- calculate a second control parameter obtained by eliminating, from the first control parameter, a component used for moving the aiming reticle, and change the imaging direction of the virtual camera based on the second control parameter.

18. The non-transitory computer-readable storage medium according to claim 16, wherein the computer is further caused to:
- change the imaging direction of the virtual camera while the touch panel is determined to be in the inputted state;
- change a position of the aiming reticle within the predetermined range based on a change direction in which and a change amount by which an input coordinate position designated on the touch panel is changed, when the touch panel is determined to be in the inputted state; and
- change the imaging direction of the virtual camera, based on the change direction in which and the change amount by which the input coordinate position is changed, after the aiming reticle is moved beyond the predetermined range, in a case where the touch panel is determined to be in the inputted state.

19. The non-transitory computer-readable storage medium according to claim 16, wherein the computer is caused to perform shooting in the virtual space when a shooting instruction from a user is received, and the aiming reticle is moved to a predetermined initial position when a coordinate input and/or the shooting instruction is not received for a predetermined time period after the aiming reticle is moved.

20. The non-transitory computer-readable storage medium according to claim 19, wherein the computer is further caused to prevent the aiming reticle from being displayed, when a coordinate input and/or the shooting instruction is not received for the predetermined time period after the aiming reticle is moved.

21. The non-transitory computer-readable storage medium according to claim 20, wherein the aiming reticle is displayed again when a coordinate input and/or the shooting instruction is received after a process of preventing the aiming reticle from being displayed is performed.

22. The non-transitory computer-readable storage medium according to claim 1, wherein when the touch panel is in an inputted state, the information processing program causes the computer processor to calculate a first control parameter based on a difference between the most recent input coordinate position and an input coordinate position immediately preceding the most recent input coordinate position, and when the touch panel is in a non-inputted state, calculate an average of each difference between two contiguous input coordinate positions among a plurality of previous input coordinate positions which are obtained immediately before the touch panel enters the non-inputted state, so as to calculate the first control parameter based on the average of each difference, and wherein the imaging direction of the virtual camera is changed based on the first control parameter.

23. The non-transitory computer-readable storage medium according to claim 1, wherein the computer is further caused to function and perform operations comprising:
- determining whether a continuous input is received via the operation device that is an intermittent coordinate input which is performed on the touch panel a predetermined number of times within a predetermined time period, when the touch panel is in the inputted state; and
- performing a zooming-in-on process when the continuous input is received.

24. The non-transitory computer-readable storage medium according to claim 1, wherein
the computer is further caused to function and operate to receive via the operation device a restoration-to-default instruction and to restore the imaging direction and a position of the virtual camera to a default state, and wherein the imaging direction of the virtual camera is changed so as to orient the virtual camera toward a predetermined initial direction, and the position of the virtual camera is changed to a predetermined initial position, when the restoration-to-default instruction is received.

25. The non-transitory computer-readable storage medium according to claim 1, wherein the imaging direction of the virtual camera during the non-inputting state is changed by decelerating a velocity of changing the imaging direction of the virtual camera to zero over time.

26. The non-transitory computer-readable storage medium having stored therein the information processing program according to claim 1, wherein the imaging direction of the virtual camera during the inputting state and during the non-inputting state is rotated about a predetermined point.

27. An information processing apparatus which includes a display and a touch panel for obtaining coordinate input information, the information processing apparatus comprising one or more computer processors configured to:
- position a virtual camera in a virtual space;
- generate an image of the virtual space by using the virtual camera;
- display the image of the virtual space on the display;
- determine whether the touch panel is in an inputted state in which a user is performing coordinate input on the touch panel or in a non-inputted state in which a user is not performing coordinate input on the touch panel, based on receiving an output signal from the touch panel;
- change an imaging direction of the virtual camera in accordance with a changing input coordinate position detected on the touch panel during an inputting state and, when the touch panel is detected as having entered into in a non-inputted state, continue to change an imaging direction of the virtual camera based upon changes of input coordinate position detected on the touch panel immediately before the touch panel enters the non-inputted state, wherein a changing of the imaging direction of the virtual camera after the touch panel enters the non-inputted state continues in a manner as though the changing of the imaging direction were a result of an inertial force which acts upon the virtual camera after the touch panel input has entered into the non-inputted state.

28. An information processing system in communication with a display device and a touch panel for providing coordinate input information, the information processing system comprising one or more computer processors configured to:
position a virtual camera in a virtual space;
generate an image of the virtual space using the virtual camera;
display the image of the virtual space on the display device;
determine whether the touch panel is in an inputted state in which a user is performing coordinate input on the touch panel or in a non-inputted state in which a user is not performing coordinate input on the touch panel, based on receiving an output signal from the touch panel
change an imaging direction of the virtual camera in accordance with a changing input coordinate position detected on the touch panel during an inputting state and, when the touch panel is detected as having entered into in a non-inputted state, continue to change an imaging direction of the virtual camera based upon changes of input coordinate position detected on the touch panel immediately before the touch panel enters the non-inputted state, wherein a changing of the imaging direction of the virtual camera after the touch panel enters the non-inputted state continues in a manner as though the changing of the imaging direction were a result of an inertial force which acts upon the virtual camera after the touch panel input has entered into the non-inputted state.

29. An information processing method for controlling a direction of a virtual camera positioned in a virtual space, the method implemented using one or more computer processors, a display device and a touch sensitive panel, comprising:
positioning a virtual camera in a virtual space;
generating an image of the virtual space using the virtual camera;
displaying an image of the virtual space on the display device;
determining whether the touch panel is in an inputted state in which a user is performing coordinate input on the touch panel or in a non-inputted state in which a user is not performing coordinate input on the touch panel, based on receiving an output signal from the touch panel;
changing an imaging direction of the virtual camera in accordance with a changing input coordinate position detected on the touch panel during an inputting state and, when the touch panel is detected as having entered into in a non-inputted state, continue changing an imaging direction of the virtual camera based upon changes of input coordinate position detected on the touch panel immediately before the touch panel enters the non-inputted state, wherein a changing of the imaging direction of the virtual camera after the touch panel enters the non-inputted state continues in a manner as though the changing of the imaging direction were a result of an inertial force which acts upon the virtual camera after the touch panel input has entered into the non-inputted state.

30. A non-transitory computer-readable storage medium having stored therein an information processing program which is executed by a computer processor of an information processing apparatus which utilizes a display device and an operation device including a touch panel enabling coordinate input, the information processing program causing the computer to function and perform operations comprising:
positioning a virtual camera in a virtual space;
generating an image of the virtual space by using the virtual camera;
displaying the image of the virtual space generated by the virtual camera on the display device;
determining whether the touch panel is in an inputted state in which a user is performing coordinate input on the touch panel or in a non-inputted state in which a user is not performing coordinate input on the touch panel, based on receiving an output signal from the touch panel;
rotating an imaging direction of the virtual camera about a predetermined point or changing an imaging direction of the virtual camera in accordance with a changing input coordinate position detected on the touch panel during an inputting state and, when the touch panel is detected as having entered into in a non-inputted state, continue changing or rotating the imaging direction of the virtual camera based upon changes of input coordinate position detected on the touch panel immediately before the touch panel enters the non-inputted state, wherein a continued changing or rotating of the imaging direction of the virtual camera after the touch panel enters the non-inputted state continues in a manner as though the changing or rotating of the imaging direction were a result of an inertial force which acts upon the virtual camera after the touch panel input has entered into the non-inputted state.

31. An information processing system in communication with a display device and a touch panel for providing coordinate input information, the information processing system comprising digital information processing circuitry including one or more computer processors and being configured to:
position a virtual camera in a virtual space;
generate an image of the virtual space using the virtual camera;
display the image of the virtual space on the display device;
detect whether the touch panel is in an inputting state in which a user is performing a coordinate input operation on the touch panel or in a non-inputted state in which a user is not performing a coordinate input operation on the touch panel; and
change an imaging direction of the virtual camera in accordance with changing input coordinate positions detected on the touch panel during an inputting state, and when the touch panel is detected as entering into in a non-inputted state, change an imaging direction of the virtual camera based upon changes of input coordinate positions detected on the touch panel immediately before the touch panel enters the non-inputted state;
wherein, when the touch panel is detected in an inputted state, one or more computer processors of the information processing system is configured to determine a first control parameter based on a calculated difference between a most recently detected input coordinate position and an input coordinate position detected immediately preceding the most recently detected input coordinate position and, when the touch panel is detected in a non-inputted state, one or more computer processors of the information processing system is configured to calculate an average value of each difference between successively detected input coordinate positions for each of a plurality of input coordinate positions detected immediately before the touch panel enters the non-inputted state and the first control parameter is determined based on the calculated average of each difference, and wherein the imaging direction of the virtual camera is changed based on the first control parameter.

* * * * *